(12) United States Patent
Novek

(10) Patent No.: US 12,252,410 B2
(45) Date of Patent: Mar. 18, 2025

(54) PROCESSES FOR PRODUCING CALCIUM OXIDE AND SULFURIC ACID FROM CALCIUM SULFATE WITH MAGNESIUM INTERMEDIATE

(71) Applicant: INNOVATOR ENERGY LLC, Houston, TX (US)

(72) Inventor: Ethan Novek, Houston, TX (US)

(73) Assignee: INNOVATOR ENERGY LLC

( * ) Notice: Subject to any disclaimer, the term of this patent is extended or adjusted under 35 U.S.C. 154(b) by 0 days.

(21) Appl. No.: 18/773,023

(22) Filed: Jul. 15, 2024

(65) Prior Publication Data

US 2025/0019253 A1    Jan. 16, 2025

Related U.S. Application Data

(60) Provisional application No. 63/526,718, filed on Jul. 14, 2023, provisional application No. 63/528,097, filed on Jul. 21, 2023.

(51) Int. Cl.
| | |
|---|---|
| *C01F 11/08* | (2006.01) |
| *C01B 17/74* | (2006.01) |
| *C01F 5/40* | (2006.01) |

(52) U.S. Cl.
CPC ............ *C01F 11/08* (2013.01); *C01B 17/745* (2013.01); *C01F 5/40* (2013.01)

(58) Field of Classification Search
CPC ........... C01F 11/08; C01F 5/40; C01B 17/745
USPC ........................................................ 423/638
See application file for complete search history.

(56) References Cited

U.S. PATENT DOCUMENTS

| | | | | |
|---|---|---|---|---|
| 5,614,158 | A | * | 3/1997 | College ................ B01D 53/501 423/243.1 |
| 11,034,619 | B2 | | 6/2021 | Novek |
| 11,236,033 | B2 | | 2/2022 | Novek |
| 11,512,036 | B2 | | 11/2022 | Novek |
| 11,542,219 | B2 | | 1/2023 | Novek |
| 11,897,840 | B2 | | 2/2024 | Novek |
| 12,017,985 | B2 | | 6/2024 | Novek |
| 12,030,847 | B2 | | 7/2024 | Novek |
| 2014/0305346 | A1 | * | 10/2014 | Neelameggham ........ C04B 2/10 423/155 |

(Continued)

FOREIGN PATENT DOCUMENTS

| | | |
|---|---|---|
| CN | 101574619 A | 7/2012 |
| WO | 2022232493 A1 | 11/2022 |
| WO | 20220241219 A1 | 11/2022 |

OTHER PUBLICATIONS

International Search Report and Written Opinion dated Sep. 23, 2024 issued in PCT/US2024/038065.

*Primary Examiner* — Melissa S Swain

(74) *Attorney, Agent, or Firm* — Hunton Andrews Kurth LLP

(57) ABSTRACT

The present application pertains to processes for making calcium oxide and/or sulfuric acid from calcium sulfate. In some embodiments the processes comprise reacting a component comprising calcium sulfate with a second component comprising magnesium sulfite under conditions to form a solid comprising calcium sulfite and a solution comprising magnesium sulfate. Next, at least a portion of the solid comprising calcium sulfite is decomposed to form a second solid comprising calcium oxide, or calcium hydroxide, or cement, or clinker, or any combination thereof.

14 Claims, 7 Drawing Sheets

(Above)

(56) References Cited

U.S. PATENT DOCUMENTS

2017/0340770 A1 11/2017 Nies
2023/0131290 A1 4/2023 Novek

\* cited by examiner

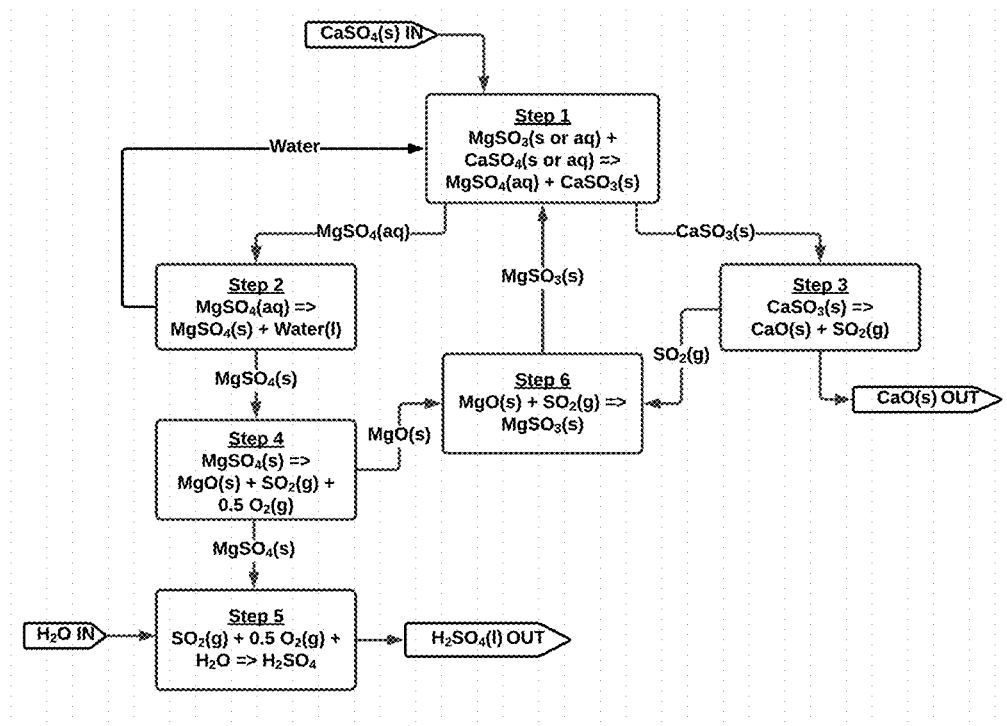
FIG. 1 (Above)

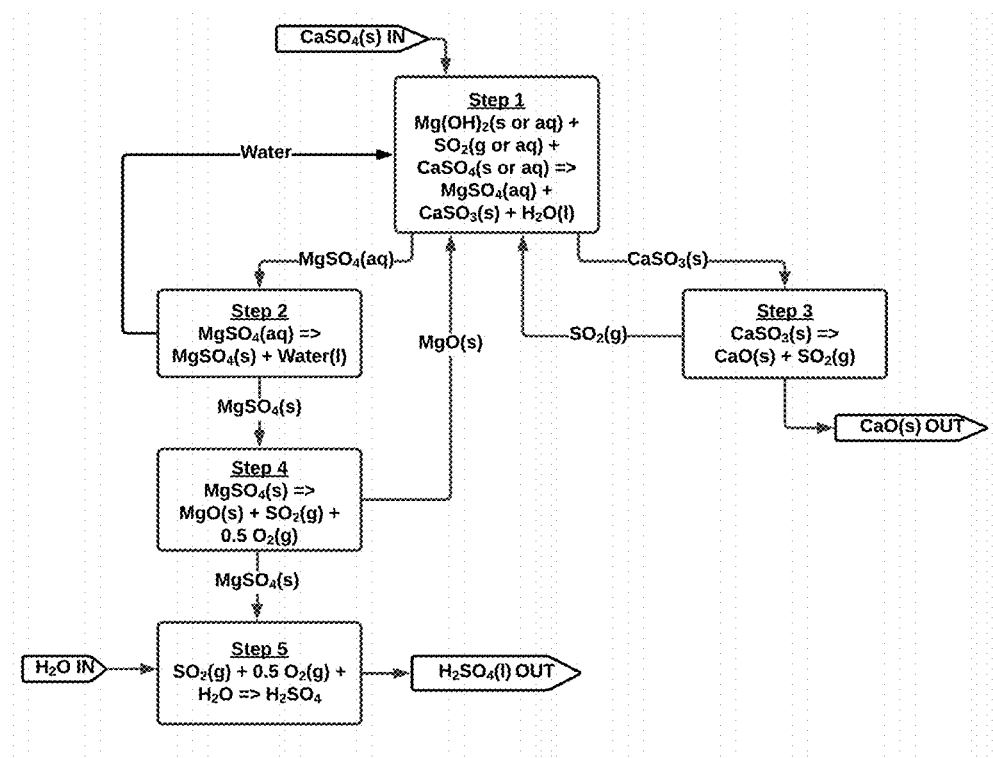
FIG. 2 (Above)

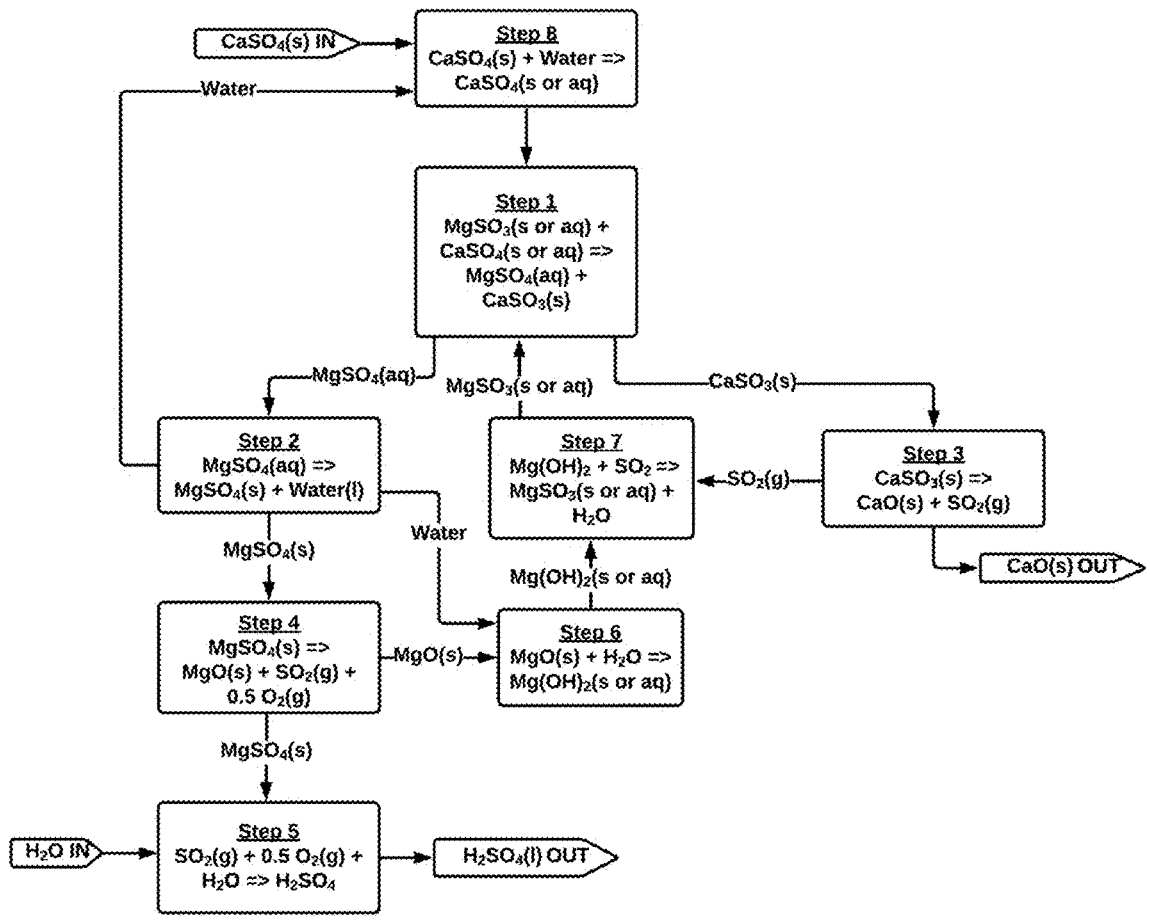
FIG. 3 (Above)
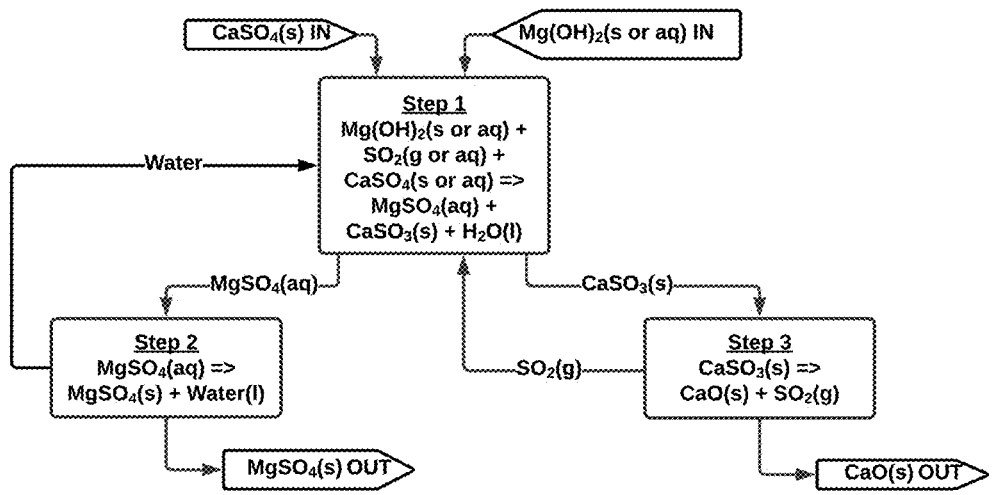
FIG. 4 (Above)

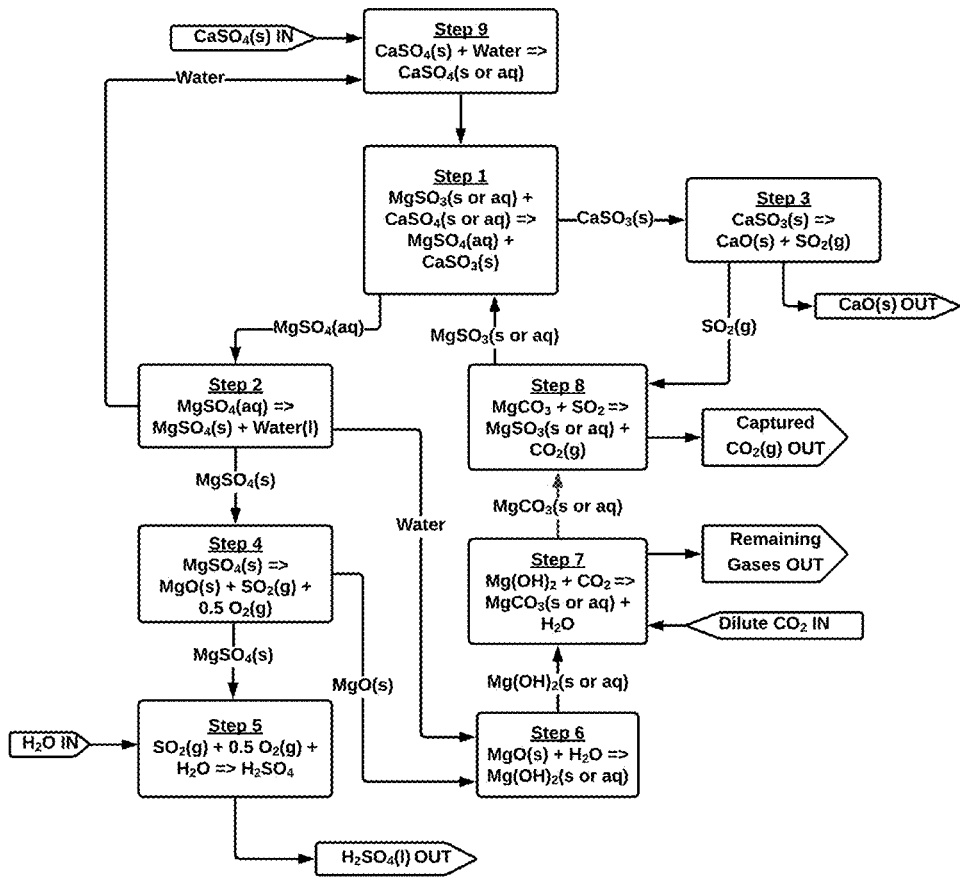
FIG. 5 (Above)

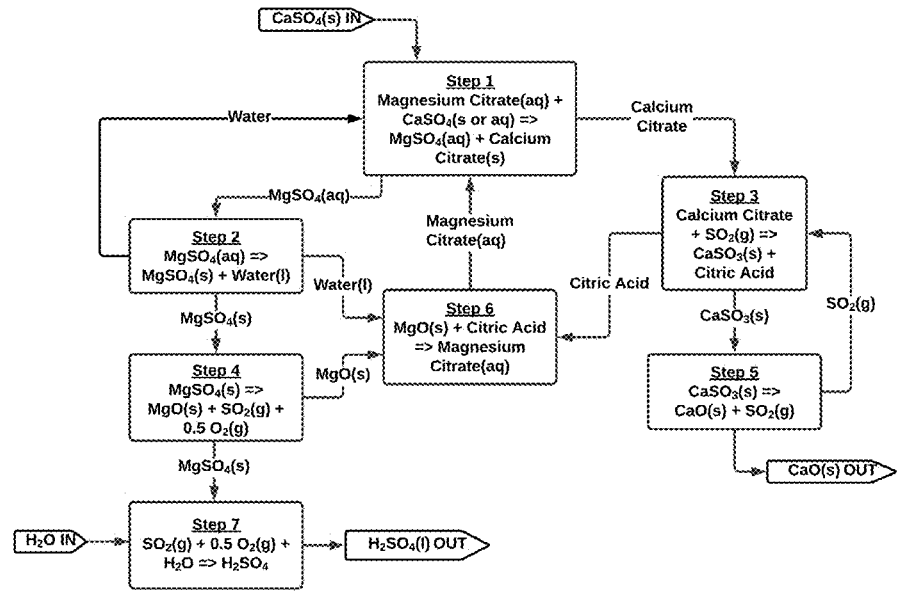
FIG. 6 (Above)
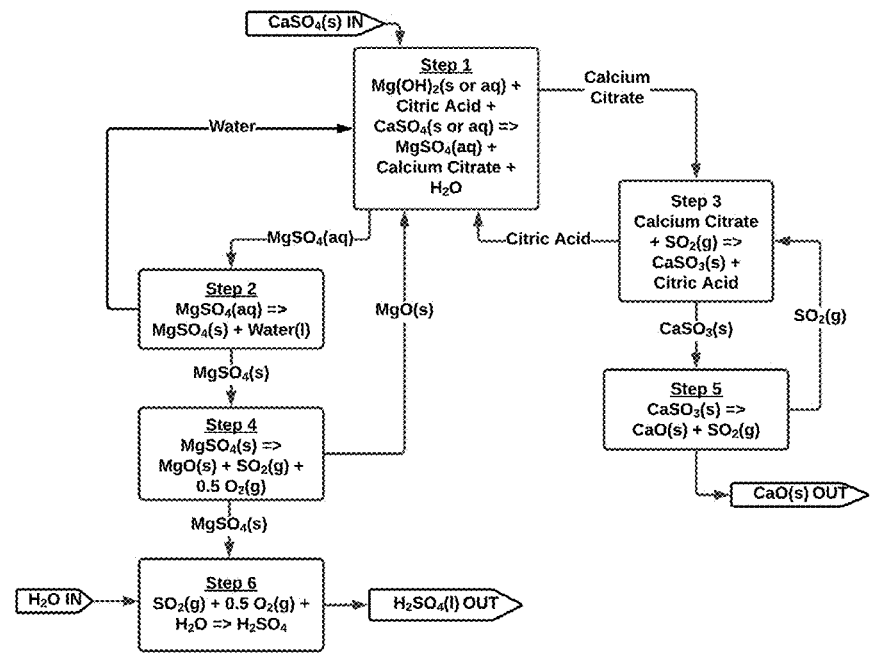
FIG. 7 (Above)

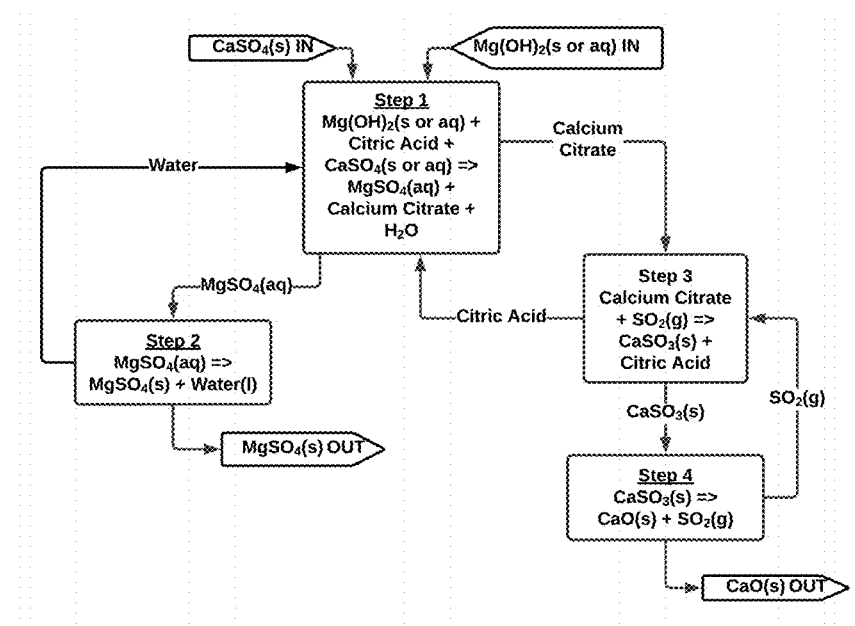
FIG. 8 (Above)

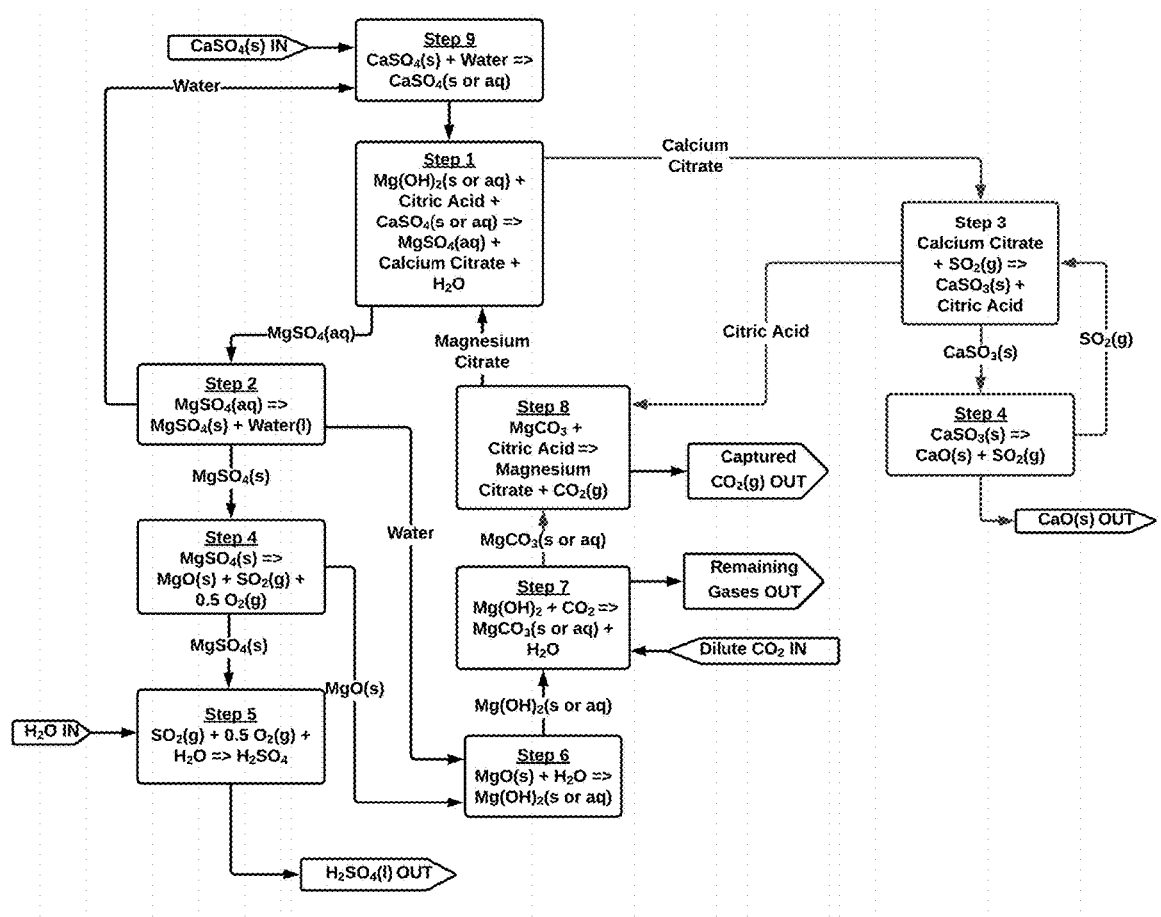
FIG. 9 (Above)

PROCESSES FOR PRODUCING CALCIUM OXIDE AND SULFURIC ACID FROM CALCIUM SULFATE WITH MAGNESIUM INTERMEDIATE

CROSS-REFERENCE TO RELATED APPLICATIONS

This application claims priority to U.S. Provisional Application No. 63/526,718 filed on Jul. 14, 2023 and U.S. Provisional Application No. 63/528,097 filed Jul. 21, 2023. Both Applications are incorporated herein by reference.

This patent application is related to U.S. Pat. No. 12,030,847 which was filed May 17, 2023 and claimed priority to application Ser. No. 18/087,432 filed Dec. 22, 2022 which was a continuation of application Ser. No. 17/744,161, filed on May 13, 2022, now U.S. Pat. No. 11,542,219, which is a continuation of application Ser. No. 17/732,808, filed on Apr. 29, 2022, now U.S. Pat. No. 11,512,036, application Ser. No. 18/198,772 is a continuation of application Ser. No. 17/590,483, filed on Feb. 1, 2022, now U.S. Pat. No. 11,897,840, said application Ser. No. 17/732,808 is a continuation-in-part of application Ser. No. 17/590,483, filed on Feb. 1, 2022, which is a continuation of application Ser. No. 17/243,714, filed on Apr. 29, 2021, now U.S. Pat. No. 11,236,033, which is a continuation-in-part of application Ser. No. 16/944,850, filed on Jul. 31, 2020, now U.S. Pat. No. 11,034,619. It is also related to provisional application No. 63/400,883, filed on Aug. 25, 2022, provisional application No. 63/342,870, filed on May 17, 2022, provisional application No. 63/188,275, filed on May 13, 2021, provisional application No. 63/179,822, filed on Apr. 26, 2021, provisional application No. 63/163,993, filed on Mar. 22, 2021, provisional application No. 63/157,847, filed on Mar. 8, 2021, provisional application No. 63/153,461, filed on Feb. 25, 2021, provisional application No. 63/147,286, filed on Feb. 9, 2021, provisional application No. 62/895,557, filed on Sep. 4, 2019, provisional application No. 62/890,254, filed on Aug. 22, 2019. It is also related to U.S. Pat. No. 12,017,985. All of the aforementioned patents and applications are incorporated herein by reference.

BACKGROUND AND SUMMARY

Calcium sulfate is a waste product from a wide range of processes. For example, in Florida alone, large tailing piles contain over 2 billion tons of calcium sulfate waste, known as phosphogypsum, a waste product of the phosphate and phosphoric acid industry, and over 30 million tons of additional phosphogypsum tailings are produced each year. For example, various other industries produce calcium sulfate byproduct or waste product in large quantities. Other example industries and applications producing calcium sulfate include, but are not limited to, acid neutralization, or chemical production, or petrochemical production. Additionally, calcium sulfate ore or minerals are widely available at a low cost, high abundance, and high purity throughout the world.

Sulfuric acid is a widely consumed commodity chemical and is widely considered one of the most consumed commodity chemicals. Additionally, many processes which produce calcium sulfate consume sulfuric acid. A significant portion of the production of calcium sulfate byproduct or waste product may result from a consumption of sulfuric acid, such as, for example, phosphoric acid production or acid neutralization in petrochemical production. Sulfuric acid is at risk of future supply shortages due to the potential reduced production of sulfur from refineries due to the potential future reduction in the consumption of oil for transportation fuels and potential reduced demand or refining of high sulfur or sour crude. Additionally, most processes consuming sulfur acid and producing calcium sulfate may benefit from circular economy in sulfuric acid production, such as producing or regenerating sulfuric acid from the calcium sulfate waste, due to cost savings, or logistics and supply chain risks, or safety, or any combination thereof. Additionally, processes which produce calcium sulfate waste and/or may not consume sulfuric acid, such as processes employing other sulfur or sulfate feeds, and/or may benefit from the production and/or sale of sulfuric acid as an additional valuable product.

Calcium oxide or calcium hydroxide is a widely produced commodity material consumed at over 300 million tons per year as a high purity chemical and over 2 billion tons per year in the form of cement. Production of calcium oxide in prior art processes emits a significant amount of carbon dioxide and comprises over 9% of global $CO_2$ emissions (emissions from both calcium oxide production and cement production). Some processes which produce calcium sulfate as a byproduct or waste product may consume calcium oxide or calcium hydroxide and/or may benefit from a circular economy of producing calcium oxide or calcium hydroxide from at least a portion of their waste or byproduct calcium sulfate, which may save money, reduce logistics and supply chain risks, and improve safety. Some processes which produce calcium sulfate as a byproduct or waste product and/or may not consume calcium oxide or calcium hydroxide may benefit from the production and/or sale of calcium oxide or calcium hydroxide as an additional valuable product.

Calcium oxide or calcium hydroxide and sulfuric acid are generally significantly more valuable and generally have a market price significantly greater than calcium sulfate.

There is a significant value and significant need to develop a low cost, low energy consumption, ultra-low $CO_2$ emissions or $CO_2$ emissions negative process to convert calcium sulfate into sulfuric acid and/or calcium oxide, or calcium hydroxide, or calcium carbonate, or a derivative thereof, or any combination thereof.

The present invention may pertain to systems and/or methods for producing alkaline earth salts. Some embodiments may pertain to producing calcium oxide or calcium hydroxide and sulfuric acid from calcium sulfate. Some embodiments may enable significantly lower $CO_2$ emissions or $CO_2$ production calcium oxide or calcium hydroxide. Some embodiments may enable a circular economy, or recycling or regeneration of sulfuric acid in various processes which may produce calcium sulfate as a byproduct or waste product, which may include, but are not limited to, one or more or any combination of the following: phosphoric acid, or phosphate fertilizer production, or acid neutralization, or petrochemical production, or battery recycling. Some embodiments may enable phosphoric acid production from calcium phosphate ore to comprise a carbon negative or $CO_2$ sequestering activity, which may greatly reduce $CO_2$ in the atmosphere or $CO_2$ emissions. In some embodiments, calcium sulfate may comprise a mined feed or ore, such as, for example, mined gypsum or quarried gypsum or calcium sulfate mineral.

Some embodiments may comprise a double displacement or metathesis reaction between a salt comprising calcium sulfate and a salt comprising magnesium—'x' anion, which may form a salt comprising calcium—'x' anion and a salt comprising magnesium sulfate. In some embodiments, at least a portion of a salt comprising magnesium sulfate may comprise a valuable product, or may comprise an intermediate, or any combination thereof. In some embodiments, at least a portion of a salt comprising magnesium sulfate may be decomposed to form, for example, at least a portion of magnesium oxide, or sulfur dioxide, or sulfur trioxide, or diatomic oxygen, or any combination thereof. In some embodiments, at least a portion of sulfur dioxide, or diatomic oxygen, or sulfur trioxide, or any combination thereof may comprise a valuable product, or an intermediate, or may be converted into sulfuric acid, or may be reacted with at least a portion of water to form at least a portion of sulfuric acid, or any combination thereof. In some embodiments, a calcium—'x' anion salt may comprise at least a portion of calcium sulfite. In some embodiments, a calcium—'x' anion salt may be reacted with at least a portion of sulfur dioxide or a sulfur dioxide derivative or a sulfite salt or bisulfite salt or sulfurous acid or any combination thereof to form at least a portion of a salt comprising calcium sulfite and/or at least a portion of an acid comprising at least a portion of the acid derivative or an acid derivative of the 'x' anion. In some embodiments, at least a portion of a salt comprising calcium sulfite may be thermally decomposed into calcium oxide or cement, and sulfur dioxide. In some embodiments, at least a portion of a salt or material comprising calcium oxide may be formed and/or, in some embodiments, at least a portion of a material comprising calcium oxide may be reacted with at least a portion of water to form at least a portion of a calcium hydroxide or a derivative thereof, and/or may be reacted with carbon dioxide to form calcium carbonate, if desired.

In some embodiments, a salt comprising magnesium—'x' anion may be more soluble than a a salt comprising calcium with same anion or a salt comprising calcium—'x' anion. In some embodiments, a calcium—'x' anion salt may be less soluble in water than calcium sulfate, which may result in or facilitate a precipitation reaction, for example, wherein at least a portion of a salt comprising calcium—'x' anion salt may precipitate in a reaction with reagents or reactants comprising a salt comprising magnesium—'x' anion and a salt comprising calcium sulfate. In some embodiments, at least a portion of the reactants may be dissolved, or at least a portion of the reactants may comprise an aqueous state, or a portion of the reactants may be at a solid phase, or at least a portion of the reactants may comprise a solid-liquid mixture, or any combination thereof.

In some embodiments, calcium sulfate may possess a solubility of less than 10 g/kg in water, or about 2-3 g/kg in water, or 0.5-15 g/kg in water depending on the form or state or other solutes present or temperature, or any combination thereof which may comprise a low solubility compared to some other calcium salts, such as calcium chloride, however calcium sulfate may have a greater solubility than some other calcium salts, such as, for example, calcium citrate (example solubility of about 0.85 g/kg in water), or calcium carbonate (example solubility of about 0.015 g/kg in water), or calcium sulfite (example solubility of about 0.0043 g/kg in water). In some embodiments, magnesium salts of the same anions may possess greater solubility in water, such as, for example, magnesium sulfite (example solubility of about 5.2 g/kg in water), or magnesium citrate (example solubility of about 200-300 g/kg in water), or any combination thereof.

In some embodiments, a salt comprising magnesium 'x'-anion may comprise magnesium sulfite, or magnesium sesquisulfite, or magnesium bisulfite, or any combination thereof. In some embodiments, a solid, or solution, or slurry, or any combination thereof comprising magnesium sulfite, or magnesium sesquisulfite, or magnesium bisulfite, or any combination thereof may be mixed or reacted with a solid, or solution, or slurry, or any combination thereof comprising calcium sulfate to form at least a portion of a solid, or solution, or slurry, or any combination thereof comprising magnesium sulfate and/or at least a portion of a solid, or solution, or slurry, or any combination thereof comprising calcium sulfite, or calcium sesquisulfite, or calcium bisulfite, or any combination thereof.

Some embodiments may comprise systems and/or methods for producing magnesium salts, or calcium salts, or calcium citrate, or calcium carboxylates, or magnesium carboxylates, or calcium sulfite, or magnesium sulfate, or magnesium oxide, or magnesium carbonate, or sulfuric acid, or sulfur dioxide, or sulfur, or calcium oxide, or calcium hydroxide, or captured carbon dioxide, or any combination thereof. For example, in some embodiments, a salt or solution comprising magnesium sulfate may be produced and/or magnesium sulfate may comprise a valuable product. For example, in some embodiments, a salt comprising calcium citrate may be produced and/or calcium citrate may comprise a valuable product. For example, in some embodiments, magnesium oxide, or magnesium hydroxide, or magnesium carbonate, or any combination thereof may be produced, and/or may comprise a valuable product. In some embodiments, a material comprising magnesium may comprise an input or feed to one or more embodiments and/or may comprise, for example, including, but not limited to, one or more or any combination of the following: dolomite, or dolostone, or magnesium oxide, or magnesium carbonate, or magnesium carboxylate, or magnesium sulfite. In some embodiments, magnesium or a material comprising magnesium may comprise a feed or input. In some embodiments, magnesium or a material comprising magnesium may comprise an intermediate, or catalyst, or process intermediate, or chemical intermediate, or intermediate reagent, or any combination thereof.

Some embodiments may comprise a $CO_2$ capture, or an acid gas capture or separation process, or any combination thereof. In some embodiments, carbon dioxide may be provided as an example acid gas, however other acid gases may be applicable, which may include, but are not limited to, one or more or any combination of the following: carbon dioxide, or sulfur dioxide, or hydrogen sulfide, or nitrogen oxides, or sulfur oxide. For example, in some embodiments, a material comprising magnesium oxide may be formed or may be produced. For example, in some embodiments, at least a portion of a material comprising magnesium oxide may be reacted with at least a portion of a gas comprising carbon dioxide in a manner to form at least a portion of a material comprising magnesium carbonate. For example, in some embodiments, at least a portion of a material comprising magnesium oxide may be reacted with at least a portion of a component comprising water to form at least a portion of component or solid or solution or slurry comprising magnesium hydroxide and/or at least a portion of said component comprising magnesium hydroxide may be reacted with a gas or fluid or component comprising carbon dioxide to form at least a portion of a component comprising magnesium carbonate. In some embodiments, at least a portion of a component comprising magnesium carbonate may be reacted to form at least a portion of carbon dioxide or captured carbon dioxide. For example, in some embodiments, at least a portion of a component comprising magnesium carbonate may be reacted with a carboxylic acid to form at least a portion of a component magnesium carboxylate and at least a portion of a component comprising carbon dioxide. For example, in some embodiments, at least a portion of a component comprising magnesium carboxylate may be reacted with a component comprising calcium sulfate to form at least a portion of a component comprising calcium carboxylate and a component comprising magnesium sulfate. For example, in some embodiments, at least a portion of a component comprising magnesium carboxylate may be reacted with a component comprising sulfur dioxide to form at least a portion of a component comprising magnesium sulfite or magnesium+sulfur dioxide and/or a component comprising carboxylic acid or carboxylic acid species. For example, in some embodiments, at least a portion of a component comprising magnesium carbonate may be reacted with a component comprising sulfur dioxide to form at least a portion of a component comprising magnesium sulfite or magnesium+sulfur dioxide and/or a component comprising carbon dioxide, such as, for example, captured carbon dioxide gas or fluid or liquid or supercritical fluid.

BRIEF DESCRIPTION OF THE FIGURES

FIG. 1: A process for producing calcium oxide and sulfuric acid from calcium sulfate using magnesium and sulfur dioxide intermediates.

FIG. 2: A process for producing calcium oxide and sulfuric acid from calcium sulfate using magnesium and sulfur dioxide intermediates.

FIG. 3: A process for producing calcium oxide and sulfuric acid from calcium sulfate using magnesium and sulfur dioxide intermediates.

FIG. 4: A process for producing calcium oxide and magnesium sulfate from calcium sulfate and a magnesium bearing material using magnesium and sulfur dioxide intermediates.

FIG. 5: A process for producing calcium oxide and sulfuric acid from calcium sulfate, while simultaneously capturing carbon dioxide, employing intermediates comprising magnesium and sulfur dioxide.

FIG. 6: A process for producing calcium oxide and sulfuric acid from calcium sulfate using magnesium and citric acid intermediates.

FIG. 7: A process for producing calcium oxide and sulfuric acid from calcium sulfate using magnesium and citric acid intermediates.

FIG. 8: A process for producing calcium oxide and magnesium sulfate from calcium sulfate and a magnesium bearing material using magnesium and citric acid intermediates.

FIG. 9: A process for producing calcium oxide and sulfuric acid from calcium sulfate, while simultaneously capturing carbon dioxide, employing intermediates comprising magnesium and citric acid.

DETAILED DESCRIPTION

Example Chemistry

Example 1: Producing Calcium Oxide or Calcium Hydroxide and Sulfuric Acid using Magnesium Sulfite Intermediate. An embodiment may comprise one or more or any combination of the following:

(1) 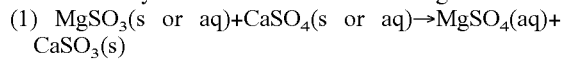$MgSO_3(s \text{ or } aq) + CaSO_4(s \text{ or } aq) \rightarrow MgSO_4(aq) + CaSO_3(s)$ Note: In some embodiments, at least a portion of a component comprising $CaSO_3(s)$ may be separated by a solid-liquid separation process, such as filtration, or centrifuge, or any combination thereof.

(2) 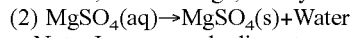$MgSO_4(aq) \rightarrow MgSO_4(s) + \text{Water}$

Note: In some embodiments, a component comprising $MgSO_4(aq)$ may be concentrated and/or crystallized in a multi-step process. For example, in some embodiments, $MgSO_4(aq)$ may be concentrated using electrodialysis and/or reverse osmosis and/or nanofiltration and/or forward osmosis and/or osmotically assisted reverse osmosis and/or other separation method to, for example, separate at least a portion of a component comprising water from a at least a portion of a component comprising $MgSO_4$ (aq). For example, in some embodiments, a component comprising $MgSO_4(aq)$ may be concentrated using systems and/or methods for separating water and/or crystallization. For example, in some embodiments, a component comprising $MgSO_4(aq)$ may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryod-desalination, or cryo-precipitation, or other separation method described herein, or other separation method known in the art, or any combination thereof. For example, in some embodiments, at least a portion of a component comprising $MgSO_4(aq)$ may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

(3) 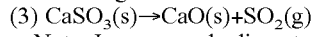$CaSO_3(s) \rightarrow CaO(s) + SO_2(g)$

Note: In some embodiments, a component comprising calcium sulfite may be decomposed or thermally decomposed or reacted to form, for example, including, but not limited to, one or more or any combination of the following: calcium oxide, or cement, or sulfur dioxide, or carbon dioxide, or water vapor, or calcium hydroxide, or a derivative described herein, or a derivative known in the art, or a derivative thereof, or any combination thereof.

Note: In some embodiments, a component comprising $CaO(s)$ may be reacted with water to produce a component comprising calcium hydroxide. In some embodiments, at least a portion of the heat generated may be employed or recovered to, for example, provide a portion of heat for or facilitate distillation or water removal or concentrating or crystallization of a solution, or other heat consuming process or step or application, or any combination thereof.

(4) 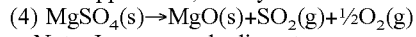$MgSO_4(s) \rightarrow MgO(s) + SO_2(g) + \frac{1}{2}O_2(g)$

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(5) React a component comprising magnesium oxide or magnesium hydroxide with a component comprising carbon dioxide or carbonate or carbon dioxide derivative.

$$MgO(s) + CO_2(g) \rightarrow MgCO_3(s)$$

$$MgO(s) + H_2O(l \text{ or } g) \rightarrow Mg(OH)_2(s \text{ or } aq)$$

$$Mg(OH)_2(s \text{ or } aq) + CO_2(g \text{ or } aq) \rightarrow MgCO_3(s) + H_2O(l \text{ or } g)$$

$$Mg(OH)_2(s \text{ or } aq) + (NH_4)_2CO_3(aq) \rightarrow MgCO_3(s) + NH_3(aq) + 2H_2O(aq)$$

$$Mg(OH)_2(s \text{ or } aq) + \text{Amine-Carbon dioxide}(aq) \rightarrow MgCO_3(s) + \text{Amine}(aq) + 2H_2O(aq)$$

Note: In some embodiments, a component comprising $CO_2$ may comprise, including but not limited to, one or more or any combination of the following: emissions gas, or point source gas, or air, or a $CO_2$ absorption solution, or a $CO_2$ capture solution, or any combination thereof.

(6) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

$$MgCO_3(s) + \text{Carboxylic Acid} \rightarrow Mg(\text{Carboxylate})(aq) + CO_2(g) + H_2O(l)$$

$$MgCO_3(s) + \text{Citric Acid} \rightarrow Mg(\text{Citrate})(aq) + CO_2(g) + H_2O(l)$$

$$MgCO_3(s) + \text{Acetic Acid} \rightarrow Mg(\text{Acetate})(aq) + CO_2(g) + H_2O(l)$$

$$MgCO_3(s) + \text{Formic Acid} \rightarrow Mg(\text{Formate})(aq) + CO_2(g) + H_2O(l)$$

$$MgCO_3(s) + \text{Propanoic Acid} \rightarrow Mg(\text{Propanoate})(aq) + CO_2(g) + H_2O(l)$$

Note: In some embodiments, at least a portion of the component comprising formed carbon dioxide or $CO_2(g)$ may comprise, for example, including, but not limited to, one or more or any combination of the following: high purity, or captured, or high concentration, or high partial pressure, or any combination thereof carbon dioxide.

(7) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$$MgO(s) + SO_2(g \text{ or } aq) \rightarrow MgSO_3(s \text{ or } aq)$$

$$Mg(OH)_2(s \text{ or } aq) + SO_2(g \text{ or } aq) \rightarrow MgSO_3(s \text{ or } aq) + H_2O(l)$$

$$MgCO_3(s) + SO_2(g \text{ or } aq) \rightarrow MgSO_3(s \text{ or } aq) + CO_2(g)$$

Note: Carbon dioxide or $CO_2(g)$ may comprise high purity, or captured, or high concentration, or high partial pressure, or any combination thereof carbon dioxide.

$$Mg(\text{Carboxylate})(aq) + SO_2(g \text{ or } aq) \rightarrow MgSO_3(s \text{ or } aq) + \text{Carboxylic Acid}(aq)$$

$$Mg(\text{Formate})(aq) + SO_2(g \text{ or } aq) \rightarrow MgSO_3(s \text{ or } aq) + \text{Formic Acid}(aq)$$

Note: $MgSO_3$(s or aq) may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

$$SO_2(g) + \tfrac{1}{2}O_2(g) + H_2O(l \text{ or } g) \rightarrow H_2SO_4(l \text{ or } g \text{ or } aq) \tag{8}$$

Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Example 2: Process for Producing Calcium Oxide or Calcium Hydroxide and Sulfuric Acid using Magnesium Citrate Intermediate. An embodiment may comprise one or more or any combination of the following:

(1) Magnesium Citrate(aq)+$CaSO_4$(s or aq)$\rightarrow MgSO_4$(aq)+Calcium Citrate(s)

Note: In some embodiments, a component comprising calcium citrate may be separated by a solid-liquid separation process, such as filtration, or centrifuge, or decanting, or settling, or clarifier, or other separation method described herein, or other separation method known in the art, or any combination thereof.

Note: If desired, in some embodiments, at least a portion of any residual dissolved calcium citrate may be separated by concentrating and/or precipitation, such as cooling precipitation or concentrating precipitation. Alternatively, or additionally, at least a portion of residual dissolved calcium in a form comprising calcium citrate may be removed or precipitated by reaction with at least a portion of a component comprising, including, but not limited to, one or more or any combination of the following: sulfur dioxide, or sulfite, or bisulfite, or sulfurous acid, or sulfide, or carbonate, or carbon dioxide, or bicarbonate, or a derivative thereof, or any combination thereof. In some embodiments, at least a portion of citric acid or citric acid species may be recovered or separated using, for example, nanofiltration.

Note: If desired, in some embodiments, a portion of residual dissolved calcium citrate may be recirculated or may comprise a portion of the 'water' or solvent water recirculated or employed to dissolve calcium sulfate or magnesium citrate.

(2) $MgSO_4(aq) \rightarrow MgSO_4(s)+Water$

Note: In some embodiments, a component comprising $MgSO_4(aq)$ may be concentrated and/or crystallized in a multi-step process. For example, in some embodiments, $MgSO_4(aq)$ may be concentrated using electrodialysis and/or reverse osmosis and/or nanofiltration and/or forward osmosis and/or osmotically assisted reverse osmosis and/or other separation method to, for example, separate at least a portion of a component comprising water from a at least a portion of a component comprising $MgSO_4$ (aq). For example, in some embodiments, a component comprising $MgSO_4(aq)$ may be concentrated using systems and/or methods for separating water and/or crystallization. For example, in some embodiments, a component comprising $MgSO_4(aq)$ may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryod-desalination, or cryo-precipitation, or other separation method described herein, or other separation method known in the art, or any combination thereof. For example, in some embodiments, at least a portion of a component comprising $MgSO_4(aq)$ may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

(3a) React a component comprising calcium citrate with a component comprising sulfur dioxide or sulfurous acid or a derivative thereof to form a component comprising calcium sulfite and a component comprising citric acid.

Calcium Citrate(s)+$SO_2$(g or aq)→$CaSO_3$(s)+Citric Acid(aq)

$SO_2(g)+H_2O(l) \rightarrow H_2SO_3(aq)$ $SO_2(g)$+Water(solvent)→$SO_2(aq)$

Note: Calcium sulfite may be separated by a solid-liquid separation.

(3b) React a component comprising calcium citrate with a component comprising sodium or alkali or ammonia or alkali-like or any combination thereof cation+sulfur dioxide anion salt, to form a component comprising calcium sulfite and an aqueous solution comprising a citrate salt. In some embodiments, a citrate salt, or a citrate salt solution, or a derivative thereof may comprise a valuable product. In some embodiments, In some embodiments, a citrate salt, or a citrate salt solution, or a derivative thereof may comprise an intermediate. In some embodiments, at least a portion of a solution comprising citrate salt may be reacted with a component comprising sulfur dioxide to form at least a portion of a sodium or alkali or ammonia or alkali-like or any combination thereof cation-sulfur dioxide or derivative thereof anion salt and a component comprising citric acid. In some embodiments, a component or solution comprising citric acid may be at least partially separated from the sodium or alkali or ammonia or alkali-like or any combination thereof cation-sulfur dioxide or derivative thereof salt using, for example, including, but not limited to, one or more or any combination of the following: nanofiltration, or reverse osmosis, or ultrafiltration, or electrodialysis, or cooling precipitation, or precipitation, or distillation, or crystallization, or melt crystallization, or membrane-based process, or a separation method described herein, or a separation method known in the art, or any combination thereof.

Calcium Citrate (s or aq)+$Na_2SO_3(aq) \rightarrow CaSO_3(s)$+Sodium Citrate(aq)

Sodium Citrate (aq)+$SO_2(g) \rightarrow Na_2SO_3(aq)$+Citric Acid

Separate at least a portion of Sodium+Sulfur Dioxide Salt from at least a portion of Citric Acid Note: Calcium sulfite may be separated by a solid-liquid separation.

(4) $CaSO_3(s) \rightarrow CaO(s)+SO_2(g)$

Note: In some embodiments, a component comprising calcium sulfite may be decomposed or thermally decomposed or reacted to form, for example, including, but not limited to, one or more or any combination of the following: calcium oxide, or cement, or sulfur dioxide, or carbon dioxide, or water vapor, or calcium hydroxide, or a derivative described herein, or a derivative known in the art, or a derivative thereof, or any combination thereof.

Note: In some embodiments, a component comprising CaO(s) may be reacted with water to produce a component comprising calcium hydroxide. In some embodiments, at least a portion of the heat generated may be employed or recovered to, for example, provide a portion of heat for or facilitate distillation or water removal or concentrating or crystallization of a solution, or other heat consuming process or step or application, or any combination thereof.

(4) $MgSO_4(s) \rightarrow MgO(s)+SO_2(g)+½O_2(g)$

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(5) React a component comprising magnesium oxide or magnesium hydroxide with a component comprising carbon dioxide or carbonate or carbon dioxide derivative.

$MgO(s)+CO_2(g) \rightarrow MgCO_3(s)$ $MgO(s)+H_2O(l \text{ or } g) \rightarrow Mg(OH)_2(s \text{ or } aq)$ $Mg(OH)_2(s \text{ or } aq)+CO_2(g \text{ or } aq) \rightarrow MgCO_3(s)+H_2O(l \text{ or } g)$ $Mg(OH)_2(s\ or\ aq)+(NH_4)_2CO_3(aq)\rightarrow MgCO_3(s)+NH_3(aq)+2H_2O(aq)$ $Mg(OH)_2(s\ or\ aq)+\text{Amine-Carbon dioxide}(aq)\rightarrow MgCO_3(s)\rightarrow \text{Amine}(aq)+2H_2O(aq)$ Note: In some embodiments, a component comprising $CO_2$ may comprise, including but not limited to, one or more or any combination of the following: emissions gas, or point source gas, or air, or a $CO_2$ absorption solution, or a $CO_2$ capture solution, or any combination thereof.

(6) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

$MgCO_3(s)+\text{Carboxylic Acid}\rightarrow Mg(\text{Carboxylate})(aq)+CO_2(g)+H_2O(l)$ $MgCO_3(s)+\text{Citric Acid}\rightarrow Mg(\text{Citrate})(aq)+CO_2(g)+H_2O(l)$ $MgCO_3(s)+\text{Acetic Acid}\rightarrow Mg(\text{Acetate})(aq)+CO_2(g)+H_2O(l)$ $MgCO_3(s)+\text{Formic Acid}\rightarrow Mg(\text{Formate})(aq)+CO_2(g)+H_2O(l)$ $MgCO_3(s)+\text{Propanoic Acid}\rightarrow Mg(\text{Propanoate})(aq)+CO_2(g)+H_2O(l)$ Note: In some embodiments, at least a portion of the component comprising formed carbon dioxide or $CO_2(g)$ may comprise, for example, including, but not limited to, one or more or any combination of the following: high purity, or captured, or high concentration, or high partial pressure, or any combination thereof carbon dioxide.

(7) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$MgO(s)+SO_2(g\ or\ aq)\rightarrow MgSO_3(s\ or\ aq)$ $Mg(OH)_2(s\ or\ aq)+SO_2(g\ or\ aq)\rightarrow MgSO_3(s\ or\ aq)+H_2O(l)$ $MgCO_3(s)+SO_2(g\ or\ aq)\rightarrow MgSO_3(s\ or\ aq)+CO_2(g)$ Note: Carbon dioxide or $CO_2(g)$ may comprise high purity, or captured, or high concentration, or high partial pressure, or any combination thereof carbon dioxide.

$Mg(\text{Carboxylate})(aq)+SO_2(g\ or\ aq)\rightarrow MgSO_3(s\ or\ aq)+\text{Carboxylic Acid}(aq)$ $Mg(\text{Formate})(aq)+SO_2(g\ or\ aq)\rightarrow MgSO_3(s\ or\ aq)+\text{Formic Acid}(aq)$ Note: $MgSO_3(s\ or\ aq)$ may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

(8) $SO_2(g)+\frac{1}{2}O_2(g)+H_2O(l\ or\ g)\rightarrow H_2SO_4(l\ or\ g\ or\ aq)$ Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Example 3: Process for producing calcium oxide, or magnesium oxide, or sulfuric acid, or a derivative thereof, or any combination thereof using magnesium+ calcium input, or dolomite, or dolostone, or any combination thereof. An embodiment may comprise one or more or any combination of the following:

(1) React a component comprising calcium sulfate, or a component comprising dolomite, or a component comprising a mixture of magnesium and calcium, or a component comprising a mixture of magnesium and calcium oxide or hydroxide, or a component comprising a mixture of magnesium carbonate and calcium carbonate, or a component comprising sulfur dioxide, or any combination thereof to form, for example, a component comprising at least a portion of calcium sulfite, or a component comprising magnesium sulfite, or a component comprising at least a portion of magnesium sulfate, or a component comprising carbon dioxide, or any combination thereof.

$CaSO_4+MgCO_3+CaCO_3+2SO_2\rightarrow 2CaSO_3+MgSO_4+CO_2$    a.

$CaSO_4+MgCO_3+CaCO_3+SO_2\rightarrow CaSO_3+CaCO_3+MgSO_4$    b.

(2) Decompose at least a portion of a solid comprising calcium sulfite to form at least a portion of a solid comprising calcium oxide or a derivative thereof and a component comprising sulfur dioxide or a derivative thereof.

$CaSO_3\rightarrow CaO+SO_2$    a.

$2CaSO_3\rightarrow 2CaO+2SO_2$    b.

(3) $MgSO_4(aq)\rightarrow MgSO_4(s)+\text{Water}$

Note: In some embodiments, a component comprising $MgSO_4(aq)$ may be concentrated and/or crystallized in a multi-step process. For example, in some embodiments, $MgSO_4(aq)$ may be concentrated using electrodialysis and/or reverse osmosis and/or nanofiltration and/or forward osmosis and/or osmotically assisted reverse osmosis and/or other separation method to, for example, separate at least a portion of a component comprising water from a at least a portion of a component comprising $MgSO_4(aq)$. For example, in some embodiments, a component comprising $MgSO_4(aq)$ may be concentrated using systems and/or methods for separating water and/or crystallization. For example, in some embodiments, a component comprising $MgSO_4(aq)$ may be concentrated using, including, but not limited to, one or more or any combination of the following: distillation, or membrane distillation, or mechanical vapor compression distillation, or mechanical vapor recompression distillation, or multi-effect distillation, or multistage flash distillation, or forward osmosis, or osmotically assisted reverse osmosis, or electrodialysis, or solventing-out, or anti-solvent precipitation, or cryod-desalination, or cryo-precipitation, or other separation method described herein, or other separation method known in the art, or any combination thereof. For example, in some embodiments, at least a portion of a component comprising $MgSO_4(aq)$ may be separated or crystallized by cooling crystallization or precipitation.

Note: In some embodiments, for example, at least a portion of heat from the exothermic formation or production of sulfuric acid or other potential exothermic reactions or steps may be employed to, for example, facilitate the separation of at least a portion of a component comprising water from a component comprising magnesium sulfate or the crystallization of magnesium sulfate.

(4) $MgSO_4(s) \rightarrow MgO(s) + SO_2(g) + \frac{1}{2}O_2(g)$

Note: In some embodiments, a component comprising magnesium sulfate may be decomposed or thermally decomposed to form a component comprising, for example, including, but not limited to, one or more or any combination of the following: magnesium oxide, or magnesium hydroxide, or magnesium oxide derivative, or magnesium oxide and sulfur trioxide, or sulfur dioxide, or diatomic oxygen, or gaseous oxygen, or sulfur oxide, or carbon dioxide, or carbon dioxide (due to, for example, the presence of a carbonaceous reducing agent), or water, or cement, or clinker, or silicate, or ferrite, or ferrate, or aluminate, or any combination thereof.

(5) React a component comprising magnesium oxide or magnesium hydroxide with a component comprising carbon dioxide or carbonate or carbon dioxide derivative.

$MgO(s) + CO_2(g) \rightarrow MgCO_3(s)$ $MgO(s) + H_2O(l \text{ or } g) \rightarrow Mg(OH)_2(s \text{ or } aq)$ $Mg(OH)_2(s \text{ or } aq) + CO_2(g \text{ or } aq) \rightarrow MgCO_3(s) + H_2O(l \text{ or } g)$ $Mg(OH)_2(s \text{ or } aq) + (NH_4)_2CO_3(aq) \rightarrow MgCO_3(s) + NH_3(aq) + 2H_2O(aq)$ $Mg(OH)_2(s \text{ or } aq) + \text{Amine-Carbon dioxide}(aq) \rightarrow MgCO_3(s) + \text{Amine}(aq) + 2H_2O(aq)$ Note: In some embodiments, a component comprising $CO_2$ may comprise, including but not limited to, one or more or any combination of the following: emissions gas, or point source gas, or air, or a $CO_2$ absorption solution, or a $CO_2$ capture solution, or any combination thereof.

(6) React a component comprising magnesium carbonate, or magnesium oxide, or magnesium hydroxide, or any combination thereof with a component comprising a carboxylic acid to form a component comprising magnesium carboxylate and/or a component comprising captured carbon dioxide.

$MgCO_3(s) + \text{Carboxylic Acid} \rightarrow Mg(\text{Carboxylate})(aq) + CO_2(g) + H_2O(l)$ $MgCO_3(s) + \text{Citric Acid} \rightarrow Mg(\text{Citrate})(aq) + CO_2(g) + H_2O(l)$ $MgCO_3(s) + \text{Acetic Acid} \rightarrow Mg(\text{Acetate})(aq) + CO_2(g) + H_2O(l)$ $MgCO_3(s) + \text{Formic Acid} \rightarrow Mg(\text{Formate})(aq) + CO_2(g) + H_2O(l)$ $MgCO_3(s) + \text{Propanoic Acid} \rightarrow Mg(\text{Propanoate})(aq) + CO_2(g) + H_2O(l)$ Note: In some embodiments, at least a portion of the component comprising formed carbon dioxide or $CO_2(g)$ may comprise, for example, including, but not limited to, one or more or any combination of the following: high purity, or captured, or high concentration, or high partial pressure, or any combination thereof carbon dioxide.

(7) React a component comprising magnesium oxide, or magnesium hydroxide, or magnesium carbonate, or magnesium-carboxylic acid, or magnesium citrate, or magnesium acetate, or a derivative thereof, or any combination thereof with a component comprising sulfur dioxide, or sulfurous acid, or any combination thereof to form magnesium sulfite and/or water, or carbon dioxide, or captured carbon dioxide, or carboxylic acid, or any combination thereof.

$MgO(s) + SO_2(g \text{ or } aq) \rightarrow MgSO_3(s \text{ or } aq)$ $Mg(OH)_2(s \text{ or } aq) + SO_2(g \text{ or } aq) \rightarrow MgSO_3(s \text{ or } aq) + H_2O(l)$ $MgCO_3(s) + SO_2(g \text{ or } aq) \rightarrow MgSO_3(s \text{ or } aq) + CO_2(g)$ Note: Carbon dioxide or $CO_2(g)$ may comprise high purity, or captured, or high concentration, or high partial pressure, or any combination thereof carbon dioxide.

$Mg(\text{Carboxylate})(aq) + SO_2(g \text{ or } aq) \rightarrow MgSO_3(s \text{ or } aq) + \text{Carboxylic Acid}(aq)$ $Mg(\text{Formate})(aq) + SO_2(g \text{ or } aq) \rightarrow MgSO_3(s \text{ or } aq) + \text{Formic Acid}(aq)$ Note: $MgSO_3$(s or aq) may be separated from carboxylic acid by, including, but not limited to, one or more or any combination of the following: precipitation, or cooling precipitation, or membrane based process, or nanofiltration, or reverse osmosis, or distillation, or membrane distillation, or multi-effect distillation, or electrodialysis, or solid-liquid separation, or filtration, or rinsing, or clarifying, or decanting, or centrifuge, or filter press, or any combination thereof.

(8) $SO_2(g) + \frac{1}{2}O_2(g) + H_2O(l \text{ or } g) \rightarrow H_2SO_4(l \text{ or } g \text{ or } aq)$ Note: React at least a portion of a component comprising sulfur dioxide, or sulfur trioxide, or sulfur, or oxygen, or hydrogen, or water to form at least a portion of a component comprising one or more or any combination of the following: sulfuric acid, or sulfur, or hydrogen, or steam.

Note: May generate heat which may be recovered and/or may be utilized in one or more or any combination of process steps or applications.

Note: Example 3 may enable the separation of at least a portion of magnesium and/or calcium.

Note: In some embodiments:
  c. MgSO4 may be separated from at least a portion of water using, for example, including, but not limited to, one or more or any combination of the following: distillation or freeze separation or crystallization
  d. MgSO4 may comprise a product, such as. magnesium sulfate or Epsom salt e. MgSO4 may be decomposed to form MgO and SO3 or H2SO4. SO3 or SO2+½O2 may be reacted, for example, with water to form H2SO4. MgO may be recycled in the process, if desired. Sulfur trioxide or sulfuric acid may comprise a valuable product.

Example Detailed Description

Some embodiments may pertain to the production of calcium oxide, or calcium hydroxide, or calcium sulfite, or calcium citrate, or calcium carboxylate, or any combination thereof. Some embodiments may pertain to the production of sulfuric acid, or sulfur dioxide, or sulfur, or any combination thereof. Some embodiments may pertain to the production of magnesium oxide, or magnesium sulfate, or magnesium hydroxide, or magnesium citrate, or magnesium carboxylate, or any combination thereof.

Some embodiments may comprise a double displacement or metathesis reaction between a salt comprising calcium sulfate and a salt comprising magnesium—'x' anion, which may form a salt comprising calcium—'x' anion and a salt comprising magnesium sulfate. In some embodiments, 'x' anion may comprise an anion which may enable or facilitate or participate in a double displacement reaction. In some embodiments, 'x' anion may comprise an anion which may enable or facilitate or participate in a double displacement reaction wherein at least a portion of 'x' anion may transfer from pairing with magnesium to pairing with calcium, or transfer from a salt comprising magnesium to a salt comprising calcium. In some embodiments, 'x' anion may form a salt with calcium which may be less soluble in water than calcium sulfate. In some embodiments, 'x' anion may form a salt with calcium which may be less soluble in water than a salt comprising 'x' anion with magnesium. In some embodiments, for example, 'x' anion may comprise, including, but not limited to, one or more or any combination of the following: sulfite, citric acid, or sulfur dioxide derivative, or bisulfite, or citrate.

In some embodiments, a salt comprising magnesium—'x' anion may be mixed with a salt comprising calcium sulfate in a solution, or solid-liquid slurry, or any combination thereof. For example, in some embodiments, magnesium—'x' anion may be at least partially dissolved in water and/or calcium sulfate may be at least a partially dissolved in water and/or the solutions may be mixed to form at least a portion of a solution comprising magnesium sulfate and/or at least a portion of a solid or solution comprising calcium—'x' anion. For example, in some embodiments, a solid or solid-liquid slurry comprising magnesium—'x' anion may be mixed with a solid or solid-liquid slurry comprising calcium sulfate. For example, in some embodiments, a solid or solid-liquid slurry comprising magnesium—'x' anion may be mixed with a solid or solid-liquid slurry comprising calcium sulfate under conditions to form at least a portion of a solid or solution or slurry comprising calcium—'x' anion and a solution comprising magnesium sulfate. For example, in some embodiments, a solid or solid-liquid slurry comprising magnesium—'x' anion may be mixed with a solid or solid-liquid slurry comprising calcium sulfate under conditions to form at least a portion of a solid comprising calcium—'x' anion and a solution comprising magnesium sulfate. For example, in some embodiments, a solid or solid-liquid slurry comprising magnesium oxide, or magnesium hydroxide, or magnesium carbonate may be mixed with a solid or solid-liquid slurry comprising calcium sulfate in the presence of or with contact or reaction with a gas or fluid or solution comprising a derivative or acid gas derivative or acidic solution derivative of 'x' anion. For example, in some embodiments, a solid or solid-liquid slurry comprising magnesium oxide, or magnesium hydroxide, or magnesium carbonate may be mixed with a solid or solid-liquid slurry comprising calcium sulfate in the presence of or with contact or reaction with a gas or fluid or solution comprising a derivative or acid gas derivative or acidic solution derivative of 'x' anion under conditions to form at least a portion of a solid comprising calcium—'x' anion and a solution comprising magnesium sulfate. In some embodiments, at least a portion of a solid comprising calcium—'x' anion may be separated from a solution comprising magnesium sulfate using, for example, a solid-liquid separation. In some embodiments, at least a portion of solid or solution comprising magnesium may be separated from at least a portion of solid comprising calcium—'x' anion by, for example, including, but not limited to, one or more or any combination of the following: rinsing, or density based separation, or centrifuge, or filtration, or chemical separation, or any combination thereof. In some embodiments, a component comprising calcium—'x' anion may comprise a valuable product. In some embodiments, a component comprising calcium—'x' anion may comprise an intermediate. In some embodiments, a component comprising calcium—'x' anion may be decomposed to form at least a portion of a component comprising calcium oxide, or calcium hydroxide, or calcium carbonate, or any combination thereof and/or a component comprising a derivative of 'x' anion, such as, for example, an acid gas derivative of 'x' anion. In some embodiments, a component comprising calcium oxide, or calcium hydroxide, or calcium carbonate, or any combination thereof may comprise a valuable product. In some embodiments, a solution comprising magnesium sulfate may comprise a valuable product. In some embodiments, a solution comprising magnesium sulfate may comprise an intermediate. In some embodiments, a solution comprising magnesium sulfate may be concentrated, or crystallized, or any combination thereof to form, for example, at least a portion of a brine comprising magnesium sulfate, or at least a portion of a solid or crystal comprising magnesium sulfate, or any combination thereof. For example, in some embodiments, a solution comprising magnesium sulfate may be concentrated or crystallized using, including, but not limited to, one or more or any combination of the following: reverse osmosis (RO), or nanofiltration (NF), or diffusion, or selective diffusion, or non-ionic selective diffusion, or electrodialysis (ED), or electro-deionization, or Ion Concentration Polarization (ICP), or membrane-based process, or forward osmosis, or high pressure reverse osmosis (HPRO), or osmotically assisted reverse osmosis, or monovalent selective electrodialysis, or ion selective separation, or vapor separation, or carrier gas separation, or carrier gas extraction, or membrane distillation, or stripping gas, or multi-effect distillation (MED), or multi-stage flash distillation (MSF), or mechanical vapor compression distillation (MVC), or extraction distillation, or conventional distillation, or column, or contactor, or membrane contactor, or countercurrent separation, or countercurrent exchange, or ion exchange, or ion exchange resin, or adsorption, or absorption, or freeze separation, or melt crystallization, or cryogenic separation, or forward osmosis (FO), or osmotically assisted reverse osmosis, or methods for separation known described herein, or methods for separation known in the art. In some embodiments, for example, a solution comprising magnesium sulfate may be separated into at least a portion of water and/or at least a portion of a solid or crystal comprising magnesium sulfate. In some embodiments, magnesium sulfate may be decomposed, for example, thermally decomposed, to form at least a portion of magnesium oxide and/or at least a portion of sulfur dioxide, or sulfur trioxide, or diatomic oxygen, or any combination thereof. In some embodiments, at least a portion of magnesium sulfate, or calcium—'x' anion, or any combination thereof may be decomposed using, for example, including, but not limited to, one or more or any combination of the following: a kiln, or a calciner, or a rotary kiln, or an direct kiln, or an indirect kiln, or a heat recovery kiln, or an energy efficient kiln, or a kiln powered by combustion, or a kiln powered by electricity, or a batch kiln, or a semi-batch kiln, or a continuous kiln, or a kiln designed to recovery at least a portion of any sulfur dioxide or sulfur trioxide or diatomic oxygen which may be formed. In some embodiments, at least a portion of a formed component comprising sulfur dioxide, or sulfur trioxide, or diatomic oxygen, or sulfur, or any combination thereof may be transformed into, for example, sulfuric acid, by, for example, a reaction with water. In some embodiments, at least a portion of a formed component comprising sulfur dioxide, or sulfur trioxide, or diatomic oxygen, or sulfur, or any combination thereof may be transformed into, for example, sulfur, by, for example, a reaction with hydrogen sulfide. In some embodiments, at least a portion of heat may be recovered from one or more or any combination of process steps. For example, in some embodiments, at least a portion of heat may be recovered from the reaction or process to form sulfuric acid from sulfur dioxide, or sulfur trioxide, or diatomic oxygen, or water, or any combination thereof, which may be exothermic. For example, in some embodiments, heat recovered from one or more process steps may be employed to at least partially supply heat to power or drive at least a portion of the separation of water from a solution comprising magnesium sulfate, or the formation of crystals or solid comprising magnesium sulfate, or the drying or dehydration of at least a portion of a solid comprising magnesium sulfate, or any combination thereof. In some embodiments, sulfuric acid, or sulfur, or any combination thereof may comprise a valuable product. In some embodiments, at least a portion of a component comprising magnesium oxide may comprise a valuable product. In some embodiments, at least a portion of a component comprising magnesium oxide may comprise an intermediate. For example, in some embodiments, at least a portion of a component comprising magnesium oxide may be reacted with water to form magnesium hydroxide. For example, in some embodiments, at least a portion of a component comprising magnesium oxide or magnesium hydroxide may be transferred to a reaction of calcium sulfate and/or 'x' anion derivative acid or acid gas. For example, in some embodiments, at least a portion of a component comprising magnesium oxide may be utilized as a productive or useful intermediate and/or a component comprising magnesium oxide may be utilized to conduct additional or auxiliary beneficial or valuable reactions, or separations, or activities, or any combination thereof which may be beneficial. For example, in some embodiments, at least a portion of a component comprising magnesium oxide or magnesium hydroxide may be reacted with a gas comprising carbon dioxide to form at least a portion of a component comprising magnesium carbonate, or magnesium bicarbonate, or any combination thereof, which may enable or comprising separating or capturing carbon dioxide. For example, in some embodiments, a component comprising magnesium carbonate may be reacted with an 'x' anion derivative acid or acid gas to form at least a portion of a component comprising magnesium—'x' anion salt and/or at least a portion of carbon dioxide. For example, in some embodiments, a component comprising magnesium carbonate may be reacted with an 'x' anion derivative acid or acid gas to form at least a portion of a component comprising magnesium—'x' anion salt and/or at least a portion of carbon dioxide, wherein at least a portion of said formed carbon dioxide may comprise captured, or high purity, or high pressure, or any combination thereof carbon dioxide. For example, in some embodiments, utilizing at least a portion of magnesium oxide or magnesium hydroxide in the separation or capturing of carbon dioxide may minimally impact the energy consumption of one or more or any combination of embodiments, while increasing the value generated or creating addition substantial commercial value for one or more or any combination of embodiments.

In some embodiments, magnesium may comprise an intermediate. For example, in some embodiments, magnesium may be employed as a carrier of sulfate. For example, in some embodiments, at least a portion of sulfate may transfer from bonding or pairing with calcium to a bonding or pairing with magnesium. For example, in some embodiments, at least a portion of sulfate may transfer from bonding or pairing with calcium to a bonding or pairing with magnesium, wherein a solid comprising magnesium sulfate may be decomposed to form a solid comprising magnesium oxide and a gas or fluid comprising sulfur dioxide, or sulfur trioxide, or diatomic oxygen, or any combination thereof, which may be reacted to form at least a portion of sulfuric acid, or sulfur, or any combination thereof. In some embodiments, a solid comprising magnesium sulfate may possess a lower decomposition temperature than a solid comprising calcium sulfate, and/or a solid comprising magnesium sulfate may require less energy to be decomposed than a solid comprising calcium sulfate, and/or the decomposition of a solid comprising magnesium sulfate may form at least a portion of a solid comprising magnesium oxide which may comprise at least a portion of a reactive form of magnesium oxide and/or non-sintered form of magnesium oxide. In some embodiments, magnesium may also be utilized as an intermediate to transfer an 'x' anion to calcium wherein the calcium 'x' anion may possess a lower decomposition temperature or energy than calcium sulfate, or a higher value than calcium sulfate, or any combination thereof. For example, in some embodiments, a calcium salt comprising an 'x' anion comprising sulfite, such as a solid comprising calcium sulfite, may possess a lower decomposition temperature than calcium sulfate and/or may be decomposed to form at least a portion of a solid comprising calcium oxide. For example, in some embodiments, a calcium salt comprising an 'x' anion comprising citrate, such as a solid comprising calcium citrate, may be more valuable than a solid comprising calcium sulfate. For example, in some embodiments, a component comprising magnesium comprising an 'x' anion comprising carbonate, or sesquicarbonate, or bicarbontate, or any combination thereof may react with a component comprising calcium sulfate to form at least a portion of a component comprising calcium carbonate, or sesquicarbonate, or bicarbonate, or any combination thereof and a component comprising magnesium sulfate.

In some embodiments, at least a portion of magnesium may be employed as an intermediate or agent in the separation or capturing of an acid gas. For example, in some embodiments, a solid or solution or slurry comprising magnesium oxide or magnesium hydroxide may be reacted with a least a portion of an acid gas, such as an acid gas comprising carbon dioxide, to form at least a portion of a solid or solution or slurry comprising magnesium carbonate, or sesquicarbonate, or bicarbonate, or any combination thereof. In some embodiments, for example, an gas or fluid or solution or material or component or any combination thereof comprising 'x' anion derivative, which may have a stronger pKa than carbonic acid, such as sulfur dioxide, or sulfurous acid, or citric acid, or a carboxylic acid, or any combination thereof, may be reacted with at least a portion of a solid or solution or slurry comprising magnesium carbonate, or sesquicarbonate, or bicarbonate, or any combination thereof to form at least a portion of a component comprising magnesium 'x'-anion and/or a gas or fluid comprising carbon dioxide, such as a component comprising carbon dioxide comprising high pressure, or high concentration, or high purity, or high partial pressure, or captured, or any combination thereof.

In some embodiments, a component comprising magnesium may comprise an input. For example, in some embodiments, a component comprising magnesium may comprise an input and/or a component comprising magnesium may comprise an output. For example, in some embodiments, a component comprising magnesium may comprise an input and/or a component comprising, for example, including, but not limited to, one or more or any combination of the following: magnesium sulfate, or magnesium sulfide, or magnesium sulfite, or magnesium chloride, or magnesium halide, or magnesium carboxylate, or magnesium citrate, or magnesium oxide, or magnesium hydroxide, or magnesium metal, or magnesium alloy, or any combination thereof may comprise an output. In some embodiments, for example, an input comprising magnesium may comprise, for example, including, but not limited to, one or more or any combination of the following: magnesium carbonate, or dolomite, or dolostone, or a mineral comprising calcium and magnesium, or magnesium oxide, or magnesium hydroxide.

In some embodiments, at least a portion of a component comprising magnesium may be separated or further separated from at least a portion of a component comprising calcium. In some embodiments, at least a portion of a component comprising calcium may be separated or further separated from at least a portion of a component comprising magnesium. For example, in some embodiments, a solid comprising calcium sulfite may further comprise a portion of magnesium sulfate, or magnesium sulfite, or magnesium hydroxide, or magnesium oxide, or any combination thereof, and/or it may be desirable to separate or further separate at least a portion of a salt comprising magnesium from a salt comprising calcium, or a salt comprising calcium from a salt comprising magnesium, or any combination thereof. For example, in some embodiments, a solution or solid or slurry or any combination thereof comprising magnesium sulfate may further comprise a portion of calcium sulfate, or calcium sulfite, or calcium hydroxide, or calcium oxide, or any combination thereof, and/or it may be desirable to separate or further separate at least a portion of a salt comprising magnesium from a salt comprising calcium, or a salt comprising calcium from a salt comprising magnesium, or any combination thereof. In some embodiments, at least a portion of impurities may be present in one or more or any combination of inputs, or reactants, or products, or intermediates, or materials, or any combination thereof and/or it may be desirable to separate at least a portion of impurities. In some embodiments, at least a portion of said separations may be conducted using, including, but not limited to, one or more or any combination of the following: separation methods described herein, or separation methods described in the art. For example, in some embodiments, at least a portion of separation may comprise, including, but not limited to, one or more or any combination of the following: rinsing, or nanofiltration, or membrane-based process, or electrodialysis, or ion exchange, or density-based separation, or particle size based separation, or filtration, or decanting, or centrifuge, or reverse osmosis, or forward osmosis, or precipitation, or freeze separation, or melt crystallization, or phase change, or solubility-based separation, or a separation described herein, or a separation in the art, any combination thereof.

In some embodiments, at least a portion of magnesium may be present in at least a portion of a component comprising calcium. In some embodiments, at least a portion of calcium may be present in a component comprising magnesium. In some embodiments, for example, the present of at least a portion of calcium in a component comprising magnesium may be tolerable or desirable in a product or output for an application. In some embodiments, for example, the present of at least a portion of magnesium in a component comprising calcium may be tolerable or desirable in a product or output for an application. For example, in some embodiments, if a component comprising calcium comprises a building material, such as calcium oxide, or calcium silicate, or calcium oxide derivative, or calcium hydroxide derivative, or cement, or concrete, the presence of a portion of magnesium may be tolerable or desirable in some applications. For example, in some embodiments, if a component comprising magnesium comprises an intermediate, the presence of a portion of calcium may be tolerable or desirable in some applications.

In some embodiments, a component comprising magnesium, or a component comprising 'x' anion derivative, or a component comprising calcium sulfate, or any combination thereof may be at least partially reacted in a manner to form at least a portion of a component comprising magnesium sulfate and/or a component comprising calcium 'x'-anion. For example, in some embodiments, the manner which a component comprising magnesium, or a component comprising 'x' anion derivative, or a component comprising calcium sulfate, or any combination thereof may be reacted may vary depending on the 'x'-anion, or the application, or the desired product attributes, or the desired process throughput, or the desired process footprint or sizing, or any combination thereof.

For example, in some embodiments, the reaction may operate in a manner which may be batch, or semi-batch, or continuous.

For example, in some embodiments, a component comprising magnesium may be reacted with a component comprising 'x'-anion or 'x'-anion derivative to form at least a portion of a component comprising magnesium 'x'-anion, and/or at least a portion of the component comprising magnesium 'x'-anion may be reacted with a component comprising calcium or a component comprising calcium sulfate, to form, for example, at least a portion of a component comprising calcium 'x'-anion and/or at least a portion of a component comprising magnesium sulfate.

For example, in some embodiments, a component comprising magnesium may be mixed with a component comprising calcium or a component comprising calcium sulfate, and/or said mixture may be reacted with a component comprising 'x'-anion or 'x'-anion derivative to form, for example, at least a portion of a component comprising calcium 'x'-anion and/or at least a portion of a component comprising magnesium sulfate.

In some embodiments, a reaction may be facilitated using, for example, including, but not limited to, a catalyst, or a solubility, or temperature, or pressure, or surfactant, or emulsifier, or a mixer, or any combination thereof. For example, in some embodiments, a solvent comprising water may comprise a facilitator. For example, in some embodiments, a solvent comprising water, or an organic solvent, or any combination thereof may comprise a facilitator. For example, in some embodiments, a component which increases the solubility, or reactivity, or any combination thereof of calcium sulfate, or magnesium 'x'-anion, or other reagent, or other chemical present, or other component present, or any combination thereof may be employed and/or may include, but may not be limited to, one or more or any combination of the following: water, or an organic solvent, or 'x'-anion derivative, or excess 'x'-anion derivative, or stoichiometric excess 'x'-anion derivative, or an 'x'-anion salt, or a salt which increases the solubility of calcium sulfate, or an acid, or a base, or a pH which increases the solubility or reactivity of calcium sulfate, or a pH adjuster which increases the solubility or reactivity of calcium sulfate, or the addition of an acidic chemical, or the addition of a basic chemical.

For example, in some embodiments, a reaction may be facilitated by providing a stoichiometric excess of 'x'-anion, or 'x'-anion derivative. For example, in some embodiments, a reaction may be facilitated by providing a stoichiometric excess of sulfur dioxide, or sulfurous acid, or any combination thereof before, or during, or after, or any combination thereof the reaction. For example, in some embodiments, a reaction may be facilitated by providing a stoichiometric excess of carboxylic acid, or citric acid, or any combination thereof before, or during, or after, or any combination thereof the reaction.

For example, in some embodiments, a reaction may be facilitated by providing a stoichiometric deficit of 'x'-anion, or 'x'-anion derivative. For example, in some embodiments, a reaction may be facilitated by providing a stoichiometric deficit of sulfur dioxide, or sulfurous acid, or any combination thereof before, or during, or after, or any combination thereof the reaction. For example, in some embodiments, a reaction may be facilitated by providing a stoichiometric deficit of carboxylic acid, or citric acid, or any combination thereof before, or during, or after, or any combination thereof the reaction.

For example, in some embodiments, at least a portion of a reaction may be facilitated electrochemically, using, for example, including, but not limited to, one or more or any combination of the following: electrodialysis, or electrodialysis metathesis, or bipolar electrodialysis, or Ion Concentration Polarization (ICP), or any combination thereof.

In some embodiments, a component comprising calcium 'x'-anion may possess a low solubility in water. For example, in some embodiments, a component comprising calcium 'x'-anion may possess a solubility in water less than the solubility of calcium sulfate.

In some embodiments, a solid comprising calcium 'x'-anion may be at least partially separated from a solution. For example, in some embodiments, a solid comprising calcium 'x'-anion may be at least partially separated from a solution using, for example, a solid-liquid separation methods, such as, including, but not limited to, one or more or any combination of the following: settling, or clarifying, or clarification, or decanting, or gravitational separation, or density based separation, or particle size based separation, or filtration, or filter press, or rotary filter, or centrifuge, or a solid-liquid separation methods described herein, or a solid-liquid separation methods known in the art.

In some embodiments, a solid comprising calcium 'x'-anion may be further separated or purified. For example, in some embodiments, at least a portion of any residual solids or solution comprising calcium sulfate, or magnesium 'x'-anion, or calcium, or magnesium, or impurities, or any combination thereof may be separated from at least a portion of the solid comprising calcium 'x'-anion. For example, in some embodiments, at least a portion of a solid comprising calcium 'x'-anion may be rinsed to remove at least a portion of, for example, any entrenched or wetted dissolved impurities, or components comprising magnesium, or any combination thereof. For example, in some embodiments, solids may be pressed, or mechanically pressed, or dried, or decomposed, or reacted, or any combination thereof.

In some embodiments, it may be desirable to handle components comprising 'x'-anions or other anions in a manner to ensure or enable high yield or beneficial operation or desirable operation. For example, in some embodiments, an 'x'-anion may comprise sulfur dioxide, or sulfurous acid, or sulfite, or bisulfite, or sesquisulfite, or a derivative thereof, or any combination thereof, which may be susceptible to or may react with diatomic oxygen under certain conditions. In some embodiments, it may be desirable to ensure the transfer and/or handling and/or operations comprising at least a portion of sulfur dioxide, or sulfurous acid, or sulfite, or bisulfite, or sesquisulfite, or a derivative thereof to be conducted in a manner which may minimize or reduce potential exposure to diatomic oxygen, or minimize or reduce potential reaction with diatomic oxygen, or any combination thereof. For example, in some embodiments, it may be desirable to employ an inert gas atmosphere, or a positive pressure inert gas atmosphere, or a closed atmosphere, or a reduced diatomic oxygen concentration atmosphere, or any combination thereof. For example, in some embodiments, an inert gas atmosphere may comprise, including, but not limited to, one or more or any combination of the following: nitrogen gas, or argon gas, or carbon dioxide, or hydrocarbon, or fluorocarbon.

In some embodiments, a component comprising calcium 'x'-anion may comprise a product. In some embodiments, a component comprising calcium 'x'-anion may comprise an intermediate.

In some embodiments, a component comprising calcium 'x'-anion may be reacted, or decomposed, or any combination thereof in a manner to produce at least a portion of a component comprising calcium oxide, or calcium hydroxide, or calcium sulfide, or calcium carbonate, or calcium silicate, or calcium aluminate, or calcium ferrite, or calcium ferrate, or cement, or clinker, or concrete, or a derivative thereof, any combination thereof and/or at least a portion of 'x'-anion, or 'x'-anion derivative, or any combination thereof.

For example, in some embodiments, a component comprising calcium 'x'-anion may be thermally decomposed to produce at least a portion of a component comprising calcium oxide, or calcium hydroxide, or calcium sulfide, or calcium carbonate, or calcium silicate, or calcium aluminate, or calcium ferrite, or calcium ferrate, or cement, or clinker, or concrete, or a derivative thereof, any combination thereof and/or at least a portion of 'x'-anion, or 'x'-anion derivative, or any combination thereof. For example, in some embodiments, thermal decomposition may be conducted using, for example, including, but not limited to, one or more or any combination of the following: a kiln, or a method for heating or thermal decomposition described herein, or a method for heating or thermal decomposition known in the art. In some embodiments, it may be desirable to dry, or dehydrate, or preheat, or any combination thereof at least a portion of the component comprising calcium 'x'-anion before or during the thermal decomposition. In some embodiments, at least a portion of a component comprising calcium oxide may be formed from the decomposition of a component comprising calcium 'x'-anion, and/or it may be desirable to react at least a portion of a component comprising calcium oxide with water to form at least a portion of a component comprising calcium hydroxide and/or heat. In some embodiments, for example, at least a portion of the dehydration or drying of at least a portion of the component comprising calcium 'x'-anion, or a component comprising magnesium sulfate, or any combination thereof before or during a thermal decomposition may be facilitated by the desiccation, or heat, or any combination thereof provided by, or enabled by, or facilitated by, or any combination thereof a reaction of a component comprising calcium oxide with a component comprising water to form at least a portion of a component comprising calcium hydroxide. In some embodiments, at least a portion of 'x'-anion or 'x'-anion derivative may form from the decomposition of at least a portion of calcium 'x'-anion. In some embodiments, at least a portion of said 'x'-anion or 'x'-anion derivative formed may be separated, or captured, or stored, or used, or reacted, or recovered, or recycled, or any combination thereof and/or at least a portion of the 'x'-anion or 'x'-anion derivative may be transferred to one or more or any combination of process steps or reactions which may employ 'x'-anion or 'x'-anion derivative in one or more or any combination of embodiments. For example, in some embodiments, a component comprising calcium 'x'-anion may comprise, for example, a component comprising calcium sulfite, wherein the 'x'-anion may comprise sulfite, and/or said component comprising calcium sulfite may be thermally decomposed to form at least a portion of a component comprising calcium oxide or a derivative thereof and/or at least a portion of a component comprising sulfur dioxide, wherein sulfur dioxide may comprise an 'x'-anion derivative. For example, in some embodiments, at least a portion of said component comprising sulfur dioxide formed from the decomposition of a component comprising calcium sulfite may be employed in a reaction with a component comprising magnesium, such as, for example. magnesium oxide, magnesium hydroxide, or magnesium carbonate, or any combination thereof, to form, for example, at least a portion of a component comprising magnesium sulfite, or magnesium bisulfite, or magnesium sesquisulfite, or magnesium+sulfur dioxide, or any combination thereof.

In some embodiments, a component comprising calcium 'x'-anion may be reacted with a component comprising an acid or acid anion which may be stronger than 'x'-anion, such as a 'y'-anion or 'y'-anion derivative, to form a component comprising calcium 'y'-anion salt and a component comprising 'x'-anion, 'x'-anion derivative, or 'x'-anion derivative acid, or any combination thereof. For example, in some embodiments, a component comprising calcium 'x'-anion may comprise calcium carbonate, wherein the 'x'-anion may comprise carbonate, or carbon dioxide, or a derivative thereof, and the 'y'-anion may comprise a carboxylic acid, or a carboxylate, or a sulfurous acid, or sulfur dioxide, or any combination thereof, wherein, for example, the reaction may form at least a portion of a component comprising calcium 'y'-anion comprising a component comprising calcium carboxylate, or calcium citrate, or calcium sulfite, or any combination thereof and/or an 'x'-anion derivative comprising carbon dioxide or captured carbon dioxide. For example, in some embodiments, a component comprising calcium 'x'-anion may comprise calcium citrate, wherein the 'x'-anion may comprise citrate or citric acid, or a derivative thereof, and the 'y'-anion may comprise sulfurous acid, or sulfur dioxide, or sulfite, or bisulfite, or sesquisulfite, or any combination thereof, wherein, for example, the reaction may form at least a portion of a component comprising calcium 'y'-anion comprising a component comprising calcium sulfite, or calcium bisulfite, or calcium sesquisulfite, or any combination thereof and/or an 'x'-anion derivative comprising citric acid or citrate. In some embodiments, the component comprising calcium 'y'-anion salt may be at least partially separated and/or decomposed to form, for example, including, but not limited to, one or more or any combination of the following: calcium oxide, or calcium hydroxide, or calcium sulfide, or calcium carbonate, or calcium silicate, or calcium aluminate, or calcium ferrite, or calcium ferrate, or cement, or clinker, or concrete, or a derivative thereof. In some embodiments, for example, the decomposition of at least a portion of a component comprising calcium 'y'-anion salt may form at least a portion of 'y'-anion or 'y'-anion derivative, such as, for example, sulfur dioxide, or sulfurous acid, or a derivative thereof. In some embodiments, for example, at least a portion of said 'y'-anion or 'y'-anion derivative may be recycled, or reused, or recirculated, or transferred, or employed, or any combination thereof to a reaction step or process step which may employ 'y'-anion or 'y'-anion derivative. In some embodiments, for example, at least a portion of said 'x'-anion or 'x'-anion derivative may be recycled, or reused, or recirculated, or transferred, or employed, or any combination thereof to a reaction step or process step which may employ 'x'-anion or 'x'-anion derivative.

In some embodiments, at least a portion of a component comprising magnesium sulfate may be at least partially separated. In some embodiments, a component comprising magnesium sulfate may comprise a product. In some embodiments, a component comprising magnesium sulfate may comprise an intermediate. In some embodiments, for example, a solution comprising magnesium sulfate may be separated to form at least a portion of a solid comprising magnesium sulfate and a solution or liquid or fluid comprising water. For example, in some embodiments, separating at least a portion of a component comprising magnesium sulfate may be conducted in one or more steps, or multiple steps, or any combination thereof, if desired, and/or may employ one or more or any combination of separation methods described herein, or separation methods described in the art, or any combination thereof. For example, in some embodiments, a solution comprising magnesium sulfate may be concentrated using, for example, including, but not limited to, one or more or any combination of the following: nanofiltration, or reverse osmosis, or high pressure nanofiltration, or high pressure reverse osmosis, or osmotically assisted reverse osmosis, or forward osmosis, or any combination thereof to a concentration of, for example, at least one or more or any combination of the following: 25 g/L, or 50 g/L, or 75 g/L, or 100 g/L, or 125 g/L, or 150 g/L, or 175 g/L, or 200 g/L. For example, in some embodiments, a concentrated solution comprising magnesium sulfate may be further concentrated and/or crystallized using, for example, including, but not limited to, one or more or any combination of the following: distillation, or MVC distillation, or MED distillation, or freeze separation, or MSF distillation, or membrane distillation, or crystallizer, or drying, or dehydrator, or a separation method described herein, or a separation method known in the art. In some embodiments, a solid comprising magnesium sulfate may be at least partially separated using, for example, a solid-liquid separation method, and/or may be further separated using, for example, including, but not limited to, one or more or any combination of the following: a filter press, or drier, or stripping gas, or desiccant, or heating, or dehydrator, or separation method described herein, or separation method known in the art.

In some embodiments, a solid comprising magnesium sulfate may be reacted to form a new chemical.

In some embodiments, a solid comprising magnesium sulfate may be thermally decomposed to form at least a portion of a component comprising magnesium oxide or a derivative of magnesium oxide and/or at least a portion of a component comprising sulfur dioxide, or sulfur trioxide, or diatomic oxygen, or sulfuric acid, or a derivative thereof. In some embodiments, at least a portion of a component comprising magnesium oxide may be formed from the decomposition of a component comprising magnesium sulfate, and/or it may be desirable to react at least a portion of a component comprising magnesium oxide with water to form at least a portion of a component comprising magnesium hydroxide and/or heat. In some embodiments, for example, at least a portion of the dehydration or drying of at least a portion of the component comprising magnesium sulfate, or calcium 'x'-anion, or any combination thereof before or during the thermal decomposition may be facilitated by the desiccation, or heat, or any combination thereof provided by, or enabled by, or facilitated by, or any combination thereof a reaction of a component comprising magnesium oxide with a component comprising water to form at least a portion of a component comprising magnesium hydroxide. In some embodiments, a component comprising magnesium oxide, or magnesium hydroxide, or any combination thereof may comprise a product. In some embodiments, a component comprising magnesium oxide, or magnesium hydroxide, or any combination thereof may comprise an intermediate. In some embodiments, at least a portion of a component comprising magnesium oxide, or magnesium hydroxide, or any combination thereof may be transferred to a reaction with 'x'-anion, or 'x'-anion derivative, or any combination thereof to form at least a portion of a component comprising magnesium 'x'-anion.

In some embodiments, a component comprising magnesium oxide, or magnesium hydroxide, or any combination thereof may be reacted with a fluid or component comprising an acid gas, such as, including, but not limited to, one or more or any combination of the following: carbon dioxide, or hydrogen sulfite, or sulfur dioxide, or other acid gas described herein, or other acid gas known in the art. For example, in some embodiments, said acid gas may comprise an 'x'-anion, or an 'x'-anion derivative, or any combination thereof. For example, in some embodiments, component comprising magnesium oxide, or magnesium hydroxide, or any combination thereof may be reacted with a fluid or component comprising an acid gas and/or may form at least a portion of a component comprising magnesium-acid gas anion. For example, in some embodiments, a component comprising magnesium-acid gas anion may comprise magnesium 'x'-anion. For example, in some embodiments, a component comprising magnesium-acid gas anion may be reacted with a component comprising 'x'-anion or 'x'-anion derivative to form at least a portion of a component comprising magnesium 'x'-anion and an acid gas, wherein the acid gas may comprise captured, or high partial pressure, or high purity acid gas, if desired. For example, in some embodiments, a component comprising magnesium-acid gas anion may be reacted with a component comprising 'x'-anion or 'x'-anion derivative to form at least a portion of a component comprising magnesium 'x'-anion and an acid gas, wherein the 'x'-anion derivative may comprise a pKa or acid strength stronger than the acid gas. For example, in some embodiments, an acid gas comprising carbon dioxide may be reacted with a component comprising magnesium hydroxide, which may form a component comprising magnesium carbonate, or magnesium bicarbonate, or magnesium sesquicarbonate, or any combination thereof and/or at least a portion of said component comprising magnesium carbonate, or magnesium bicarbonate, or magnesium sesquicarbonate, or any combination thereof may be reacted with an 'x'-anion or 'x'-anion derivative comprising a carboxylic acid, or sulfur dioxide, or a derivative thereof, or any combination thereof to form at least a portion of a component comprising magnesium carboxylate, or magnesium citrate, or magnesium sulfite, or magnesium bisulfite, or carboxylic acid, or magnesium sesquisulfite, or any combination thereof and/or a component comprising carbon dioxide comprising captured carbon dioxide, or high partial pressure carbon dioxide, or relatively high partial pressure carbon dioxide, or a gas stream comprising a partial pressure of carbon dioxide greater than the partial pressure of carbon dioxide in a feed stream or original stream, or high purity carbon dioxide, or any combination thereof.

In some embodiments, at least a portion of a component comprising magnesium sulfate may be decomposed to form at least a portion of a component comprising sulfur dioxide, or sulfur trioxide, or diatomic oxygen, or any combination thereof and/or it may be desirable to react at least a portion of said component comprising sulfur dioxide, or sulfur trioxide, or diatomic oxygen, or any combination thereof to form at least a portion of, for example, a component comprising sulfuric acid. For example, in some embodiments, a component comprising sulfur dioxide, or sulfur trioxide, or diatomic oxygen, or any combination thereof may be reacted in a manner to form sulfur trioxide and/or may be reacted with water in a manner to form at least a portion of sulfuric acid, or hydrogen, or any combination thereof. In some embodiments, for example, at least a portion of a component comprising sulfur dioxide may be reacted with at least a portion of a component comprising hydrogen sulfide to form at least a portion of a component comprising sulfur. In some embodiments, a component comprising sulfuric acid, or hydrogen, or sulfur, or any combination thereof may comprise a product. In some embodiments, a component comprising sulfuric acid, or hydrogen, or sulfur, or any combination thereof may comprise an intermediate. In some embodiments, the production of at least a portion of sulfuric acid may generate at least a portion of heat and/or at least a portion of said heat may be employed in one or more or any combination of process steps employing heat in one or more or any combination of embodiments, or may be stored, or said heat may be employed in a different process or application, or any combination thereof.

In some embodiments, one or more or any combination of process steps or reactions may generate at least a portion of heat and/or at least a portion of said heat may be employed in one or more or any combination of process steps employing heat in one or more or any combination of embodiments, or said heat may be employed in a different process or application, or any combination thereof.

In some embodiments, sulfur dioxide or a derivative thereof may comprise an example 'x'-anion. For example, in some embodiments, the manner which a reaction comprising magnesium, or sulfur dioxide, or calcium, or sulfate, or a derivative thereof, or any combination thereof may be conducted may vary depending on, for example, the conditions, the desired yield, the desired footprint, the desired operating mode, or other objectives, or any combination thereof.

In some embodiments, a wide range of reactors or reaction configurations may be suitable. For example, in some embodiments, a reactor may be configured to operate in a batch, or semi-batch, or continuous, or any combination thereof operating mode. For example, in some embodiments, a reactor or reaction step may be configured with multiple stages, or may comprise a cascading reactor, or any combination thereof.

In some embodiments, a component comprising magnesium may be mixed with a solution comprising water prior to, or during, or after, or any combination thereof mixing with a component comprising calcium. In some embodiments, a component comprising magnesium may be mixed with a solution comprising water prior to, or during, or after, or any combination thereof mixing with a component comprising 'x' anion. In some embodiments, a component comprising magnesium may be mixed with a component comprising 'x' anion prior to, or during, or after, or any combination thereof mixing with a component comprising water. In some embodiments, a component comprising magnesium may be mixed with a component comprising calcium prior to, or during, or after, or any combination thereof mixing with a component comprising 'x' anion.

In some embodiments, a component comprising calcium may be mixed with a solution comprising water prior to, or during, or after, or any combination thereof mixing with a component comprising magnesium. In some embodiments, a component comprising calcium may be mixed with a solution comprising water prior to, or during, or after, or any combination thereof mixing with a component comprising 'x' anion. In some embodiments, a component comprising calcium may be mixed with a component comprising 'x' anion prior to, or during, or after, or any combination thereof mixing with a component comprising water. In some embodiments, a component comprising calcium may be mixed with a component comprising magnesium prior to, or during, or after, or any combination thereof mixing with a component comprising 'x'-anion.

In some embodiments, for example, a solution or slurry comprising magnesium may be formed and a solution or slurry comprising calcium may be formed, and/or the solution or slurry comprising magnesium and/or the solution or slurry comprising calcium may be mixed. In some embodiments, for example, a solution or slurry comprising magnesium hydroxide may be formed and a solution or slurry comprising calcium sulfate may be formed, and/or the solution or slurry comprising magnesium and/or the solution or slurry comprising calcium may be mixed, and/or at least a portion of sulfur dioxide, or sulfurous acid, or sulfite, or bisulfite, or sesquisulfite, or any combination thereof may be added or may be present, which may enable or facilitate a reaction. In some embodiments, for example, a solution or slurry comprising magnesium+sulfur dioxide salt may be formed and a solution or slurry comprising calcium sulfate may be formed, and/or the solution or slurry comprising magnesium+sulfur dioxide salt and/or the solution or slurry comprising calcium may be mixed. In some embodiments, for example, a solution or slurry comprising magnesium+ sulfur dioxide salt may be formed and a solution or slurry comprising calcium sulfate may be formed, and/or the solution or slurry comprising magnesium+sulfur dioxide salt and/or the solution or slurry comprising calcium may be mixed, and/or additional sulfur dioxide or a derivative thereof may be added during the reaction.

In some embodiments, a solid or slurry or solution comprising magnesium oxide or magnesium hydroxide, or a solid or slurry or solution comprising calcium sulfate, or a component comprising sulfur dioxide or a derivative of sulfur dioxide, or a component comprising water, or any combination thereof may be mixed. In some embodiments, a solid or slurry or solution comprising magnesium+sulfur dioxide, or a solid or slurry or solution comprising calcium sulfate, or a component comprising sulfur dioxide or a derivative of sulfur dioxide, or a component comprising water, or any combination thereof may be mixed. In some embodiments, a solid or slurry or solution comprising magnesium+carbon dioxide, or a solid or slurry or solution comprising calcium sulfate, or a component comprising sulfur dioxide or a derivative of sulfur dioxide, or a component comprising water, or any combination thereof may be mixed.

In some embodiments, a reactor may be configured to remove or separate at least a portion of reaction product solids, which may comprise at least a portion of sulfite, or calcium sulfite, or sulfur dioxide, or a derivative thereof, or any combination thereof, and/or at least a portion of any reaction product solution, which may comprise at least a portion of sulfate, or magnesium sulfate, or a derivative thereof, or any combination thereof. In some embodiments, removal or separation may be at least partially continuous. In some embodiments, removal or separation may be at least partially batch.

In some embodiments, a solution or slurry comprising magnesium may be formed and a solution or slurry comprising calcium may be formed, and/or the solution or slurry comprising magnesium and/or the solution or slurry comprising calcium may be mixed.

In some embodiments, a component comprising magnesium oxide or magnesium hydroxide may be mixed with a solution comprising water to form a solid-liquid slurry. In some embodiments, a component comprising magnesium oxide or magnesium hydroxide may be mixed with a solution comprising water to form a solid-liquid slurry, and/or a component comprising sulfur dioxide may be reacted with the solution or slurry to form at least a portion of magnesium sulfite, or magnesium sesquisulfite, or magnesium bisulfite, or magnesium+sulfur dioxide, or any combination thereof. In some embodiments, a component comprising magnesium oxide or magnesium hydroxide may be mixed with a solution or component comprising sulfur dioxide to form at least a portion of magnesium sulfite, or magnesium sesquisulfite, or magnesium bisulfite, or magnesium+sulfur dioxide, or any combination thereof.

In some embodiments, a component comprising magnesium carbonate, or magnesium sesquicarbonate, or magnesium bicarbonate, or any combination thereof may be mixed with a solution comprising water to form a solution, or solid, or slurry, or any combination thereof to form a solid-liquid slurry. In some embodiments, a component comprising magnesium carbonate, or magnesium sesquicarbonate, or magnesium bicarbonate, or any combination thereof may be mixed with a solution comprising water to form a solid-liquid slurry, and/or a component comprising sulfur dioxide may be reacted with the solution or slurry to form at least a portion of magnesium sulfite, or magnesium sesquisulfite, or magnesium bisulfite, or magnesium+sulfur dioxide, or any combination thereof and/or at least a portion of a component comprising carbon dioxide which may comprise captured carbon dioxide. In some embodiments, a component comprising magnesium carbonate, or magnesium sesquicarbonate, or magnesium bicarbonate, or any combination thereof may be mixed with a solution or component comprising sulfur dioxide to form at least a portion of magnesium sulfite, or magnesium sesquisulfite, or magnesium bisulfite, or magnesium+sulfur dioxide, or any combination thereof and/or at least a portion of a component comprising carbon dioxide which may comprise captured carbon dioxide.

In some embodiments, a solid comprising calcium may be added to a solution or slurry comprising magnesium. In some embodiments, a solid comprising magnesium may be added to a solution or slurry comprising calcium.

In some embodiments, a solid comprising calcium, a solid comprising magnesium may be mixed with a solution comprising water, and/or a component comprising x-anion derivative acid or acid gas may be added to the solution or slurry. In some embodiments, a solid comprising calcium, a solid comprising magnesium may be mixed with a solution comprising x-anion derivative acid or dissolved acid gas. In some embodiments, at least a portion of x-anion derivative acid may be added during the mixing or reaction.

In some embodiments, a reactor may be configured to minimize or reduce potential exposure or reaction of sulfur dioxide, or sulfite, or bisulfite, or sesquisulfite, or sulfurous acid, or any combination thereof with oxygen, or diatomic oxygen, or any combination thereof. For example, in some embodiments, an atmosphere comprising an inert gas may be employed, or a reduced oxygen atmosphere, or other methods described herein, or other methods described in the art, or any combination thereof may be employed In some embodiments, a reaction or reactor or process may be configured to achieve optimal or desired products, or yields, or kinetics, or any combination thereof. In some embodiments, one or more or any combination of factors may influence optimal or desired results, and/or may include, but are not limited to, one or more or any combination of the following: molar ratio of reagents, or the molar ratio of products, or the presence products in the reactants, or the temperature, or concentration, or pressure, or sequence of reactions, or mixing rate, or residence time, or mixing design, or reactor design, or number of reactor stages, or type of reactor stages, or presence of other reagents, or presence of catalysts, or molar ratio of magnesium:x-anion, or the composition or state of x-anion, or molar ratio of magnesium:calcium, or molar ratio of magnesium:sulfate, or molar ratio of calcium:x-anion, or the molar ratio of water to other reagents or products, or the concentration of calcium sulfate, or the concentration of x-anion species, or the pH, or the concentration of magnesium species, or the concentration of calcium species, or the concentration of other species, or the concentration of other ions, or the rate of separation of solids, or the separation techniques employed to separate solids, or the rate of separation of liquids, or the separation techniques employed to separate liquids.

For example, in some embodiments, it may be desirable to employ a molar ratio of x-anion:magnesium less than, or greater than, or equal to, one or more or any combination of the following:

For example, in some embodiments, it may be desirable to employ a molar ratio of x-anion to calcium less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

For example, in some embodiments, it may be desirable to employ a molar ratio of magnesium to calcium less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

For example, in some embodiments, it may be desirable to employ a molar ratio of magnesium to sulfate less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

For example, in some embodiments, it may be desirable to employ a molar ratio of calcium to sulfate less than, or greater than, or equal to, one or more or any combination of the following: 0.01:1, or 0.05:1, or 0.1:1, or 0.15:1, or 0.2:1, or 0.3:1, or 0.4:1, or 0.5:1, or 0.6:1, or 0.7:1, or 0.8:1, or 0.9:1, or 1:1, or 1.1:1, or 1.2:1, or 1.3:1, or 1.4:1, or 1.5:1, or 1.6:1, or 1.7:1, or 1.8:1, or 1.9:1, or 2:1, or 2.25:1, or 2.5:1, or 2.75:1, or 3:1, or 3.25:1, or 3.5:1, or 3.75:1, or 4:1, or 5:1, or 6:1, or 7:1, or 8:1, or 9:1, or 10:1.

In some embodiments, citric acid or a derivative thereof may comprise an example 'x'-anion. For example, in some embodiments, the manner which a reaction comprising magnesium, or citric acid, or calcium, or sulfate, or a derivative thereof, or any combination thereof may be conducted may vary depending on, for example, the conditions, the desired yield, the desired footprint, the desired operating mode, or other objectives, or any combination thereof.

In some embodiments, for example, the solubility of magnesium citrate may be significantly greater than the solubility of magnesium sulfite, which may enable a wider range of potential concentrations, or molar ratios, or any combination thereof. In some embodiments, for example, calcium citrate may possess a low solubility in water and/or may comprise a solubility in water less than the solubility in water of some forms of calcium sulfate.

In some embodiments, at least a portion of a component comprising magnesium sulfate may be separated from at least a portion of a component comprising magnesium citrate using, for example nanofiltration due to, for example, the potentially significant difference in molecular weight and valence or charge or hydration radius between the salts, or ions, or any combination thereof.

In some embodiments, a component comprising calcium citrate may comprise a product. In some embodiments, a component comprising calcium citrate may comprise an intermediate.

For example, in some embodiments, a component comprising calcium citrate may be reacted with a component comprising sulfur dioxide or a derivative thereof to form at least a portion of a component comprising calcium sulfite and/or a component comprising citric acid. In some embodiments, a component comprising citric acid may be recycled or reused within the process or process step. In some embodiments, a component comprising calcium sulfite may be decomposed to form at least a portion of calcium oxide, or calcium sulfide, or sulfur dioxide, or calcium sulfate, or calcium hydroxide, or cement, or clinker, or calcium silicate, or calcium ferrite, or other component comprising calcium, or a derivative thereof, or any combination thereof.

In some embodiments, a mixture comprising magnesium oxide, or magnesium hydroxide, or magnesium carboxylate, or magnesium citrate, or citric acid, or carboxylic acid, or calcium sulfate, or water, or any combination thereof may be reacted with at least a portion of sulfur dioxide, or sulfurous acid, or sulfite, or bisulfite, or a derivative thereof, or any combination thereof to form, for example, at least a portion of a component comprising magnesium sulfate and at least a portion of a component comprising calcium sulfite. In some embodiments, carboxylic acid or carboxylate, such as the citric acid or citrate, may function as an intermediate or catalyst which may facilitate the reaction. In some embodiments, at least a portion of the carboxylic acid, or citric acid, or carboxylate, or citrate, or a derivative thereof, or any combination thereof may be recovered or removed. For example, in some embodiments, lower pH or acidic pH may enable or facilitate the reaction. For example, in some embodiments, higher pH or basic pH may enable or facilitate the reaction. For example, in some embodiments, neutral may enable or facilitate the reaction. For example, other catalysts, or intermediates, or facilitators, or any combination thereof may be employed. For example, other catalysts, or intermediates, or facilitators, or any combination thereof may be employed, which may include, but may not be limited to, one or more or any combination of the following: acids, or bases, anions, or cations, or inorganic chemicals, or organic chemicals, or organic solvents, or complex ions, or complexes, or transition metals cations, or transition metal salts, or alkali metal catalysts, or alkali metal cations, or an alkaline earth, or an alkaline earth oxide, or an alkaline earth hydroxide, or an alkaline earth salt, or a halogen, or a halogenated compound, or nitrogenous compounds, or oxygenated compounds, or phosphorous compounds, or sulfurous compounds, or carbonaceous compounds, or hydrogenous compounds, or polymers, or solids, or liquids, or emulsions, or solid-liquid mixtures, or fluids, or gases, or plasma, or heat, or light, or phase transition, or freezing, or melting, or vapor.

EXAMPLE FIGURE DESCRIPTIONS

Example FIG. 1 Description

Example FIG. 1 Summary

FIG. 1 may show a process for producing at least a portion of a component comprising calcium oxide or a derivative thereof and/or a component comprising sulfuric acid using, for example, inputs comprising calcium sulfate, or water, or a derivative thereof, or any combination thereof. FIG. 1 may show a process wherein component comprising magnesium, or sulfur, or water, or any combination thereof may comprise at least a portion of intermediates. FIG. 1 may show a process wherein a component comprising magnesium sulfate may be decomposed to form a component comprising sulfur dioxide, or sulfur trioxide, or diatomic oxygen, or a derivative thereof, and/or magnesium oxide, and/or wherein a component comprising sulfuric acid may be produced from at least a portion of a component comprising sulfur dioxide, or sulfur trioxide, or diatomic oxygen, or a derivative thereof, and/or a component comprising sulfur dioxide, or sulfurous acid, or sulfite, or bisulfite, or a derivative thereof, or any combination thereof may be reacted with component comprising magnesium oxide or magnesium hydroxide to form component comprising magnesium sulfite, or magnesium+sulfur dioxide salt, or a derivative thereof, and/or any combination thereof.

Example FIG. 1 Key

| Label | Example Equipment | Example Description |
|---|---|---|
| Step 1 | Mixer or Absorber or Reactor, Solid-Liquid Separator | A component comprising magnesium sulfite, or magnesium bisulfite, or sulfurous acid, or a derivative thereof, or any combination thereof may be reacted with a component comprising calcium sulfate in a manner to form at least a portion of a component comprising magnesium sulfate and/or at least a portion of a component comprising calcium sulfite. In some embodiments, a solid comprising calcium sulfite may be at least partially separated from a solution comprising magnesium sulfate using, for example, a solid-liquid separation method. |
| Step 2 | Membrane-Based Process, MVC or MED Crystallizer | A component comprising magnesium sulfate, such as a solution comprising magnesium sulfate, may be at least partially separated to form at least a portion of a component comprising water and a component comprising magnesium sulfate. For example, in some embodiments, a solution comprising magnesium sulfate may be at least partially separated to form at least a portion of a solution or liquid comprising water and/or at least a portion of a solid comprising magnesium sulfate. |
| Step 3 | Kiln or Calciner | A component comprising calcium sulfite may be at least partially decomposed to form a component comprising calcium oxide, or calcium hydroxide, or calcium sulfide, or cement, or clinker, or a derivative thereof, or any combination thereof, and/or to form a component comprising sulfur dioxide or a derivative thereof. For example, in some embodiments, a solid comprising calcium sulfite may be at least partially decomposed to form a solid comprising calcium oxide and/or a gas comprising sulfur dioxide. |
| Step 4 | Kiln or Calciner | A component comprising magnesium sulfate may be at least partially decomposed to form a component |

-continued

| Label | Example Equipment | Example Description |
|---|---|---|
| | | comprising magnesium oxide, or magnesium hydroxide, or magnesium sulfide, or cement, or clinker, or a derivative thereof, or any combination thereof, and/or to form a component comprising sulfur dioxide, or sulfur trioxide, or oxygen, or diatomic oxygen, or a derivative thereof, or any combination thereof. For example, in some embodiments, a solid comprising magnesium sulfate may be at least partially decomposed to form a solid comprising magnesium oxide and/or a gas comprising sulfur dioxide, or sulfur trioxide, or oxygen, or diatomic oxygen, or a derivative thereof, or any combination thereof. |
| Step 5 | Contact Process | A component comprising sulfur dioxide, or sulfur trioxide, or oxygen, or diatomic oxygen, or a derivative thereof, or any combination thereof may be reacted in a manner to form at least a portion of sulfuric acid, or sulfur, or hydrogen, or a derivative thereof, or any combination thereof. For example, in some embodiments, a gas comprising sulfur dioxide, or sulfur trioxide, or oxygen, or diatomic oxygen, or a derivative thereof, or any combination thereof may be reacted with a component comprising water to form at least a portion of a component comprising sulfuric acid. |
| Step 6 | Mixer or Absorber or Reactor | A component comprising magnesium oxide, or magnesium hydroxide, or a derivative there, or any combination thereof may be reacted with a component comprising sulfur dioxide, or sulfurous acid, or sulfite, or bisulfite, or any combination thereof to form, for example, at least a portion of a component comprising magnesium sulfite, or magnesium bisulfite, or magnesium + sulfur dioxide salt, or a derivative thereof, or any combination thereof. |

Example FIG. 2 Description

Example FIG. 2 Summary

FIG. 2 may show a process for producing at least a portion of a component comprising calcium oxide or a derivative thereof and/or a component comprising sulfuric acid using, for example, inputs comprising calcium sulfate, or water, or a derivative thereof, or any combination thereof. FIG. 2 may show a process wherein component comprising magnesium, or sulfur, or water, or any combination thereof may comprise at least a portion of intermediates. FIG. 2 may show a process wherein a component comprising magnesium sulfate may be decomposed to form a component comprising sulfur dioxide, or sulfur trioxide, or diatomic oxygen, or a derivative thereof, and/or magnesium oxide, and/or wherein a component comprising sulfuric acid may be produced from at least a portion of a component comprising sulfur dioxide, or sulfur trioxide, or diatomic oxygen, or a derivative thereof, and/or a component comprising sulfur dioxide, or sulfurous acid, or sulfite, or bisulfite, or a derivative thereof, or any combination thereof may be reacted with mixture comprising magnesium, or calcium, or sulfate, or water, or a derivative thereof, or any combination thereof.

Example FIG. 2 Key

| Label | Example Equipment | Example Description |
|---|---|---|
| Step 1 | Mixer or Absorber or Reactor, Solid-Liquid Separator | A component comprising magnesium, or calcium, or oxide, or hydroxide, or sulfate, or sulfur dioxide, or a derivative thereof, or any combination thereof may be reacted in a manner to form at least a portion of a component comprising magnesium sulfate or a derivative thereof and/or at least a portion of a component comprising calcium sulfite or a derivative thereof. In some embodiments, a solid comprising calcium sulfite may be at least partially separated from a solution comprising magnesium sulfate using, for example, a solid-liquid separation method. |
| Step 2 | Membrane-Based Process, MVC or MED Crystallizer | A component comprising magnesium sulfate, such as a solution comprising magnesium sulfate, may be at least partially separated to form at least a portion of a component comprising water and a component comprising magnesium sulfate. For example, in some embodiments, a solution comprising magnesium sulfate may be at least partially separated to form at least a portion of a solution or liquid comprising water and/or at least a portion of a solid comprising magnesium sulfate. |
| Step 3 | Kiln or Calciner | A component comprising calcium sulfite may be at least partially decomposed to form a component comprising calcium oxide, or calcium hydroxide, or calcium sulfide, or |

-continued

| Label | Example Equipment | Example Description |
|---|---|---|
| | | cement, or clinker, or a derivative thereof, or any combination thereof, and/or to form a component comprising sulfur dioxide or a derivative thereof. For example, in some embodiments, a solid comprising calcium sulfite may be at least partially decomposed to form a solid comprising calcium oxide and/or a gas comprising sulfur dioxide. |
| Step 4 | Kiln or Calciner | A component comprising magnesium sulfate may be at least partially decomposed to form a component comprising magnesium oxide, or magnesium hydroxide, or magnesium sulfide, or cement, or clinker, or a derivative thereof, or any combination thereof, and/or to form a component comprising sulfur dioxide, or sulfur trioxide, or oxygen, or diatomic oxygen, or a derivative thereof, or any combination thereof. For example, in some embodiments, a solid comprising magnesium sulfate may be at least partially decomposed to form a solid comprising magnesium oxide and/or a gas comprising sulfur dioxide, or sulfur trioxide, or oxygen, or diatomic oxygen, or a derivative thereof, or any combination thereof. |
| Step 5 | Contact Process | A component comprising sulfur dioxide, or sulfur trioxide, or oxygen, or diatomic oxygen, or a derivative thereof, or any combination thereof may be reacted in a manner to form at least a portion of sulfuric acid, or sulfur, or hydrogen, or a derivative thereof, or any combination thereof. For example, in some embodiments, a gas comprising sulfur dioxide, or sulfur trioxide, or oxygen, or diatomic oxygen, or a derivative thereof, or any combination thereof may be reacted with a component comprising water to form at least a portion of a component comprising sulfuric acid. |

Example FIG. 3 Description

Example FIG. 3 Summary

FIG. 3 may be similar to FIG. 1 and/or FIG. 2, except a component comprising magnesium oxide may be reacted with a component comprising water and/or a component comprising sulfur dioxide prior to mixing with or reaction with a component comprising calcium sulfate, and/or a component calcium sulfate may be mixed with and/or at least partially dissolved in water prior to mixing with or reaction with a component comprising magnesium.

Example FIG. 4 Description

FIG. 4 may be similar to FIG. 1 and/or FIG. 2, except a component comprising magnesium may be an input and/or a component comprising magnesium sulfate may comprise an output or product.

Example FIG. 5 Description

FIG. 5 may be similar to FIG. 1 and/or FIG. 2, except a component comprising magnesium oxide or magnesium hydroxide may be at least partially employed to react with and/or capture at least a portion of an acid gas, such as carbon dioxide, to form, for example, at least a portion of a component comprising magnesium+carbon dioxide salt, or magnesium carbonate, or magnesium bicarbonate, or a derivative thereof, or any combination thereof; and/or said component comprising magnesium+carbon dioxide salt may be reacted with at least a portion of a stronger acid or stronger acid derivative, such as component comprising sulfur dioxide, to form, for example, at least a portion of component comprising magnesium+sulfur dioxide salt, or magnesium sulfite, or magnesium bisulfite, or a derivative thereof, or any combination thereof and/or at least a portion of a component comprising carbon dioxide, such as, for example, a component comprising captured, or high purity, or high pressure, or high partial pressure, or high quality, or any combination thereof carbon dioxide.

Example FIG. 6 Description

Example FIG. 6 Summary

FIG. 6 may show a process for producing at least a portion of a component comprising calcium oxide or a derivative thereof and/or a component comprising sulfuric acid using, for example, inputs comprising calcium sulfate, or water, or a derivative thereof, or any combination thereof. FIG. 6 may show a process wherein component comprising magnesium, or carboxylic acid, or sulfur, or water, or any combination thereof may comprise at least a portion of intermediates. FIG. 6 may show a process wherein a component comprising magnesium sulfate may be decomposed to form a component comprising sulfur dioxide, or sulfur trioxide, or diatomic oxygen, or a derivative thereof, and/or magnesium oxide, and/or wherein a component comprising sulfuric acid may be produced from at least a portion of a component comprising sulfur dioxide, or sulfur trioxide, or diatomic oxygen, or a derivative thereof, and/or a component comprising citric acid, or citrate, or carboxylic acid, or a derivative thereof, or any combination thereof may be reacted with component comprising magnesium oxide or magnesium hydroxide to form component comprising magnesium citrate, or magnesium+citric acid salt, or a derivative thereof, and/or any combination thereof; and/or component comprising calcium citrate, or calcium+citric acid salt, or a derivative thereof, or any combination thereof may be reacted with component comprising sulfur dioxide, or sulfite, or bisulfite, or sulfurous acid, or water, or a derivative thereof, or any combination thereof to form, for example, at least a portion of a component comprising calcium sulfite and/or at least a portion of a component comprising citric acid, or citrate, or carboxylic acid, or a derivative thereof, or any combination thereof.

Example FIG. 6 Key

| Label | Example Equipment | Example Description |
|---|---|---|
| Step 1 | Mixer or Absorber or Reactor, Solid-Liquid Separator | A component comprising magnesium citrate, or magnesium + citric acid anion, or citric acid, or any combination thereof may be reacted with a component comprising calcium sulfate in a manner to form at least a portion of a component comprising magnesium sulfate and/or at least a portion of a component comprising calcium citrate. In some embodiments, a solid comprising calcium citrate may be at least partially separated from a solution comprising magnesium sulfate using, for example, a solid-liquid separation method. |
| Step 2 | Membrane-Based Process, MVC or MED Crystallizer | A component comprising magnesium sulfate, such as a solution comprising magnesium sulfate, may be at least partially separated to form at least a portion of a component comprising water and a component comprising magnesium sulfate. For example, in some embodiments, a solution comprising magnesium sulfate may be at least partially separated to form at least a portion of a solution or liquid comprising water and/or at least a portion of a solid comprising magnesium sulfate. |
| Step 3 | Mixer, Solid-Liquid Separator | A component comprising calcium citrate may be reacted with at least a portion of a component comprising sulfur dioxide, or sulfurous acid, or sulfite, or bisulfite, or a derivative thereof, or any combination thereof to form, for example, at least a portion of a component comprising calcium sulfite, or calcium bisulfite, or calcium + sulfur dioxide salt, or a derivative thereof, or any combination thereof and/or a component comprising citric acid, or citrate, or a derivative thereof, or any combination thereof. For example, in some embodiments, a solid comprising calcium citrate may be reacted with a fluid comprising sulfur dioxide, or sulfurous acid, or any combination thereof to form at least a portion of a solid comprising calcium sulfite and/or a solution comprising citric acid. |
| Step 4 | Kiln or Calciner | A component comprising magnesium sulfate may be at least partially decomposed to form a component comprising magnesium oxide, or magnesium hydroxide, or magnesium sulfide, or cement, or clinker, or a derivative thereof, or any combination thereof, and/or to form a component comprising sulfur dioxide, or sulfur trioxide, or oxygen, or diatomic oxygen, or a derivative thereof, or any combination thereof. For example, in some embodiments, a solid comprising magnesium sulfate may be at least partially decomposed to form a solid comprising magnesium oxide and/or a gas comprising sulfur dioxide, or sulfur trioxide, or oxygen, or diatomic oxygen, or a derivative thereof, or any combination thereof. |
| Step 5 | Kiln or Calciner | A component comprising calcium sulfite may be at least partially decomposed to form a component comprising calcium oxide, or calcium hydroxide, or calcium sulfide, or cement, or clinker, or a derivative thereof, or any combination thereof, and/or to form a component comprising sulfur dioxide or a derivative thereof. For example, in some embodiments, a solid comprising calcium sulfite may be at least partially decomposed to form a solid comprising calcium oxide and/or a gas comprising sulfur dioxide. |
| Step 6 | Mixer or Absorber or Reactor | A component comprising magnesium oxide, or magnesium hydroxide, or a derivative there, or any combination thereof may be reacted with a component comprising citric acid, or citrate, or carboxylic acid, or any combination thereof to form, for example, at least a portion of a component comprising magnesium citrate, or magnesium carboxylate, or magnesium + citric acid salt, or a derivative thereof, or any combination thereof. |
| Step 7 | Contact Process | A component comprising sulfur dioxide, or sulfur trioxide, or oxygen, or diatomic oxygen, or a derivative thereof, or any combination thereof may be reacted in a manner to form at least a portion of sulfuric acid, or sulfur, or hydrogen, or a derivative thereof, or any combination thereof. For example, in some embodiments, a gas comprising sulfur dioxide, or sulfur trioxide, or oxygen, or diatomic oxygen, or a derivative thereof, or any combination thereof may be reacted with a component comprising water to form at least a portion of a component comprising sulfuric acid. |

Example FIG. 7 Description

Example FIG. 7 Summary

FIG. 7 may be similar to FIG. 6, except the reaction of component comprising citric acid, or magnesium hydroxide, or magnesium oxide, or calcium sulfate, or any combination thereof may be conducted within one process step, or one reactor, or one reactor sequence, or any combination thereof.

Example FIG. 8 Description

Example FIG. 8 Summary

FIG. 8 may be similar to FIG. 6, except component comprising magnesium may be an input and/or component comprising magnesium sulfate may comprise an output or product.

Example FIG. 9 Description

Example FIG. 9 Summary

FIG. 9 may be similar to FIG. 6, except a component comprising magnesium oxide, or magnesium hydroxide, or any combination thereof may be at least partially employed to react with and/or capture at least a portion of an acid gas, such as carbon dioxide, to form, for example, at least a portion of a component comprising magnesium+carbon dioxide salt, or magnesium carbonate, or magnesium bicarbonate, or a derivative thereof, or any combination thereof; and/or said component comprising magnesium+carbon dioxide salt may be reacted with at least a portion of a stronger acid or stronger acid derivative, such as component comprising citric acid, to form, for example, at least a portion of component comprising magnesium+citric acid salt, or magnesium citrate, or a derivative thereof, or any combination thereof and/or at least a portion of a component comprising carbon dioxide, such as, for example, a component comprising captured, or high purity, or high pressure, or high partial pressure, or high quality, or any combination thereof carbon dioxide.

ADDITIONAL DESCRIPTION

Some embodiments may pertain to a system or process for producing an alkaline earth oxide, or alkaline earth hydroxide, or sulfuric acid, or any combination thereof from an alkaline earth sulfate. Some embodiments may pertain to a process for producing calcium oxide, or calcium earth hydroxide, or sulfuric acid, or any combination thereof from calcium sulfate.

In some embodiments, an aqueous solution comprising calcium sulfate may be reacted with an aqueous solution comprising a magnesium salt or a magnesium-anion salt, which may be conducted using or may be facilitated by electrodialysis metathesis, forming, for example, a calcium-anion salt and magnesium sulfate. In some embodiments, it may be desirable for said 'anion' in the magnesium-anion salt to comprise an anion wherein when said anion is in a salt comprising calcium, such as a calcium-anion salt or ionic compound, said calcium anion salt may be at least partially soluble in water, or may possess a solubility in water equal to or greater than calcium sulfate, or any combination thereof. In some embodiments, it may be desirable for said 'anion' in the magnesium-anion salt to comprise an anion of an acid which is weaker than sulfurous acid or aqueous sulfur dioxide, or a pKa which is weaker than sulfurous acid or aqueous sulfur dioxide, or any combination thereof. For example, in some embodiments, said anion may comprise an anion of a carboxylic acid, such as, including, but not limited to, one or more or any combination of the following: formic acid, or acetic acid, or propanoic acid, or any combination thereof. In some embodiments, some carboxylic acids may comprise a pKa weaker than sulfurous acid or aqueous sulfur dioxide. In some embodiments, it may be desirable for said 'anion' in the magnesium-anion salt to comprise an anion of an acid which is weaker than carbonic acid or aqueous carbon dioxide, or a pKa which is weaker than carbonic acid or aqueous carbon dioxide, or any combination thereof. For example, some aqueous amino acids, or some amino acid, or some organic acids may possess an acid strength or pKa weaker than carbonic acid or aqueous carbon dioxide, such as, for example, including but not limited to, one or more or any combination of the following: glycine, or taurine, or imine, or arginine, or lysine, or histidine, or lysine, or glutamine, or glutamic acid. For example, in some embodiments, a solution comprising aqueous calcium sulfate may be reacted with a solution comprising aqueous magnesium carboxylate, which may be conducted using or may be facilitated by electrodialysis metathesis, forming, for example, a solution comprising aqueous calcium carboxylate and a solution comprising aqueous magnesium sulfate.

In some embodiments, the formed calcium-anion salt, such as, for example, a calcium carboxylate, may be converted into or reacted to form a calcium salt which may be thermally decomposed into calcium oxide, or cement, or cement clinker, or calcium hydroxide, or further reacted with water to form calcium hydroxide, or further reacted with carbon dioxide to form calcium carbonate, or any combination thereof. In some embodiments, it may be desirable to concentrate or further concentrate the formed calcium-anion salt before or during any reacting. For example, it may be desirable to concentrate or remove water from a solution comprising a calcium-anion salt by, for example, one or more or any combination of separation, or concentrating, or water removal systems or methods described herein or known in the art.

- For example, in some embodiments, a calcium-anion salt or calcium carboxylate may be reacted with sulfur dioxide to form a solid or precipitate comprising calcium sulfite and/or an acid comprising carboxylic acid. A solid comprising calcium sulfite may be separated using, for example, a solid-liquid separation process, and/or the solid comprising calcium sulfite may be decomposed, such as thermally decomposed, into calcium oxide and sulfur dioxide.
- For example, in some embodiments, a calcium carboxylate may be reacted with an alkali sulfite, such as sodium sulfite or potassium sulfite, to form a precipitate comprising calcium sulfite and a solution comprising aqueous alkali carboxylate, such as sodium carboxylate or potassium carboxylate. A solution comprising aqueous alkali carboxylate may be reacted with sulfur dioxide to form an aqueous solution comprising an alkali sulfite and carboxylic acid. In some embodiments, a solution comprising aqueous alkali sulfite and carboxylic acid may be separated into an at least partially separated solid or solution comprising alkali sulfite and/or an at least partially separated solid or solution comprising carboxylic acid. A solid comprising calcium sulfite may be decomposed, such as thermally decomposed, into calcium oxide and sulfur dioxide.

For example, in some embodiments, a calcium-anion salt or calcium-amino acid anion salt may be reacted with carbon dioxide to form a solid or precipitate comprising calcium carbonate and/or an acid comprising an amino acid. A solid comprising calcium carbonate may be separated using, for example, a solid-liquid separation process, and/or the solid comprising calcium carbonate may be decomposed, such as thermally decomposed, into calcium oxide and carbon dioxide. It may be desirable for said carbon dioxide to comprise captured carbon dioxide, or for at least a portion of said carbon dioxide to be recovered or captured, or any combination thereof. It may be desirable for the decomposition of calcium carbonate to be conducted in a manner wherein the concentration or purity of carbon dioxide formed may be suitable or desirable for use, or capture, or compression, or transport, or any combination thereof. For example, in some embodiments, it may be desirable to decompose calcium carbonate using indirect calcination, or heating with a condensable or otherwise separable carrier gas, or any combination thereof.

For example, in some embodiments, a calcium-anion salt or calcium-amino acid anion salt may be reacted with an alkali carbonate, such as sodium carbonate or potassium carbonate or lithium carbonate, to form a precipitate comprising calcium carbonate and a solution comprising aqueous alkali-anion or alkali-amino acid, such as sodium amino acid anion salt or potassium amino acid anion salt. A solution comprising aqueous alkali-anion or alkali-amino acid anion salt may be reacted with carbon dioxide to form an aqueous solution comprising an alkali carbonate, such as sodium carbonate or potassium carbonate or lithium carbonate, and anion derivative acid or amino acid. In some embodiments, a solution comprising aqueous alkali carbonate and anion derivative acid or amino acid may be separated into an at least partially separated solid or solution comprising alkali carbonate and/or an at least partially separated solid or solution comprising anion derivative acid or amino acid. A solid comprising calcium carbonate may be decomposed, such as thermally decomposed, into calcium oxide and carbon dioxide.

For example, in some embodiments, calcium oxide may be reacted with water to form calcium hydroxide, or lime water, or a solid comprising calcium hydroxide, or an aqueous solution comprising calcium hydroxide, or a solid-liquid slurry or suspension comprising calcium hydroxide, or any combination thereof. For example, in some embodiments, at least a portion of heat may be recovered and/or may be utilized in one or more or any combination of internal or external processes or process steps.

In some embodiments, a solution comprising magnesium sulfate may be concentrated and/or magnesium sulfate or a solid comprising magnesium sulfate may be formed or crystallized. For example, in some embodiments, magnesium sulfate may be concentrated using one or more or any combination of systems or methods for concentrating, or separating, or water removal, or crystallizing, or any combination thereof described herein or known in the art. For example, in some embodiments, magnesium sulfate may be concentrated using electrodialysis, or reverse osmosis, or nanofiltration. For example, in some embodiments, magnesium sulfate may be further concentrated using, for example, including, but not limited to, one or more or any combination of the following: reverse osmosis, or high pressure reverse osmosis, or forward osmosis, or electrodialysis, or osmotically assisted reverse osmosis, or forward osmosis, or multi-effect distillation, or mechanical vapor compression distillation, or mechanical vapor recompression distillation, or multi-stage flash distillation, or cryodesalination, or freeze desalination, or membrane distillation, or heat recovery distillation, or any combination thereof. For example, in some embodiments, magnesium sulfate may be further concentrated or crystallized using, one or more or any combination of the following: crystallizer, or heat recovery crystallizer, or antisolvent crystallization, or antisolvent precipitation, or cooling precipitation, or concentrating and cooling crystallization or precipitation. In some embodiments, at least a portion of heat may be recovered from reaction of magnesium oxide with water to form magnesium hydroxide and/or at least a portion of said recovered heat may be employed to facilitate or supplement the heat or energy or power required for concentrating, or distillation, or crystallization, or separation, or any combination thereof. In some embodiments, at least a portion of heat may be recovered from a reaction of magnesium oxide with water to form magnesium hydroxide and/or a reaction calcium oxide and water to form calcium hydroxide and/or at least a portion of said recovered heat may be employed to facilitate or supplement the heat or energy or power required for concentrating, or distillation, or crystallization, or separation, or any combination thereof. In some embodiments, at least a portion of heat may be recovered from a reaction to form sulfuric acid and/or at least a portion of said recovered heat may be employed to facilitate or supplement the heat or energy or power required for concentrating, or distillation, or crystallization, or separation, or dehydration, or any combination thereof. In some embodiments, at least a portion of heat may be recovered from a reaction to form sulfuric acid, as the reaction of sulfur trioxide, or diatomic oxygen, or water, or sulfur dioxide, or any combination thereof to form sulfuric acid and/or at least a portion of said recovered heat may be employed to facilitate or supplement the heat or energy or power required for concentrating, or distillation, or crystallization, or separation, or dehydration, or any combination thereof. For example, in some embodiments, dehydration may refer to the decomposition or release of water from hydrates of, for example, calcium sulfite, or magnesium sulfite, or magnesium sulfate, or any combination thereof. For example, in some embodiments, dehydration may refer to the decomposition or release of water from hydrates of, for example, calcium sulfite, or magnesium sulfite, or magnesium sulfate, or any combination thereof, which may be heated to be dehydrated using at least a portion of recovered heat or lower cost or lower value heat, before, for example, thermal decomposition of, for example, calcium sulfite, or magnesium sulfite, or magnesium sulfate, or any combination thereof.

In some embodiments, magnesium sulfate or a solid comprising magnesium sulfate may be decomposed. For example, magnesium sulfate or a solid comprising magnesium sulfate may be decomposed, such as thermally decomposed, to form, for example, magnesium oxide, or sulfur trioxide, or diatomic oxygen, or sulfur dioxide, or any combination thereof. In some embodiments, the decomposing of magnesium sulfate may be conducted in a kiln, or an oven, or a rotating kiln, or vertical shaft kiln, or shaft kiln, or calciner, or heater, or heat transfer device, or heat transfer systems or methods described herein, or heat transfer systems or methods described in the art, or any combination thereof. It may be desirable for the system or method for decomposing magnesium sulfate to be at least partially compatible with sulfur trioxide and/or sulfuric acid.

In some embodiments, sulfur trioxide, or diatomic oxygen, or sulfur dioxide, or any combination thereof may be reacted with water to form sulfuric acid. In some embodiments, at least a portion of heat may be recovered and/or utilized from a reaction to form sulfuric acid. In some embodiments, sulfuric acid may be further diluted or concentrated for sale or other use.

For example, in some embodiments, sulfuric acid may be employed to produce phosphoric acid or phosphate for, for example, phosphate fertilizers. For example, some embodiments may enable at least a portion of a circular economy in the use of sulfuric acid in phosphate or phosphoric acid production by, for example, enabling the calcium sulfate produced from the reaction with sulfuric acid to produce phosphoric acid and/or fluoric acid to be converted into calcium oxide and/or sulfuric acid, wherein the sulfuric acid produced may be utilized internally and/or displace or supplement at least a portion of fresh or new supply sulfuric acid, which may have historically been purchased or sourced externally.

In some embodiments, a solid comprising magnesium oxide may be reacted to form magnesium hydroxide, or magnesium-anion salt, or magnesium carboxylate, or magnesium carbonate, or magnesium-amino acid salt, or any combination thereof. In some embodiments, it may be desirable to employ the magnesium oxide or magnesium hydroxide in a reaction which may be productive or produce a useful product or separation, before or as an interim or additional step in the process or along the pathway of producing a magnesium-anion salt, or magnesium carboxylate. For example, in some embodiments, it may be desirable to employ the magnesium oxide, or magnesium hydroxide, or magnesium-amino acid, or any combination thereof to absorb or capture carbon dioxide, such as dilute or low partial pressure carbon dioxide, and/or form magnesium carbonate, and/or react the magnesium carbonate with an anion acid derivative or a carboxylic acid to form a solid or solution comprising magnesium-anion salt, or a solid or solution comprising magnesium carboxylate, or any combination thereof and/or high purity, or high concentration, or high partial pressure, or captured, or separated, or any combination thereof carbon dioxide. For example, some embodiments may comprise one or more or any combination of the following:

For example, in some embodiments, magnesium oxide may be reacted with water to form magnesium hydroxide(s), or magnesium hydroxide (aq), or magnesium hydroxide-water solid-liquid mixture, or magnesium hydroxide-water solid-liquid mixture or suspension, or milk of magnesia, or any combination thereof. In some embodiments, heat may be recovered and/or may be utilized in one or more or any combination of internal or external processes or process steps.

For example, in some embodiments, magnesium oxide or magnesium hydroxide may be reacted with amino acid, or acid with a pKa weaker than carbonic acid or aqueous carbon dioxide, or an acid weaker than carbonic acid or aqueous carbon dioxide, or any combination thereof. In some embodiments, heat may be recovered and/or may be utilized in one or more or any combination of internal or external processes or process steps.

For example, in some embodiments, magnesium oxide or magnesium hydroxide may be reacted with carboxylic acid, or acid with a pKa weaker than sulfurous acid or aqueous sulfur dioxide, or an acid weaker than sulfurous acid or aqueous sulfur dioxide, or any combination thereof. In some embodiments, heat may be recovered and/or may be utilized in one or more or any combination of internal or external processes or process steps.

For example, in some embodiments, magnesium oxide or magnesium hydroxide may be reacted with carbon dioxide, such as dilute carbon dioxide or low partial pressure carbon dioxide, to form a solid or solution or mixture comprising magnesium carbonate. Magnesium carbonate may be reacted with an acid comprising anion acid derivative, or carboxylic acid, or acid stronger than carbonic acid, or acid with a pKa stronger than carboxylic acid, or any combination thereof to form a solution or solid comprising magnesium-anion salt, or a solid or solution comprising magnesium carboxylate, or any combination thereof and/or high purity, or high concentration, or high partial pressure, or captured, or separated, or any combination thereof carbon dioxide. In some embodiments, heat may be recovered and/or may be utilized in one or more or any combination of internal or external processes or process steps.

For example, in some embodiments, magnesium oxide may be reacted with water to form a solid, or solution, or slurry, or suspension, or solid-liquid mixture, or any combination thereof comprising magnesium hydroxide. Magnesium hydroxide may be reacted with carbon dioxide, such as dilute carbon dioxide or low partial pressure carbon dioxide, to form a solid or solution or mixture comprising magnesium carbonate. Magnesium carbonate may be reacted with an acid comprising anion acid derivative, or carboxylic acid, or acid stronger than carbonic acid, or acid with a pKa stronger than carboxylic acid, or any combination thereof to form a solution or solid comprising magnesium-anion salt, or a solid or solution comprising magnesium carboxylate, or any combination thereof and/or high purity, or high concentration, or high partial pressure, or captured, or separated, or any combination thereof carbon dioxide. In some embodiments, heat may be recovered and/or may be utilized in one or more or any combination of internal or external processes or process steps.

Example Chemistry of Some Embodiments (1) Reacting a solution comprising aqueous calcium sulfate with a solution comprising aqueous magnesium carboxylate to form, for example, aqueous calcium carboxylate and aqueous magnesium sulfate, wherein the reaction may be facilitated or enabled by electrodialysis metathesis. '(1)' may comprise, including, but not limited to, one or more or any combination of the following:

$$CaSO_4(aq) + Mg(Acetate)(aq) \rightarrow Ca(Acetate)(aq) + MgSO_4(aq)$$

$$CaSO_4(aq) + Mg(Formate)(aq) \rightarrow Ca(Formate)(aq) + MgSO_4(aq)$$

$$CaSO_4(aq) + Mg(Amino\ Acid\ Anion)(aq) \rightarrow Ca(Amino\ Acid\ Anion)(aq) + MgSO_4(aq)$$

(2) Reacting calcium carboxylate to form calcium sulfite or a solid comprising calcium sulfite. In some embodiments, calcium carboxylate may be directly reacted with sulfur dioxide to form calcium sulfite and/or carboxylic acid. In some embodiments, calcium carboxylate may be reacted with an alkali sulfite to form calcium sulfite and alkali carboxylate. In some embodiments, alkali carboxylate may be separated by, for example, solid-liquid separation, and/or further reacted with sulfur dioxide to form alkali sulfite and/or carboxylic acid, and/or, in some embodiments, at least a portion of the alkali sulfite may be separated from the carboxylic acid or aqueous carboxylic acid. In some embodiments, calcium amino acid anion salt may be reacted with carbon dioxide to form calcium carbonate and/or amino acid. In some embodiments, calcium amino acid anion salt may be reacted with an alkali carbonate, which may result in the formation of calcium carbonate and/or an alkali amino acid anion salt. In some embodiments, the alkali amino acid anion salt may be reacted with carbon dioxide to form alkali carbonate and amino acid, and/or, in some embodiments, the alkali carbonate may be at least partially separated from the amino acid. '(2)' may comprise, including, but not limited to, one or more or any combination of the following:

$Ca(Acetate)(aq)+SO_2(g\ or\ aq)+H_2O(l) \rightarrow CaSO_3(s)+$
Acetic Acid $Ca(Formate)(aq)+SO_2(g\ or\ aq)+H_2O(l) \rightarrow CaSO_3(s)+$
Formic Acid $Ca(Acetate)(aq)+Na_2SO_3(s\ or\ aq) \rightarrow Na(Acetate)(aq)+$
$CaSO_3(s)$ $Ca(Formate)(aq)+Na_2SO_3(s\ or\ aq) \rightarrow Na(Formate)$
$(aq)+CaSO_3(s)$ $Na(Acetate)(aq)+SO_2(g\ or\ aq)+H_2O(l) \rightarrow Na_2SO_3(s\ or\ aq)+Acetic\ Acid$ $Na(Formate)(aq)+SO_2(g\ or\ aq)+H_2O(l) \rightarrow Na_2SO_3(s\ or\ aq)+Formic\ Acid.$ In some embodiments, $Na_2SO_3$(s or aq) may be at least partially separated from Acetic Acid(aq).

In some embodiments, $Na_2SO_3$(s or aq) may be at least partially separated from Formic Acid(aq).

Note: In some embodiments, it may be desirable to concentrate or further concentrate the solution comprising aqueous calcium carboxylate before or during or after one or more or any combination of the above reactions.

$Ca(Amino\ Acid\ Anion)(aq)+CO_2(g\ or\ aq)+H_2O(l)$
$\rightarrow CaCO_3(s)+Amino\ Acid(aq)$ $Ca(Amino\ Acid\ Anion)(aq)+Na_2CO_3(s\ or\ aq) \rightarrow Na$
$(Amino\ Acid\ Anion)(aq)+CaCO_3(s)$ $Na(Amino\ Acid\ Anion)(aq)+CO_2(g\ or\ aq)+H_2O(l)$
$\rightarrow Na_2CO_3(s\ or\ aq)+Amino\ Acid(aq)$ In some embodiments, $Na_2CO_3$ (s or aq) may be at least partially separated from Amino Acid(aq). For example, $Na_2CO_3$ (s or aq) may be separated by concentrating and/or cooling precipitation.

Note: In some embodiments, it may be desirable to concentrate or further concentrate the solution comprising aqueous calcium amino acid before or during or after one or more or any combination of the above reactions.

(3) Reacting or decomposing calcium sulfite to form calcium oxide and/or sulfur dioxide. In some embodiments, calcium sulfite may be dehydrated using lower temperature heat or recovered heat or lower quality heat or lower cost heat or lower value energy, which may be conducted before, or during, or any combination thereof the thermal decomposition or calcination of calcium sulfite. In some embodiments, calcium oxide may be reacted with water to form calcium hydroxide and/or, in some embodiments, for example, at least a portion of heat may be recovered. In some embodiments, '(3)' may comprise, including, but not limited to, one or more or any combination of the following:

$CaSO_3(s) \rightarrow CaO(s)+SO_2(g)$ $CaO(s)+H_2O(l\ or\ g\ or\ s) \rightarrow Ca(OH)_2(s\ or\ aq)$ $CaSO_3 \cdot 2H_2O(s) \rightarrow CaSO_3(s)+2H_2O(g\ or\ l)$ $CaCO_3(s) \rightarrow CaO(s)+CO_2(g)$ $CO_2$(g) may comprise high purity, or high concentration, or high partial pressure, or high pressure, or captured, or any combination thereof carbon dioxide.

(4) Reacting or decomposing magnesium sulfate to form magnesium oxide, or sulfur trioxide, or diatomic oxygen, or water vapor, or sulfur dioxide, or any combination thereof. In some embodiments, magnesium sulfate may be dehydrated using lower temperature heat or recovered heat or lower quality heat or lower cost heat or lower value energy, which may be conducted before, or during, or any combination thereof the thermal decomposition or calcination of magnesium sulfate. In some embodiments, magnesium oxide may be reacted with water to form magnesium hydroxide and/or, in some embodiments, for example, at least a portion of heat may be recovered.

$MgSO_4(s) \rightarrow MgO(s)+SO_3(g)+\frac{1}{2}O_2(g)$ $MgO(s)+H_2O(l\ or\ g\ or\ s) \rightarrow Mg(OH)_2(s\ or\ aq)$ $MgSO_3 \cdot xH_2O(s) \rightarrow MgSO_3(s)+xH_2O(g\ or\ l)$ (5) Reacting to form sulfuric acid. Reacting sulfur trioxide, or diatomic oxygen, or water, or sulfur dioxide, or any combination thereof to form sulfuric acid. In some embodiments, for example, at least a portion of heat may be recovered.

$SO_3(g)+\frac{1}{2}O_2(g)+H_2O(g\ or\ l) \rightarrow H_2SO_4(l\ or\ aq)$ (6) Reacting magnesium oxide, or magnesium hydroxide, or magnesium carbonate, or any combination thereof to form magnesium-anion salt, or magnesium-carboxylate, or any combination thereof. In some embodiments, for example, at least a portion of heat may be recovered.

$MgO(s)+Acetic\ Acid(aq) \rightarrow Mg(Acetate)(aq)+H_2O(l)$ $MgO(s)+Formic\ Acid(aq) \rightarrow Mg(Formate)(aq)+H_2O(l)$ $MgO(s)+H_2O(l\ or\ g) \rightarrow Mg(OH)_2(s\ or\ aq)$ $MgO(s)+Amino\ Acid(aq) \rightarrow Mg(Amino\ Acid\ Anion)(s\ or\ aq)+H_2O(l)$ $MgO(s)+CO_2(g\ or\ aq) \rightarrow MgCO_3(s)$ $Mg(OH)_2(s\ or\ aq)+CO_2(g\ or\ aq) \rightarrow MgCO_3(s)+H_2O(l)$ $MgCO_3(s)+Acetic\ Acid(aq) \rightarrow Mg(Acetate)(aq)+CO_2(g)$ $CO_2(g)$ may comprise high purity, or high concentration, or high partial pressure, or high pressure, or captured, or any combination thereof carbon dioxide.

$$MgCO_3(s) + \text{Formic Acid}(aq) \rightarrow Mg(\text{Formate})(aq) + CO_2(g) \qquad 5$$

$CO_2(g)$ may comprise high purity, or high concentration, or high partial pressure, or high pressure, or captured, or any combination thereof carbon dioxide.

Example Detailed Description of Some Embodiments which may be related to Electrodialysis or Electrodialysis Metathesis (1) Calcium sulfate may be introduced into the process as a solid or an aqueous solution and/or may comprise or may be transformed into a solution comprising aqueous calcium sulfate.

Example Chemistry:

$$CaSO_4(s) + \text{Water} \rightarrow CaSO_4(aq)$$

$$CaSO_4(s) + CaSO_4(aq)(\text{Lean}) \rightarrow CaSO_4(aq)(\text{Rich})$$

Note: $CaSO_4$ may be dissolved in a diluate, or recirculating solution, or recirculating diluate, or any combination thereof comprising water.

Note: $CaSO_4$ may be added or dissolved in a dilute, or recirculating solution, or recirculating diluate, or any combination thereof comprising $CaSO_4(aq)$ at a lower concentration, such as a $CaSO_4$-Lean solution, to form a solution comprising $CaSO_4(aq)$ at a higher concentration, such as a $CaSO_4$-Rich solution.

(2) Magnesium-anion salt or magnesium carboxylate may be introduced into the process or may be formed within the process. In some embodiments, magnesium-anion salt or magnesium carboxylate may comprise a solid or aqueous solution and/or may comprise or may be transformed into a solution comprising aqueous magnesium-anion salt or magnesium carboxylate.

Note: A solution comprising magnesium anion (rich) may be transferred into an electrodialysis system in a flow channel with at least one side comprising an AEM and at least one side comprising a CEM. Additionally, a solution comprising $CaSO_4(aq)$ may be transferred into the electrodialysis system into a separate flow channel with at least one side comprising an AEM and at least one side comprising a CEM. In a flow channel between the opposing side of the CEM in contact with the solution comprising $CaSO_4(aq)$ and the opposing side of the AEM in contact with the solution comprising Mg(Anion)(aq), a solution comprising Ca(Anion) may be present and/or may form. In a flow channel between the opposing side of the CEM in contact with the solution comprising Mg(Anion)(aq) and the opposing side of the AEM in contact with the solution comprising $CaSO_4(aq)$, a solution comprising $MgSO_4(aq)$ may be present and/or may form. In some embodiments, at least a portion of sulfate anion from the solution comprising $CaSO_4(aq)$ may transfer through an AEM into the opposing flow channel and at least a portion of magnesium cation from the solution comprising Mg(Anion)(aq) may transfer through a CEM into the opposing flow channel, forming magnesium sulfate, or forming a solution comprising magnesium sulfate, or forming additional magnesium sulfate in a solution comprising magnesium sulfate, or any combination thereof. In some embodiments, at least a portion of calcium anion from the solution comprising $CaSO_4(aq)$ may transfer through a CEM into the opposing flow channel and at least a portion of 'anion' anion or carboxylate anion from the solution comprising Mg(Anion)(aq) may transfer through an AEM into the opposing flow channel, forming Ca(Anion)(aq), or forming a solution comprising calcium-anion salt or calcium carboxylate, or forming additional calcium-anion salt or calcium carboxylate in a solution comprising calcium-anion salt or calcium carboxylate, or any combination thereof. In some embodiments, the formed diluate comprising Mg(Anion)(aq) may comprise a lower concentration of Mg(Anion)(aq) than the feed solution comprising Mg(Anion)(aq), such as Mg(Anion)(aq)(lean), and/or the diluate comprising Mg(Anion)(aq)(lean) may be transferred to a step to dissolve or add Mg(Anion). In the some embodiments, the formed diluate comprising $CaSO_4(aq)$ may comprise a lower concentration of $CaSO_4(aq)$ than the feed solution comprising $CaSO_4(aq)$, such as $CaSO_4(aq)$(lean), and/or the diluate comprising $CaSO_4(aq)$(lean) may be transferred to a step wherein additional $CaSO_4$ may be added or dissolved to form, for example, $CaSO_4(aq)$ (rich), which may comprise the feed solution comprising $CaSO_4(aq)$ in the electrodialysis process. In some embodiments, a formed concentrate comprising $MgSO_4(aq)$, which may be formed during the electrodialysis metathesis process, may be further concentrated and/or at least a portion of $MgSO_4$ may be separated and/or crystallized or precipitated, and/or may comprise a valuable product and/or may be sold or employed in another process. In some embodiments, at least a portion of the diluate, or permeate, or condensate, or other water from the concentrating or separating or removal of at least a portion of $MgSO_4$, or makeup water, or any combination thereof may comprise at least a portion of a solution or water employed as a feed solution in a 'concentrate' forming flow channel in the electrodialysis process, if desired. In some embodiments, a portion of the remaining solution comprising $MgSO_4$ after the concentrating or separating or removal of at least a portion of $MgSO_4$ may be mixed with at least a portion of the diluate, or permeate, or condensate, or other water from the concentrating or separating or removal of at least a portion of $MgSO_4$, or makeup water, or any combination thereof, and/or the formed solution may comprise a $MgSO_4(aq)$(lean) feed solution in a $MgSO_4(aq)$ concentrate forming flow channel in the electrodialysis process. In some embodiments, the formed concentrate comprising Ca(Anion)(aq) may be further concentrated. In some embodiments, at least a portion of the Ca(Anion)(aq) may comprise a valuable product. In some embodiments, Ca(Anion)(aq) may be separated and/or crystallized or precipitated. In some embodiments, at least a portion of the diluate, or permeate, or condensate, or other water from the concentrating or separating or removal of at least a portion of Ca(Anion)(aq), or makeup water, or any combination thereof may comprise a solution or water employed as a feed solution in a 'concentrate' forming flow channel in the electrodialysis process. In some embodiments, a portion of the remaining solution comprising Ca(Anion)(aq) after the concentrating or separating or removal of at least a portion of Ca(Anion)(aq) may be mixed with at least a portion of the diluate, or permeate, or condensate, or other water from the concentrating or separating or removal of at least a portion of Ca(Anion)(aq), or makeup water, or any combination thereof, and/or the formed solution may comprise a Ca(Anion)(aq)(lean) feed solution in a Ca(Anion)(aq) concentrate forming flow channel in the electrodialysis process.

Note: Mg(anion)(aq) may be at a higher concentration or molarity than CaSO$_4$(aq) if desired.

Note: In some embodiments, it may be desirable to employ monovalent selective Anion Exchange Membrane (AEM) and monovalent selective Cation Exchange Membrane (CEM) for the AEM and CEM in contact with the solution comprising sodium chloride, to, for example, reduce or prevent the potential transfer of cations other than cations into the formed solution comprising magnesium sulfate, or reduce or prevent the potential transfer of anions other than 'anion' anions or carboxylic acid anions or monovalent anions into the formed solution comprising calcium-anion salt or calcium carboxylate.

Note: Mg(Anion) or Mg(Carboxylate) may be added or dissolved in a dilute, or recirculating solution, or recirculating diluate, or any combination thereof comprising Mg(Anion) or Mg(Carboxylate) at a lower concentration, such as a Mg(Anion)(aq) (Lean) or Mg(Carboxylate)(aq) (Lean) solution, to form a solution comprising Mg(Anion)(aq) or Mg(Carboxylate) at a higher concentration, such as a Mg(Anion)(aq) (Rich) or Mg(Carboxylate)(aq) (Rich) solution.

Note: In some embodiments, Mg(Anion) or Mg(Carboxylate) may be added to a diluate solution comprising Mg(Anion)(aq) or Mg(Carboxylate)(aq) to form a feed solution comprising Mg(Anion)(aq) or Mg(Carboxylate)(aq). In some embodiments, it may be desirable for the diluate to comprise at least a portion of residual dissolved Mg(Anion)(aq) or Mg(Carboxylate)(aq), for example, to reduce energy consumption and/or capital cost and/or sizing of the electrodialysis metathesis process. For example, in some embodiments, by transforming or transferring only a portion of the Mg(Anion)(aq) or Mg(Carboxylate)(aq) into Ca(Anion) or Ca(Carboxylate) and MgSO$_4$ and recirculating the remaining diluate solution comprising Mg(Anion)(aq) or Mg(Carboxylate)(aq), the energy consumption, CAPEX, and/or system sizing may be reduced or minimized. In some embodiments, it may be desirable for the diluate comprising Mg(Anion)(aq) or Mg(Carboxylate)(aq) to comprise a lower Mg(Anion)(aq) or Mg(Carboxylate)(aq) concentration or molarity than the concentration or molarity of the feed solution comprising Mg(Anion)(aq) or Mg(Carboxylate)(aq).

Note: In some embodiments, formed MgSO$_4$ concentrate may comprise a molarity or weight percent concentration greater than the molarity or weight percent concentration of feed solution comprising CaSO$_4$(aq), or greater than the molarity or weight percent concentration of feed solution comprising Mg(Anion)(aq) or Mg(Carboxylate)(aq), or any combination thereof, if desired.

Note: In some embodiments, formed Ca(Anion) or Ca(Carboxylate) concentrate may comprise a molarity or weight percent concentration greater than the molarity or weight percent concentration of feed solution comprising CaSO$_4$(aq), or greater than the molarity or weight percent concentration of feed solution comprising Mg(Anion)(aq) or Mg(Carboxylate)(aq), or any combination thereof, if desired.

(3) Aqueous calcium sulfate may be reacted with magnesium-anion salt or magnesium carboxylate in an electrodialysis metathesis step, which may form, for example, a concentrate comprising magnesium sulfate, or a concentrate comprising calcium-anion salt or calcium carboxylate, or a diluate comprising a low concentration of calcium sulfate than the concentration of calcium sulfate in the feed solution comprising calcium sulfate, or a diluate comprising a lower concentration of magnesium-anion salt or magnesium carboxylate than in the feed solution comprising magnesium-anion salt or magnesium carboxylate, or any combination thereof.

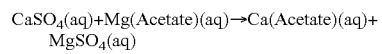

$$CaSO_4(aq)+Mg(Acetate)(aq) \rightarrow Ca(Acetate)(aq)+MgSO_4(aq)$$

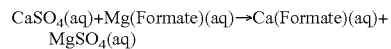

$$CaSO_4(aq)+Mg(Formate)(aq) \rightarrow Ca(Formate)(aq)+MgSO_4(aq)$$

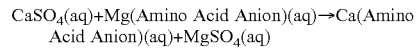

$$CaSO_4(aq)+Mg(Amino\ Acid\ Anion)(aq) \rightarrow Ca(Amino\ Acid\ Anion)(aq)+MgSO_4(aq)$$

Note: A solution comprising Mg(Anion)(aq) (rich) or Mg(Carboxylate)(aq) (rich) may be transferred into an electrodialysis system in a flow channel with at least one side comprising an AEM and at least one side comprising a CEM. Additionally, a solution comprising CaSO$_4$(aq) (rich) may be transferred into the electrodialysis system into a separate flow channel with at least one side comprising an AEM and at least one side comprising a CEM. In a flow channel between the opposing side of the CEM in contact with the solution comprising CaSO$_4$(aq) and the opposing side of the AEM in contact with the solution comprising Mg(Anion)(aq) or Mg(Carboxylate)(aq), a solution comprising Ca(Anion)(aq) or Ca(Carboxylate)(aq) may be present and/or may form. In a flow channel between the opposing side of the CEM in contact with the solution comprising Mg(Anion)(aq) or Mg(Carboxylate)(aq) and the opposing side of the AEM in contact with the solution comprising CaSO$_4$(aq), a solution comprising MgSO$_4$ may be present and/or may form. In some embodiments, at least a portion of sulfate anion from the solution comprising CaSO$_4$(aq) may transfer through an AEM into the opposing flow channel and at least a portion of magnesium cation from the solution comprising Mg(Anion)(aq) or Mg(Carboxylate)(aq) may transfer through a CEM into the opposing flow channel, forming magnesium sulfate, or forming a solution comprising magnesium sulfate, or forming additional magnesium sulfate in a solution comprising magnesium sulfate, or any combination thereof. In some embodiments, at least a portion of calcium anion from the solution comprising CaSO$_4$(aq) may transfer through a CEM into the opposing flow channel and at least a portion of 'anion' anion or carboxylate anion from the solution comprising Mg(Anion)(aq) or Mg(Carboxylate)(aq) may transfer through an AEM into the opposing flow channel, forming Ca(Anion) or Ca(Carboxylate), or forming a solution comprising Ca(Anion)(aq) or Ca(Carboxylate)(aq), or forming additional Ca(Anion)(aq) or Ca(Carboxylate)(aq), or forming Ca(Anion)(aq) or Ca(Carboxylate)(aq) in a solution comprising Ca(Anion)(aq) or Ca(Carboxylate)(aq), or any combination thereof. In some embodiments, the formed diluate comprising Mg(Anion)(aq) or Mg(Carboxylate)(aq) may comprise a lower concentration of Mg(Anion)(aq) or Mg(Carboxylate)(aq) than the feed solution comprising Mg(Anion)(aq) or Mg(Carboxylate)(aq), such as Mg(Anion)(aq)(lean) or Mg(Carboxylate)(aq)(lean), and/or the diluate comprising Mg(Anion)(aq)(lean) or Mg(Carboxylate)(aq)(lean) may be transferred to a step wherein Mg(Anion) or Mg(Carboxylate) may be added to form an Mg(Anion)(aq) (rich) or Mg(Carboxylate)(aq) (rich) solution. In some embodiments, the formed diluate comprising $CaSO_4$(aq) may comprise a lower concentration of $CaSO_4$(aq) than the feed solution comprising $CaSO_4$(aq), such as $CaSO_4$(aq)(lean), and/or the diluate comprising $CaSO_4$(aq)(lean) may be transferred to a step wherein additional $CaSO_4$ may be added or dissolved to form, for example, $CaSO_4$(aq) (rich), which may comprise the feed solution comprising $CaSO_4$(aq). In some embodiments, the formed concentrate comprising $MgSO_4$ may be further concentrated and/or at least a portion of $MgSO_4$ may be separated and/or crystallized or precipitated, and/or may comprise a valuable product and/or may be sold or employed in another process. In some embodiments, at least a portion of the diluate, or permeate, or condensate, or other water from the concentrating or separating or removal of at least a portion of $MgSO_4$, or makeup water, or any combination thereof may comprise a solution or water employed as a feed solution in a 'concentrate' forming flow channel in the electrodialysis process. In some embodiments, a portion of the remaining solution comprising $MgSO_4$ after the concentrating or separating or removal of at least a portion of $MgSO_4$ may be mixed with at least a portion of the diluate, or permeate, or condensate, or other water from the concentrating or separating or removal of at least a portion of $MgSO_4$, or makeup water, or any combination thereof, and/or the formed solution may comprise a $MgSO_4$(aq)(lean) feed solution in a $MgSO_4$(aq) concentrate forming flow channel in the electrodialysis process. In some embodiments, the formed concentrate comprising Ca(Anion)(aq) or Ca(Carboxylate)(aq) may be further concentrated. In some embodiments, at least a portion of the diluate, or permeate, or condensate, or other water from, for example, the concentrating or separating or removal of at least a portion of Ca(Anion)(aq) or Ca(Carboxylate)(aq), or makeup water, or any combination thereof may comprise a solution or water employed as a feed solution in a 'concentrate' forming flow channel in the electrodialysis process, if applicable or if desired. In some embodiments, a portion of the remaining solution comprising Ca(Anion)(aq) or Ca(Carboxylate)(aq) after the concentrating or separating or removal of at least a portion of Ca(Anion)(aq) or Ca(Carboxylate)(aq) may be mixed with at least a portion of the diluate, or permeate, or condensate, or other water from the concentrating or separating or removal of at least a portion of Ca(Anion)(aq) or Ca(Carboxylate)(aq), or makeup water, or any combination thereof, and/or the formed solution may comprise a Ca(Anion)(aq)(lean) or Ca(Carboxylate)(aq) (lean) feed solution in a Ca(Anion)(aq) or Ca(Carboxylate)(aq) concentrate forming flow channel in the electrodialysis process.

Note: In some embodiments, Mg(Anion)(aq) or Mg(Carboxylate)(aq) may be at a higher concentration or molarity than $CaSO_4$(aq) if desired.

Note: Mg(Anion)(aq) or Mg(Carboxylate)(aq) may be added or dissolved in a dilute, or recirculating solution, or recirculating diluate, or any combination thereof comprising Mg(Anion)(aq) or Mg(Carboxylate)(aq) at a lower concentration, such as a Mg(Anion)(aq) (Lean) or Mg(Carboxylate)(aq) (Lean) solution, to form a solution comprising Mg(Anion)(aq) or Mg(Carboxylate)(aq) at a higher concentration, such as a Mg(Anion)(aq) (Rich) or Mg(Carboxylate)(aq) (Rich) solution.

Note: In some embodiments, Mg(Anion) (s) or Mg(Carboxylate) (s) or Mg(Anion)(aq) or Mg(Carboxylate)(aq) may be added to a diluate solution comprising Mg(Anion)(aq) or Mg(Carboxylate)(aq) to form a feed solution comprising Mg(Anion)(aq) or Mg(Carboxylate)(aq). In some embodiments, it may be desirable for the diluate to comprise Mg(Anion)(aq) or Mg(Carboxylate)(aq), for example, to reduce energy consumption and/or capital cost and/or sizing of the electrodialysis metathesis process. For example, in some embodiments, by transforming or transferring only a portion of the Mg(Anion)(aq) or Mg(Carboxylate)(aq) into Ca(Anion)(aq) or Ca(Carboxylate)(aq) and $MgSO_4$ and recirculating the remaining diluate solution comprising Mg(Anion)(aq) or Mg(Carboxylate)(aq), the energy consumption, CAPEX, and/or system sizing may be reduced or minimized. In some embodiments, it may be desirable for the diluate comprising Mg(Anion)(aq) or Mg(Carboxylate)(aq) to comprise a lower Mg(Anion)(aq) or Mg(Carboxylate)(aq) concentration or molarity than the concentration or molarity of the feed solution comprising Mg(Anion)(aq) or Mg(Carboxylate)(aq).

Note: In some embodiments, formed $MgSO_4$ concentrate may comprise a molarity or weight percent concentration greater than the molarity or weight percent concentration of feed solution comprising $CaSO_4$(aq), or greater than the molarity or weight percent concentration of feed solution comprising Mg(Anion)(aq) or Mg(Carboxylate)(aq), or any combination thereof, if desired.

Note: In some embodiments, formed Ca(Anion)(aq) or Ca(Carboxylate)(aq) concentrate may comprise a molarity or weight percent concentration greater than the molarity or weight percent concentration of feed solution comprising $CaSO_4$(aq), or greater than the molarity or weight percent concentration of feed solution comprising Mg(Anion)(aq) or Mg(Carboxylate)(aq), or any combination thereof, if desired.

Example Notes

Note: In some embodiments, formed solution comprising magnesium sulfate, or formed solution comprising Ca(Anion)(aq) or Ca(Carboxylate)(aq), or any combination thereof may be at least partially concentrated by forward osmosis, wherein, for example, the solution comprising Mg(Anion)(aq) or Mg(Carboxylate)(aq) may comprise a draw solution, and/or the formed solution comprising Ca(Anion)(aq) or Ca(Carboxylate)(aq) may comprise the feed solution and/or the formed solution comprising Ca(Anion)(aq) or Ca(Carboxylate)(aq) may comprise the feed solution. In some embodiments, a solution comprising Mg(Anion)(aq) or Mg(Carboxylate)(aq) may be diluted while a solution comprising magnesium sulfate may be concentrated due to, for example, water transferred from the solution comprising magnesium sulfate to the solution comprising Mg(Anion)(aq) or Mg(Carboxylate)(aq) by means of, for example, forward osmosis. In some embodiments, a solution comprising Mg(Anion)(aq) or Mg(Carboxylate)(aq) may be diluted while a solution comprising Ca(Anion)(aq) or Ca(Carboxylate)(aq) may be concentrated due to, for example, water transferred from the solution comprising Ca(Anion)(aq) or Ca (Carboxylate)(aq) to the solution comprising Mg(Anion)(aq) or Mg(Carboxylate)(aq) by means of, for example, forward osmosis.

Note: Ca or Calcium may be provided as an example alkaline earth or alkaline earth cation. Other alkaline earths or alkaline earth cations or alkali-like cations may be employed instead of or in addition to Ca or calcium, for example, where calcium is described. For example, alkaline earths which may be employed instead of or in addition to calcium may include, but are not limited to, one or more or any combination of the following: calcium, or magnesium, or barium, or strontium, or beryllium, or radium.

Note: Na or Sodium may be provided as an example alkali or alkali cation. Other alkalis or alkali cations or alkali-like cations may be employed instead of or in addition to Na or sodium, for example, where sodium is described. For example, alkalis or alkali-like cations which may be employed instead of or in addition to sodium may include, but are not limited to, one or more or any combination of the following: sodium, or lithium, or potassium, or rubidium, or cesium, or ammonia, or ammonium.

Note: In some embodiments, at least a portion of magnesium sulfate may be concentrated by forward osmosis with a draw solution comprising Mg(Anion)(aq) or Mg(Carboxylate)(aq). For example, in some embodiments, Mg(Anion)(aq) or Mg(Carboxylate)(aq) may need to be diluted to be employed as an input or feed solution in an electrodialysis process. In some embodiments, at least a portion of a solution comprising aqueous Mg(Anion)(aq) or Mg(Carboxylate)(aq) may be diluted by being employed as a forward osmosis draw solution to concentrate a forward osmosis feed solution comprising sodium sulfate.

Note: In some embodiments, at least a portion of magnesium sulfate or Ca(Anion)(aq) or Ca(Carboxylate) (aq) may be concentrated using one or more or any combination of separation processes, which may include, but are not limited to, one or more or any combination of the following: reverse osmosis, or nanofiltration, or high pressure reverse osmosis, or osmotically assisted reverse osmosis, or forward osmosis, or membrane distillation, or distillation, or cooling precipitation, or electrodialysis, or electrodialysis reversal, or multi-effect distillation, or mechanical vapor compression distillation, or mechanical vapor recompression distillation, or any combination thereof.

Example Notes

Note: Carbon dioxide sources, or dilute carbon dioxide, or any combination thereof may comprise, including, but not limited to, one or more or any combination of the following: flue gas, or air, or $CO_2$ emissions, or emissions gas, or natural gas, or biogas, or combustion gas, or concentrating gas, or gas processing gas, or byproduct gas, or cement production, or internally produced gas, or gas from energy production, or gas from heat production, or geothermal gas, or captured $CO_2$, or pipeline $CO_2$, or transported $CO_2$, or electricity production $CO_2$, or power plant emissions, or chemical production emissions, or refinery emissions, or metal production emissions, or transportation emissions, or stationary source, or mobile source.

Note: In some embodiments, calcium oxide or calcium hydroxide may be reacted with carbon dioxide to form calcium carbonate.

Note: In some embodiments, it may be desirable for said 'anion' in the magnesium-anion salt to comprise an anion of an acid which is weaker than carbonic acid or aqueous carbon dioxide, or a pKa which is weaker than carbonic acid or aqueous carbon dioxide, or any combination thereof.

Note: In some embodiments, 'alkali' may refer to an alkali metal, or alkali metal cation, or a cation or chemical or compound with similar characteristics or reaction characteristics as alkalis, such as ammonia or ammonia, or any combination thereof.

Example Embodiments

1. A process comprising:
   reacting a component comprising calcium sulfate with a component comprising magnesium sulfite to form a solid comprising calcium sulfite and a solution comprising magnesium sulfate, and
   decomposing at least a portion of the solid comprising calcium sulfite to form a solid comprising calcium oxide, or calcium hydroxide, or cement, or clinker.
2. The process of example embodiment 1 wherein at least a portion of the magnesium sulfate is decomposed to form at least a portion of a solid comprising magnesium oxide and at least a portion of a gas comprising sulfur dioxide, or sulfur trioxide, or oxygen, or any combination thereof.
3. The process of example embodiment 2 wherein at least a portion of the gas comprising sulfur dioxide, or sulfur trioxide, or oxygen, or any combination thereof is reacted with water to form at least a portion of sulfuric acid.
4. The process of example embodiment 2 wherein at least a portion of the gas comprising sulfur dioxide, or sulfur trioxide, or oxygen, or any combination thereof is reacted with hydrogen sulfide to form at least a portion of sulfur.
5. The process of example embodiment 2 wherein the magnesium oxide is reacted with water to form at least a portion of magnesium hydroxide.
6. The process of example embodiment 5 wherein the magnesium hydroxide is reacted with sulfur dioxide to form at least a portion of a component comprising magnesium+sulfur dioxide salt, or magnesium sulfite, or magnesium bisulfite, or sulfur dioxide, or sulfurous acid, or any combination thereof.
7. The process of example embodiment 5 wherein the magnesium hydroxide is reacted with a gas comprising carbon dioxide to form a salt comprising magnesium+carbon dioxide, or magnesium carbonate, or magnesium bicarbonate, or any combination thereof; and then
   The salt comprising magnesium+carbon dioxide, or magnesium carbonate, or magnesium bicarbonate, or any combination thereof is reacted with sulfur dioxide to form at least a portion of a component comprising magnesium+sulfur dioxide salt, or magnesium sulfite, or magnesium bisulfite, or any combination thereof and a gas comprising captured carbon dioxide.
8. The process of example embodiment 1 wherein said magnesium sulfite comprises magnesium+sulfur dioxide salt, or magnesium sulfite, or magnesium bisulfite, or sulfur dioxide, or sulfurous acid, or any combination thereof.
9. The process of example embodiment 1 wherein a mixture comprising magnesium oxide, or magnesium hydroxide, or calcium sulfate, or water, or any combination thereof is reacted with at least a portion of sulfur dioxide, or sulfurous acid, or any combination thereof to form at least a portion of a component comprising magnesium sulfate and at least a portion of a component comprising calcium sulfite.
10. The process of example embodiment 1 wherein a mixture comprising magnesium oxide, or magnesium hydroxide, or magnesium carboxylate, or magnesium citrate, or citric acid, or carboxylic acid, or calcium sulfate, or water, or any combination thereof is reacted with at least a portion of sulfur dioxide, or sulfurous acid, or sulfite, or bisulfite, or any combination thereof to form at least a portion of a component comprising magnesium sulfate and at least a portion of a component comprising calcium sulfite.
11. The process of example embodiment 1 wherein calcium sulfite is decomposed in a kiln wherein at least a portion of sulfur dioxide is recovered.
12. The process of example embodiment 1 wherein magnesium sulfate may comprise a product.
13. The process of example embodiment 3 wherein at least a portion of heat is recovered from the production of sulfuric acid; and
  Wherein at least a portion of the recovered heat is used to facilitate the separation of water from magnesium sulfate, or the drying of magnesium sulfate, or the drying of calcium sulfite, or any combination thereof.
14. The process of example embodiment 1 wherein at least a portion of calcium oxide is reacted with water to form calcium hydroxide; and
  Wherein at least a portion of the heat, or descant properties of the reaction, or both are utilized to facilitate the separation of water from magnesium sulfate, or the drying of magnesium sulfate, or the drying of calcium sulfite, or any combination thereof.
15. A process comprising:
  reacting a component comprising calcium sulfate with a component comprising magnesium citrate to form a solid comprising calcium citrate and a solution comprising magnesium sulfate, and
  reacting at least a portion of the component comprising calcium citrate with at least a portion of sulfur dioxide, or sulfurous acid, or a derivative thereof to form at least a portion of a component comprising calcium+sulfur dioxide, or calcium sulfite, or calcium bisulfite, or any combination thereof; and
  decomposing at least a portion of the component comprising calcium+sulfur dioxide, or calcium sulfite, or calcium bisulfite, or any combination thereof to form a solid comprising calcium oxide, or calcium hydroxide, or cement, or clinker.
16. The process of example embodiment 15 wherein at least a portion of the magnesium sulfate is decomposed to form at least a portion of a solid comprising magnesium oxide and at least a portion of a gas comprising sulfur dioxide, or sulfur trioxide, or oxygen, or any combination thereof.
17. The process of example embodiment 16 wherein at least a portion of the gas comprising sulfur dioxide, or sulfur trioxide, or oxygen, or any combination thereof is reacted with water to form at least a portion of sulfuric acid.
18. The process of example embodiment 16 wherein at least a portion of the gas comprising sulfur dioxide, or sulfur trioxide, or oxygen, or any combination thereof is reacted with hydrogen sulfide to form at least a portion of sulfur.
19. The process of example embodiment 16 wherein the magnesium oxide is reacted with water to form at least a portion of magnesium hydroxide.
20. The process of example embodiment 19 wherein the magnesium hydroxide is reacted with citric acid to form at least a portion of a component comprising magnesium+citric acid salt, or magnesium citrate, or any combination thereof.
21. The process of example embodiment 19 wherein the magnesium hydroxide is reacted with a gas comprising carbon dioxide to form a salt comprising magnesium+carbon dioxide, or magnesium carbonate, or magnesium bicarbonate, or any combination thereof; and then
  The salt comprising magnesium+carbon dioxide, or magnesium carbonate, or magnesium bicarbonate, or any combination thereof is reacted with citric acid to form at least a portion of a component comprising magnesium+citric acid salt, or magnesium citrate, or any combination thereof and a gas comprising captured carbon dioxide.
22. The process of example embodiment 15 wherein said magnesium citrate comprises magnesium+citric acid salt, or magnesium citrate, or citric acid, or any combination thereof.
23. The process of example embodiment 15 wherein a mixture comprising magnesium oxide, or magnesium hydroxide, or calcium sulfate, or water, or any combination thereof is reacted with at least a portion of citric acid, or citrate, or any combination thereof to form at least a portion of a component comprising magnesium sulfate and at least a portion of a component comprising calcium citrate.
24. The process of example embodiment 15 wherein a mixture comprising magnesium oxide, or magnesium hydroxide, or magnesium carboxylate, or magnesium citrate, or citric acid, or carboxylic acid, or calcium sulfate, or water, or any combination thereof is reacted with at least a portion of sulfur dioxide, or sulfurous acid, or sulfite, or bisulfite, or any combination thereof to form at least a portion of a component comprising magnesium sulfate, or magnesium carboxylate, or any combination thereof and at least a portion of a component comprising calcium sulfite, or calcium carboxylate, or any combination thereof.
25. The process of example embodiment 15 wherein calcium sulfite is decomposed in a kiln wherein at least a portion of sulfur dioxide is recovered.
26. The process of example embodiment 15 wherein magnesium sulfate may comprise a product.
27. The process of example embodiment 17 wherein at least a portion of heat is recovered from the production of sulfuric acid; and
  Wherein at least a portion of the recovered heat is used to facilitate the separation of water from magnesium sulfate, or the drying of magnesium sulfate, or the drying of calcium sulfite, or any combination thereof.

28. The process of example embodiment 15 wherein at least a portion of calcium oxide is reacted with water to form calcium hydroxide; and Wherein at least a portion of the heat, or descant properties of the reaction, or both are utilized to facilitate the separation of water from magnesium sulfate, or the drying of magnesium sulfate, or the drying of calcium sulfite, or any combination thereof.

Example Notes

In some embodiments, a gas comprising carbon dioxide, or acid gas, or any combination thereof may comprise, including, but not limited to, one or more or any combination of the following: an emissions gas, or flue gas, or air, or a combustion gas, or a sour gas, or a sweet gas, or an acid gas, or flue gas, or natural gas, or biogas, or reforming gas, or tail gas, or stripping gas, or carrier gas, or gas mixture, or an acid gas, or sulfur dioxide, or hydrogen sulfide, or captured gas, or hydrogen gas, or acid gas mixtures known in the art, or acid gases known in the art.

Separation methods may include, but are not limited to, one or more or any combination of the following: reverse osmosis (RO), or nanofiltration (NF), or diffusion, or selective diffusion, or non-ionic selective diffusion, or electrodialysis (ED), or electro-deionization, or Ion Concentration Polarization (ICP), or membrane-based process, or forward osmosis, or high pressure reverse osmosis (HPRO), or osmotically assisted reverse osmosis, or monovalent selective electrodialysis, or ion selective separation, or vapor separation, or carrier gas separation, or carrier gas extraction, or membrane distillation, or stripping gas, or multi-effect distillation (MED), or multi-stage flash distillation (MSF), or mechanical vapor compression distillation (MVC), or extraction distillation, or conventional distillation, or column, or contactor, or membrane contactor, or countercurrent separation, or countercurrent exchange, or ion exchange, or ion exchange resin, or adsorption, or absorption, or freeze separation, or melt crystallization, or cryogenic separation, or forward osmosis (FO), or osmotically assisted reverse osmosis (OARO), or solid-liquid separation, or liquid-liquid separation, or gas-liquid separation, or phase transition separation, or single phase separation, or decanting, or clarification, or settling, or gravity based separation, or density based separation, or centrifuge, or coalescer, or centrifugation, or coalescing, or methods for separation known described herein, or methods for separation known in the art.

Temperatures, or operating temperatures, or any combination thereof may be less than, or equal to, or greater than, including, but not limited to, one or more or any combination of the following: −100 degrees Celsius, or −90 degrees Celsius, or −80 degrees Celsius, or −70 degrees Celsius, or −60 degrees Celsius, or −50 degrees Celsius, or −40 degrees Celsius, or −30 degrees Celsius, or −20 degrees Celsius, or −10 degrees Celsius, or 0 degrees Celsius, or 10 degrees Celsius, or 20 degrees Celsius, or 30 degrees Celsius, or 40 degrees Celsius, or 50 degrees Celsius, or 60 degrees Celsius, or 70 degrees Celsius, or 80 degrees Celsius, or 90 degrees Celsius, or 100 degrees Celsius, or 110 degrees Celsius, or 120 degrees Celsius, or 130 degrees Celsius, or 140 degrees Celsius, or 150 degrees Celsius, or 160 degrees Celsius, or 170 degrees Celsius, or 180 degrees Celsius, or 190 degrees Celsius, or 200 degrees Celsius, or 210 degrees Celsius, or 220 degrees Celsius, or 230 degrees Celsius, or 240 degrees Celsius, or 250 degrees Celsius, or 260 degrees Celsius, or 270 degrees Celsius, or 280 degrees Celsius, or 290 degrees Celsius, or 300 degrees Celsius, or 310 degrees Celsius, or 320 degrees Celsius, or 330 degrees Celsius, or 340 degrees Celsius, or 350 degrees Celsius, or 360 degrees Celsius, or 370 degrees Celsius, or 380 degrees Celsius, or 390 degrees Celsius, or 400 degrees Celsius, or 410 degrees Celsius, or 420 degrees Celsius, or 430 degrees Celsius, or 440 degrees Celsius, or 450 degrees Celsius, or 460 degrees Celsius, or 470 degrees Celsius, or 480 degrees Celsius, or 490 degrees Celsius, or 500 degrees Celsius, or 510 degrees Celsius, or 520 degrees Celsius, or 530 degrees Celsius, or 540 degrees Celsius, or 550 degrees Celsius, or 560 degrees Celsius, or 570 degrees Celsius, or 580 degrees Celsius, or 590 degrees Celsius, or 600 degrees Celsius, or 610 degrees Celsius, or 620 degrees Celsius, or 630 degrees Celsius, or 640 degrees Celsius, or 650 degrees Celsius, or 660 degrees Celsius, or 670 degrees Celsius, or 680 degrees Celsius, or 690 degrees Celsius, or 700 degrees Celsius, or 710 degrees Celsius, or 720 degrees Celsius, or 730 degrees Celsius, or 740 degrees Celsius, or 750 degrees Celsius, or 760 degrees Celsius, or 770 degrees Celsius, or 780 degrees Celsius, or 790 degrees Celsius, or 800 degrees Celsius, or 810 degrees Celsius, or 820 degrees Celsius, or 830 degrees Celsius, or 840 degrees Celsius, or 850 degrees Celsius, or 860 degrees Celsius, or 870 degrees Celsius, or 880 degrees Celsius, or 890 degrees Celsius, or 900 degrees Celsius, or 910 degrees Celsius, or 920 degrees Celsius, or 930 degrees Celsius, or 940 degrees Celsius, or 950 degrees Celsius, or 960 degrees Celsius, or 970 degrees Celsius, or 980 degrees Celsius, or 990 degrees Celsius, or 1000 degrees Celsius, or 1010 degrees Celsius, or 1020 degrees Celsius, or 1030 degrees Celsius, or 1040 degrees Celsius, or 1050 degrees Celsius, or 1060 degrees Celsius, or 1070 degrees Celsius, or 1080 degrees Celsius, or 1090 degrees Celsius, or 1100 degrees Celsius, or 1110 degrees Celsius, or 1120 degrees Celsius, or 1130 degrees Celsius, or 1140 degrees Celsius, or 1150 degrees Celsius, or 1160 degrees Celsius, or 1170 degrees Celsius, or 1180 degrees Celsius, or 1190 degrees Celsius, or 1200 degrees Celsius, or 1210 degrees Celsius, or 1220 degrees Celsius, or 1230 degrees Celsius, or 1240 degrees Celsius, or 1250 degrees Celsius, or 1260 degrees Celsius, or 1270 degrees Celsius, or 1280 degrees Celsius, or 1290 degrees Celsius, or 1300 degrees Celsius, or 1310 degrees Celsius, or 1320 degrees Celsius, or 1330 degrees Celsius, or 1340 degrees Celsius, or 1350 degrees Celsius, or 1360 degrees Celsius, or 1370 degrees Celsius, or 1380 degrees Celsius, or 1390 degrees Celsius, or 1400 degrees Celsius, or 1410 degrees Celsius, or 1420 degrees Celsius, or 1430 degrees Celsius, or 1440 degrees Celsius, or 1450 degrees Celsius, or 1460 degrees Celsius, or 1470 degrees Celsius, or 1480 degrees Celsius, or 1490 degrees Celsius, or 1500 degrees Celsius, or 1510 degrees Celsius, or 1520 degrees Celsius, or 1530 degrees Celsius, or 1540 degrees Celsius, or 1550 degrees Celsius, or 1560 degrees Celsius, or 1570 degrees Celsius, or 1580 degrees Celsius, or 1590 degrees Celsius, or 1600 degrees Celsius, or 1610 degrees Celsius, or 1620 degrees Celsius, or 1630 degrees Celsius, or 1640 degrees Celsius, or 1650 degrees Celsius, or 1660 degrees Celsius, or 1670 degrees Celsius, or 1680 degrees Celsius, or 1690 degrees Celsius, or 1700 degrees Celsius, or 1710 degrees Celsius, or 1720 degrees Celsius, or 1730 degrees Celsius, or 1740 degrees Celsius, or 1750 degrees Celsius, or 1760 degrees Celsius, or 1770 degrees Celsius, or 1780 degrees Celsius, or 1790 degrees Celsius, or 1800 degrees Celsius, or 1810 degrees Celsius, or 1820 degrees Celsius, or 1830 degrees Celsius, or 1840 degrees Celsius, or 1850 degrees Celsius, or 1860 degrees Celsius, or 1870 degrees Celsius, or 1880 degrees Celsius, or 1890 degrees Celsius, or 1900 degrees Celsius, or 1910 degrees Celsius, or 1920 degrees Celsius, or 1930 degrees Celsius, or 1940 degrees Celsius, or 1950 degrees Celsius, or 1960 degrees Celsius, or 1970 degrees Celsius, or 1980 degrees Celsius, or 1990 degrees Celsius, or 2000 degrees Celsius, or 2010 degrees Celsius, or 2020 degrees Celsius, or 2030 degrees Celsius, or 2040 degrees Celsius, or 2050 degrees Celsius, or 2060 degrees Celsius, or 2070 degrees Celsius, or 2080 degrees Celsius, or 2090 degrees Celsius, or 2100 degrees Celsius, or 2110 degrees Celsius, or 2120 degrees Celsius, or 2130 degrees Celsius, or 2140 degrees Celsius, or 2150 degrees Celsius, or 2160 degrees Celsius, or 2170 degrees Celsius, or 2180 degrees Celsius, or 2190 degrees Celsius, or 2200 degrees Celsius, or 2210 degrees Celsius, or 2220 degrees Celsius, or 2230 degrees Celsius, or 2240 degrees Celsius, or 2250 degrees Celsius, or 2260 degrees Celsius, or 2270 degrees Celsius, or 2280 degrees Celsius, or 2290 degrees Celsius, or 2300 degrees Celsius, or 2310 degrees Celsius, or 2320 degrees Celsius, or 2330 degrees Celsius, or 2340 degrees Celsius, or 2350 degrees Celsius, or 2360 degrees Celsius, or 2370 degrees Celsius, or 2380 degrees Celsius, or 2390 degrees Celsius, or 2400 degrees Celsius, or 2410 degrees Celsius, or 2420 degrees Celsius, or 2430 degrees Celsius, or 2440 degrees Celsius, or 2450 degrees Celsius, or 2460 degrees Celsius, or 2470 degrees Celsius, or 2480 degrees Celsius, or 2490 degrees Celsius, or 2500 degrees Celsius.

Pressures, or operating pressures, or any combination thereof may be less than, or equal to, or greater than, including, but not limited to, one or more or any combination of the following: 0.0001 Bar, 0.001 Bar, or 0.005 Bar, or 0.01 Bar, or 0.05 Bar, or 0.10 Bar, or 0.15 Bar, or 0.20 Bar, or 0.25 Bar, or 0.30 Bar, or 0.35 Bar, or 0.40 Bar, or 0.45 Bar, 0.5 Bar, or 1 Bar, or 1.5 Bar, or 2 Bar, or 2.5 Bar, or 3 Bar, or 3.5 Bar, or 4 Bar, or 4.5 Bar, or 5 Bar, or 5.5 Bar, or 6 Bar, or 6.5 Bar, or 7 Bar, or 7.5 Bar, or 8 Bar, or 8.5 Bar, or 9 Bar, or 9.5 Bar, or 10 Bar, or 10.5 Bar, or 11 Bar, or 11.5 Bar, or 12 Bar, or 12.5 Bar, or 13 Bar, or 13.5 Bar, or 14 Bar, or 14.5 Bar, or 15 Bar, or 15.5 Bar, or 16 Bar, or 16.5 Bar, or 17 Bar, or 17.5 Bar, or 18 Bar, or 18.5 Bar, or 19 Bar, or 19.5 Bar, or 20 Bar, or 20.5 Bar, or 21 Bar, or 21.5 Bar, or 22 Bar, or 22.5 Bar, or 23 Bar, or 23.5 Bar, or 24 Bar, or 24.5 Bar, or 25 Bar, or 25.5 Bar, or 26 Bar, or 26.5 Bar, or 27 Bar, or 27.5 Bar, or 28 Bar, or 28.5 Bar, or 29 Bar, or 29.5 Bar, or 30 Bar, or 30.5 Bar, or 31 Bar, or 31.5 Bar, or 32 Bar, or 32.5 Bar, or 33 Bar, or 33.5 Bar, or 34 Bar, or 34.5 Bar, or 35 Bar, or 35.5 Bar, or 36 Bar, or 36.5 Bar, or 37 Bar, or 37.5 Bar, or 38 Bar, or 38.5 Bar, or 39 Bar, or 39.5 Bar, or 40 Bar, or 40.5 Bar, or 41 Bar, or 41.5 Bar, or 42 Bar, or 42.5 Bar, or 43 Bar, or 43.5 Bar, or 44 Bar, or 44.5 Bar, or 45 Bar, or 45.5 Bar, or 46 Bar, or 46.5 Bar, or 47 Bar, or 47.5 Bar, or 48 Bar, or 48.5 Bar, or 49 Bar, or 49.5 Bar, or 50 Bar, or 50 Bar, or 75 Bar, or 100 Bar, or 125 Bar, or 150 Bar, or 175 Bar, or 200 Bar, or 225 Bar, or 250 Bar, or 275 Bar, or 300 Bar, or 325 Bar, or 350 Bar, or 375 Bar, or 400 Bar, or 425 Bar, or 450 Bar, or 475 Bar, or 500 Bar, or 525 Bar, or 550 Bar, or 575 Bar, or 600 Bar, or 625 Bar, or 650 Bar, or 675 Bar, or 700 Bar, or 725 Bar, or 750 Bar, or 775 Bar, or 800 Bar, or 825 Bar, or 850 Bar, or 875 Bar, or 900 Bar, or 925 Bar, or 950 Bar, or 975 Bar, or 1000 Bar, or 1025 Bar, or 1050 Bar, or 1075 Bar, or 1100 Bar, or 1125 Bar, or 1150 Bar, or 1175 Bar, or 1200 Bar, or 1225 Bar, or 1250 Bar, or 1275 Bar, or 1300 Bar, or 1325 Bar, or 1350 Bar, or 1375 Bar, or 1400 Bar, or 1425 Bar, or 1450 Bar, or 1475 Bar, or 1500 Bar, or 1525 Bar, or 1550 Bar, or 1575 Bar, or 1600 Bar, or 1625 Bar, or 1650 Bar, or 1675 Bar, or 1700 Bar, or 1725 Bar, or 1750 Bar, or 1775 Bar, or 1800 Bar, or 1825 Bar, or 1850 Bar, or 1875 Bar, or 1900 Bar, or 1925 Bar, or 1950 Bar, or 1975 Bar, or 2000 Bar.

Concentrations of a component in weight percent or mass percent concentration (wt %) may be less than, or equal to, or greater than, including, but not limited to, one or more or any combination of the following: 0.0001 wt %, or 0.001 wt %, or 0.01 wt %, or 0.025 wt %, or 0.05 wt %, or 0.10 wt %, or 0.15 wt %, or 0.20 wt %, or 0.25 wt %, or 0.30 wt %, or 0.35 wt %, or 0.40 wt %, or 0.45 wt %, or 0.5 wt %, or 1 wt %, or 1.5 wt %, or 2 wt %, or 2.5 wt %, or 3 wt %, or 3.5 wt %, or 4 wt %, or 4.5 wt %, or 5 wt %, or 5.5 wt %, or 6 wt %, or 6.5 wt %, or 7 wt %, or 7.5 wt %, or 8 wt %, or 8.5 wt %, or 9 wt %, or 9.5 wt %, or 10 wt %, or 10.5 wt %, or 11 wt %, or 11.5 wt %, or 12 wt %, or 12.5 wt %, or 13 wt %, or 13.5 wt %, or 14 wt %, or 14.5 wt %, or 15 wt %, or 15.5 wt %, or 16 wt %, or 16.5 wt %, or 17 wt %, or 17.5 wt %, or 18 wt %, or 18.5 wt %, or 19 wt %, or 19.5 wt %, or 20 wt %, or 20.5 wt %, or 21 wt %, or 21.5 wt %, or 22 wt %, or 22.5 wt %, or 23 wt %, or 23.5 wt %, or 24 wt %, or 24.5 wt %, or 25 wt %, or 25.5 wt %, or 26 wt %, or 26.5 wt %, or 27 wt %, or 27.5 wt %, or 28 wt %, or 28.5 wt %, or 29 wt %, or 29.5 wt %, or 30 wt %, or 30.5 wt %, or 31 wt %, or 31.5 wt %, or 32 wt %, or 32.5 wt %, or 33 wt %, or 33.5 wt %, or 34 wt %, or 34.5 wt %, or 35 wt %, or 35.5 wt %, or 36 wt %, or 36.5 wt %, or 37 wt %, or 37.5 wt %, or 38 wt %, or 38.5 wt %, or 39 wt %, or 39.5 wt %, or 40 wt %, or 40.5 wt %, or 41 wt %, or 41.5 wt %, or 42 wt %, or 42.5 wt %, or 43 wt %, or 43.5 wt %, or 44 wt %, or 44.5 wt %, or 45 wt %, or 45.5 wt %, or 46 wt %, or 46.5 wt %, or 47 wt %, or 47.5 wt %, or 48 wt %, or 48.5 wt %, or 49 wt %, or 49.5 wt %, or 50 wt %, or 50.5 wt %, or 51 wt %, or 51.5 wt %, or 52 wt %, or 52.5 wt %, or 53 wt %, or 53.5 wt %, or 54 wt %, or 54.5 wt %, or 55 wt %, or 55.5 wt %, or 56 wt %, or 56.5 wt %, or 57 wt %, or 57.5 wt %, or 58 wt %, or 58.5 wt %, or 59 wt %, or 59.5 wt %, or 60 wt %, or 60.5 wt %, or 61 wt %, or 61.5 wt %, or 62 wt %, or 62.5 wt %, or 63 wt %, or 63.5 wt %, or 64 wt %, or 64.5 wt %, or 65 wt %, or 65.5 wt %, or 66 wt %, or 66.5 wt %, or 67 wt %, or 67.5 wt %, or 68 wt %, or 68.5 wt %, or 69 wt %, or 69.5 wt %, or 70 wt %, or 70.5 wt %, or 71 wt %, or 71.5 wt %, or 72 wt %, or 72.5 wt %, or 73 wt %, or 73.5 wt %, or 74 wt %, or 74.5 wt %, or 75 wt %, or 75.5 wt %, or 76 wt %, or 76.5 wt %, or 77 wt %, or 77.5 wt %, or 78 wt %, or 78.5 wt %, or 79 wt %, or 79.5 wt %, or 80 wt %, or 80.5 wt %, or 81 wt %, or 81.5 wt %, or 82 wt %, or 82.5 wt %, or 83 wt %, or 83.5 wt %, or 84 wt %, or 84.5 wt %, or 85 wt %, or 85.5 wt %, or 86 wt %, or 86.5 wt %, or 87 wt %, or 87.5 wt %, or 88 wt %, or 88.5 wt %, or 89 wt %, or 89.5 wt %, or 90 wt %, or 90.5 wt %, or 91 wt %, or 91.5 wt %, or 92 wt %, or 92.5 wt %, or 93 wt %, or 93.5 wt %, or 94 wt %, or 94.5 wt %, or 95 wt %, or 95.5 wt %, or 96 wt %, or 96.5 wt %, or 97 wt %, or 97.5 wt %, or 98 wt %, or 98.5 wt %, or 99 wt %, or 99.5 wt %, or 100 wt %. 'wt %' may comprise weight percent or mass percent concentration.

Concentrations of a component in volume percent or volume fraction concentration (vol %) may be less than, or equal to, or greater than, including, but not limited to, one or more or any combination of the following: 0.0001 vol %, or 0.001 vol %, or 0.01 vol %, or 0.025 vol %, or 0.05 vol %, or 0.10 vol %, or 0.15 vol %, or 0.20 vol %, or 0.25 vol %, or 0.30 vol %, or 0.35 vol %, or 0.40 vol %, or 0.45 vol %, or 0.5 vol %, or 1 vol %, or 1.5 vol %, or 2 vol %, or 2.5 vol %, or 3 vol %, or 3.5 vol %, or 4 vol %, or 4.5 vol %, or 5 vol %, or 5.5 vol %, or 6 vol %, or 6.5 vol %, or 7 vol %, or 7.5 vol %, or 8 vol %, or 8.5 vol %, or 9 vol %, or 9.5 vol %, or 10 vol %, or 10.5 vol %, or 11 vol %, or 11.5 vol %, or 12 vol %, or 12.5 vol %, or 13 vol %, or 13.5 vol %, or 14 vol %, or 14.5 vol %, or 15 vol %, or 15.5 vol %, or 16 vol %, or 16.5 vol %, or 17 vol %, or 17.5 vol %, or 18 vol %, or 18.5 vol %, or 19 vol %, or 19.5 vol %, or 20 vol %, or 20.5 vol %, or 21 vol %, or 21.5 vol %, or 22 vol %, or 22.5 vol %, or 23 vol %, or 23.5 vol %, or 24 vol %, or 24.5 vol %, or 25 vol %, or 25.5 vol %, or 26 vol %, or 26.5 vol %, or 27 vol %, or 27.5 vol %, or 28 vol %, or 28.5 vol %, or 29 vol %, or 29.5 vol %, or 30 vol %, or 30.5 vol %, or 31 vol %, or 31.5 vol %, or 32 vol %, or 32.5 vol %, or 33 vol %, or 33.5 vol %, or 34 vol %, or 34.5 vol %, or 35 vol %, or 35.5 vol %, or 36 vol %, or 36.5 vol %, or 37 vol %, or 37.5 vol %, or 38 vol %, or 38.5 vol %, or 39 vol %, or 39.5 vol %, or 40 vol %, or 40.5 vol %, or 41 vol %, or 41.5 vol %, or 42 vol %, or 42.5 vol %, or 43 vol %, or 43.5 vol %, or 44 vol %, or 44.5 vol %, or 45 vol %, or 45.5 vol %, or 46 vol %, or 46.5 vol %, or 47 vol %, or 47.5 vol %, or 48 vol %, or 48.5 vol %, or 49 vol %, or 49.5 vol %, or 50 vol %, or 50.5 vol %, or 51 vol %, or 51.5 vol %, or 52 vol %, or 52.5 vol %, or 53 vol %, or 53.5 vol %, or 54 vol %, or 54.5 vol %, or 55 vol %, or 55.5 vol %, or 56 vol %, or 56.5 vol %, or 57 vol %, or 57.5 vol %, or 58 vol %, or 58.5 vol %, or 59 vol %, or 59.5 vol %, or 60 vol %, or 60.5 vol %, or 61 vol %, or 61.5 vol %, or 62 vol %, or 62.5 vol %, or 63 vol %, or 63.5 vol %, or 64 vol %, or 64.5 vol %, or 65 vol %, or 65.5 vol %, or 66 vol %, or 66.5 vol %, or 67 vol %, or 67.5 vol %, or 68 vol %, or 68.5 vol %, or 69 vol %, or 69.5 vol %, or 70 vol %, or 70.5 vol %, or 71 vol %, or 71.5 vol %, or 72 vol %, or 72.5 vol %, or 73 vol %, or 73.5 vol %, or 74 vol %, or 74.5 vol %, or 75 vol %, or 75.5 vol %, or 76 vol %, or 76.5 vol %, or 77 vol %, or 77.5 vol %, or 78 vol %, or 78.5 vol %, or 79 vol %, or 79.5 vol %, or 80 vol %, or 80.5 vol %, or 81 vol %, or 81.5 vol %, or 82 vol %, or 82.5 vol %, or 83 vol %, or 83.5 vol %, or 84 vol %, or 84.5 vol %, or 85 vol %, or 85.5 vol %, or 86 vol %, or 86.5 vol %, or 87 vol %, or 87.5 vol %, or 88 vol %, or 88.5 vol %, or 89 vol %, or 89.5 vol %, or 90 vol %, or 90.5 vol %, or 91 vol %, or 91.5 vol %, or 92 vol %, or 92.5 vol %, or 93 vol %, or 93.5 vol %, or 94 vol %, or 94.5 vol %, or 95 vol %, or 95.5 vol %, or 96 vol %, or 96.5 vol %, or 97 vol %, or 97.5 vol %, or 98 vol %, or 98.5 vol %, or 99 vol %, or 99.5 vol %, or 100 vol %

Concentrations of a component in grams per kg (g/kg) of solvent may be less than, or equal to, or greater than, including, but not limited to, one or more or any combination of the following: 0.001 g/kg, 0.005 g/kg, 0.01 g/kg, 0.025 g/kg, 0.05 g/kg, or 0.10 g/kg, or 0.15 g/kg, or 0.20 g/kg, or 0.25 g/kg, or 0.30 g/kg, or 0.35 g/kg, or 0.40 g/kg, or 0.45 g/kg, or 0.5 g/kg, or 1 g/kg, or 1.5 g/kg, or 2 g/kg, or 2.5 g/kg, or 3 g/kg, or 3.5 g/kg, or 4 g/kg, or 4.5 g/kg, or 5 g/kg, or 5.5 g/kg, or 6 g/kg, or 6.5 g/kg, or 7 g/kg, or 7.5 g/kg, or 8 g/kg, or 8.5 g/kg, or 9 g/kg, or 9.5 g/kg, or 10 g/kg, or 20 g/kg, or 30 g/kg, or 40 g/kg, or 50 g/kg, or 60 g/kg, or 70 g/kg, or 80 g/kg, or 90 g/kg, or 100 g/kg, or 110 g/kg, or 120 g/kg, or 130 g/kg, or 140 g/kg, or 150 g/kg, or 160 g/kg, or 170 g/kg, or 180 g/kg, or 190 g/kg, or 200 g/kg, or 210 g/kg, or 220 g/kg, or 230 g/kg, or 240 g/kg, or 250 g/kg, or 260 g/kg, or 270 g/kg, or 280 g/kg, or 290 g/kg, or 300 g/kg, or 310 g/kg, or 320 g/kg, or 330 g/kg, or 340 g/kg, or 350 g/kg, or 360 g/kg, or 370 g/kg, or 380 g/kg, or 390 g/kg, or 400 g/kg, or 410 g/kg, or 420 g/kg, or 430 g/kg, or 440 g/kg, or 450 g/kg, or 460 g/kg, or 470 g/kg, or 480 g/kg, or 490 g/kg, or 500 g/kg, or 510 g/kg, or 520 g/kg, or 530 g/kg, or 540 g/kg, or 550 g/kg, or 560 g/kg, or 570 g/kg, or 580 g/kg, or 590 g/kg, or 600 g/kg, or 610 g/kg, or 620 g/kg, or 630 g/kg, or 640 g/kg, or 650 g/kg, or 660 g/kg, or 670 g/kg, or 680 g/kg, or 690 g/kg, or 700 g/kg, or 710 g/kg, or 720 g/kg, or 730 g/kg, or 740 g/kg, or 750 g/kg, or 760 g/kg, or 770 g/kg, or 780 g/kg, or 790 g/kg, or 800 g/kg, or 810 g/kg, or 820 g/kg, or 830 g/kg, or 840 g/kg, or 850 g/kg, or 860 g/kg, or 870 g/kg, or 880 g/kg, or 890 g/kg, or 900 g/kg, or 910 g/kg, or 920 g/kg, or 930 g/kg, or 940 g/kg, or 950 g/kg, or 960 g/kg, or 970 g/kg, or 980 g/kg, or 990 g/kg, or 1000 g/kg In some embodiments, a reactor design or configuration may include, but are not limited to, one or more or any combination of the following: batch reactor, or semi-batch reactor, or continuous reactor, or laminar reactor, or turbulent reactor, or stirred reactor, or mixing reactor, or cooled reactor, or heated reactor, or kiln, or gas-liquid contactor, or solid-liquid contactor, or solid-gas contactor, or rotating reactor, or continuous stirred reactor, or CSTR, or electrical reactor, or energized reactor, or reducing reagent reactor, or reactor with carbonaceous reducing agent, or reactor with hydrogen reducing agent, or reactor with hydrogenous reducing agent, or reactor with a reducing agent, or reactor with sulfurous reducing agent, or reactor with nitrogenous reducing reagent, or reactor with a catalyst, or an absorption column, or an absorber, or a sparger, or a separator, or a cascading reactor, or a single stage reactor, or a multi-stage reactor, or an electrically charged reactor, or a light-based reactor, or a calciner, or a solid-liquid separator, or a membrane based reactor, or an electrochemical reactor, or a photochemical reactor, or a bioreactor, or a thermal reactor, or a oxygen reduced reactor, or an oxygen rich reactor, or an oxygen lean reactor, or a pyrolysis reactor, or an autocatalytic reactor, or a catalyzed reactor, or an indirect reactor, or a direct reactor, or a reactor described herein, or a reactor a reactor described in the art, or a derivative thereof.

In some embodiments, magnesium carbonate, or magnesium bicarbonate, or magnesium sesquicarbonate, or any combination thereof may be decomposed to form at least a portion of carbon dioxide and/or at least a portion of magnesium carbonate.

In some embodiments, calcium carbonate, or calcium bicarbonate, or calcium sesquicarbonate, or any combination thereof may be decomposed to form at least a portion of carbon dioxide and/or at least a portion of calcium carbonate.

In some embodiments, sodium carbonate, or sodium bicarbonate, or sodium sesquicarbonate, or any combination thereof may be decomposed to form at least a portion of carbon dioxide and/or at least a portion of sodium carbonate.

In some embodiments, at least a portion of a salt comprising sodium carbonate, or sodium bicarbonate, or sodium sesquicarbonate, or any combination thereof may be reacted with at least a portion of a salt comprising calcium oxide or calcium hydroxide to form at least a portion of a salt comprising sodium hydroxide and/or at least a portion of a salt comprising calcium carbonate. In some embodiments, at least a portion of any formed salt comprising calcium carbonate may be utilized within the process or recirculated. In some embodiments, at least a portion of any formed salt comprising calcium carbonate may be decomposed or reacted in a manner to produce, for example, a salt comprising calcium oxide, or calcium hydroxide, or carbon dioxide, or captured carbon dioxide, or calcium carbonate, or calcium sulfite, or calcium carboxylate, or calcium sulfate, or any combination thereof. In some embodiments, at least a portion of any formed salt comprising sodium hydroxide may comprise a valuable product, or may comprise an intermediate, or may be purified, or may be further purified, or may be concentrated, or may be further concentrated, or may be crystallized, or any combination thereof.

In some embodiments, a component comprising magnesium sulfite may comprise magnesium bisulfite, or magnesium sulfite, magnesium+sulfur dioxide salt, or magnesium+sulfur dioxide derivative, or magnesium sesquisulfite, or magnesium metabisulfite, or free sulfur dioxide, or magnesium acetate, or magnesium sulfate, or sulfate, or calcium, or any combination thereof. In some embodiments, the molar ratio of magnesium:sulfur may be greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10. In some embodiments, the molar ratio of magnesium:sulfur dioxide may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10. In some embodiments, the molar ratio of magnesium:sulfur dioxide derivative, or sulfite, or bisulfite, or sulfurous acid, or any combination thereof may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10.

In some embodiments, a component comprising calcium sulfite may comprise calcium bisulfite, or calcium sulfite, calcium+sulfur dioxide salt, or calcium+sulfur dioxide derivative, or calcium sesquisulfite, or calcium metabisulfite, or free sulfur dioxide, or calcium acetate, or calcium citrate, or calcium sulfate, or sulfate, or magnesium, or any combination thereof. In some embodiments, the molar ratio of calcium:sulfur may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10. In some embodiments, the molar ratio of calcium:sulfur dioxide may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10. In some embodiments, the molar ratio of calcium:sulfur dioxide derivative, or sulfite, or bisulfite, or sulfurous acid, or any combination thereof may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10.

In some embodiments, a component comprising sodium sulfite may comprise sodium bisulfite, or sodium sulfite, sodium+sulfur dioxide salt, or sodium+sulfur dioxide derivative, or sodium sesquisulfite, or sodium metabisulfite, or free sulfur dioxide, or sodium acetate, or sodium sulfate, or sulfate, or calcium, or any combination thereof. In some embodiments, the molar ratio of sodium:sulfur may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10. In some embodiments, the molar ratio of sodium:sulfur dioxide may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10. In some embodiments, the molar ratio of sodium:sulfur dioxide derivative, or sulfite, or bisulfite, or sulfurous acid, or any combination thereof may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:6, or 1:7, or 1:8, or 1:9, or 1:10.

In some embodiments, a component comprising calcium citrate may comprise calcium citrate, or calcium+citric acid salt, calcium+citric acid derivative, or calcium acetate, or calcium+carboxylic acid, or calcium carboxylate or calcium sulfate, or sulfate, or magnesium, or any combination thereof. In some embodiments, the molar ratio of calcium:citric acid may be less than, or greater than, or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:10. In some embodiments, the molar ratio of calcium:citrate may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:10. In some embodiments, the molar ratio of calcium:carboxylate, or carboxylic acid, or any combination thereof may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:10.

In some embodiments, a component comprising magnesium citrate may comprise magnesium citrate, or magnesium+citric acid salt, magnesium+citric acid derivative, or magnesium acetate, or magnesium+carboxylic acid, or magnesium carboxylate or magnesium sulfate, or sulfate, or magnesium, or any combination thereof. In some embodiments, the molar ratio of magnesium:citric acid may be less than, or greater than, or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:10. In some embodiments, the molar ratio of magnesium:citrate may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:10. In some embodiments, the molar ratio of magnesium:carboxylate, or carboxylic acid, or any combination thereof may be less than or greater than or equal to, including, but not limited to, one or more or any combination of the following: 1:0.001, or 1:0.01, or 1:0.1, or 1:0.2, or 1:0.3, or 1:0.4, or 1:0.5, or 1:0.6, or 1:0.7, or 1:0.8, or 1:0.9, or 1:1, or 1:1.1, or 1:1.2, or 1:1.3, or 1:1.4, or 1:1.5, or 1:1.75, or 1:2, or 1:2.5, or 1:3, or 1:3.5, or 1:4, or 1:4.5, or 1:5, or 1:10.

In some embodiments, 'x' anion, or 'x'-anion, or 'x', or any combination thereof may comprise an anion, or acid, or anion derivative, or any combination thereof. In some embodiments, 'x' anion, or 'x'-anion, or 'x', or any combination thereof may comprise an anion, or acid, or anion derivative, or any combination thereof which may form a salt with calcium, or may form a salt with magnesium, or any combination thereof. In some embodiments, 'x' anion, or 'x'-anion, or 'x', or any combination thereof may comprise an anion, or acid, or anion derivative, or any combination thereof which may capable of at least partially transferring from at least partially bonding with magnesium to at least partially bonding with calcium. In some embodiments, 'x' anion, or 'x'-anion, or 'x', or any combination thereof may comprise an anion, or acid, or anion derivative, or any combination thereof which may capable of being at least partially transferred from a compound with magnesium to a compound with calcium. In some embodiments, 'x' anion, or 'x'-anion, or 'x', or any combination thereof may comprise an anion, or acid, or anion derivative, or any combination thereof which may capable of being at least partially exchanged in a manner to form at least a portion of a compound with calcium. In some embodiments, 'x' anion, or 'x'-anion, or 'x', or any combination thereof may comprise a first anion, or acid, or anion derivative, or any combination thereof which may capable of being at least partially exchanged for a second anion, or acid, or anion derivative, or any combination thereof in a manner to form at least a portion of a compound comprising calcium+ 'x' anion and/or a compound comprising magnesium+second anion. In some embodiments, 'x' anion, or 'x'-anion, or 'x', or any combination thereof may comprise a first anion, or acid, or anion derivative, or any combination thereof which may capable of being at least partially exchanged for sulfate in a manner to form at least a portion of a compound comprising calcium+ 'x' anion and/or a compound comprising magnesium sulfate. In some embodiments, 'x' anion, or 'x'-anion, or 'x', or any combination thereof may comprise an anion which may enable or facilitate or participate in a double displacement reaction. In some embodiments, 'x' anion, or 'x'-anion, or 'x', or any combination thereof may comprise an anion which may enable or facilitate or participate in a double displacement reaction with sulfate. In some embodiments, 'x' anion may comprise an anion which may enable or facilitate or participate in a double displacement reaction wherein at least a portion of 'x' anion may transfer from pairing with magnesium to pairing with calcium, or transfer from a salt comprising magnesium to a salt comprising calcium. In some embodiments, 'x' anion may form a salt with calcium which may be less soluble in water than calcium sulfate. In some embodiments, 'x' anion may form a salt with calcium which may be less soluble in water than a salt comprising 'x' anion with magnesium. In some embodiments, for example, 'x' anion may comprise, including, but not limited to, one or more or any combination of the following: sulfite, citric acid, or sulfur dioxide derivative, or bisulfite, or citrate.

In some embodiments, 'Ca(Citrate)' may comprise calcium citrate. In some embodiments, the 'Ca(Citrate)' or calcium citrate may describe any component comprising at least a portion of calcium and/or at least a portion of citric acid, or citric acid derivative, or any combination thereof. 'Ca(Citrate),' or calcium citrate, or any combination thereof may possess a molar ratio of calcium species to citric acid species which may be different from the molar ratio expressed in the chemical formula, or the same as the molar ratio shown in the chemical formula, or any combination thereof. For example, in some embodiments, the molar ratio of calcium to citric acid species may vary.

In some embodiments, 'Mg(Citrate)' may comprise magnesium citrate. In some embodiments, the 'Mg(Citrate)' or magnesium citrate may describe any component comprising at least a portion of magnesium and/or at least a portion of citric acid, or citric acid derivative, or any combination thereof. 'Mg(Citrate),' or magnesium citrate, or any combination thereof may possess a molar ratio of magnesium species to citric acid species which may be different from the molar ratio expressed in the chemical formula, or the same as the molar ratio shown in the chemical formula, or any combination thereof. For example, in some embodiments, the molar ratio of magnesium to citric acid species may vary.

In some embodiments, '$CaSO_3$' may comprise calcium sulfite. In some embodiments, the '$CaSO_3$' or calcium sulfite may describe any component comprising at least a portion of calcium and/or at least a portion of sulfite, or sulfurous acid derivative, or sulfur dioxide derivative, or bisulfite, metabisulfite, or sesquisulfite, or a derivative thereof, or any combination thereof. '$CaSO_3$,' or calcium sulfite, or any combination thereof may possess a molar ratio of calcium species to sulfur dioxide species which may be different from the molar ratio expressed in the chemical formula, or the same as the molar ratio shown in the chemical formula, or any combination thereof. For example, in some embodiments, the molar ratio of calcium to sulfur dioxide species may vary.

In some embodiments, '$MgSO_3$' may comprise magnesium sulfite. In some embodiments, the '$MgSO_3$' or magnesium sulfite may describe any component comprising at least a portion of magnesium and/or at least a portion of sulfite, or sulfurous acid derivative, or sulfur dioxide derivative, or bisulfite, metabisulfite, or sesquisulfite, or a derivative thereof, or any combination thereof. '$MgSO_3$,' or magnesium sulfite, or any combination thereof may possess a molar ratio of magnesium species to sulfur dioxide species which may be different from the molar ratio expressed in the chemical formula, or the same as the molar ratio shown in the chemical formula, or any combination thereof. For example, in some embodiments, the molar ratio of magnesium to sulfur dioxide species may vary.

In some embodiments, a solvent may comprise, including, but not limited to, one or more or any combination of the following: water, or organic solvent, or inorganic solvent, or a liquid, or a liquid chemical, or a hydrogenous liquid, or a liquid comprising hydrogen, or a carbonaceous liquid, or a liquid comprising carbon, or a liquid comprising oxygen, or a liquid comprising nitrogen, or a liquid comprising phosphorous, or an ionic liquid, or a liquid metal, or liquid salt, or hydrogen bonding liquid, or polar liquid, or non-polar liquid, or hydrophilic liquid, or hydrophobic liquid, or oleophobic liquid, or oleophilic liquid, omniphobic liquid, or omniphilic liquid, or a surfactant liquid, or liquid sulfur dioxide, or liquid carbon dioxide, or supercritical fluid, or supercritical fluid solvent, or supercritical fluid carbon dioxide, or supercritical fluid sulfur dioxide, or liquid ammonia, or ammonia, or liquid carboxylic acid, or a liquid comprising sulfur, or an alcohol, or a glycol, or a polymer, or liquid polymer, or a hydrocarbons, water soluble organic solvent, ethylene glycol, or propylene glycol, or propylene carbonate, or EO derivative, or PO derivative, or isopropanol, or diethylene glycol, or triethylene glycol, or glycerol, or glyme, or dinitrogen tetraoxide, or nitrogen dioxide, or nitrous oxide, or sulfur trioxide, or sulfur-carbon chemical, or sulfur-carbon-oxide chemical, or sulfur-carbon-hydrogen-oxygen chemical, or carbon-hydroxide-oxygen chemical, or carbon monoxide, or carbon-hydroxide-oxygen-nitrogen chemical, or methyl ether, or ethyl ether, or butyl ether, or polyethylene glycol, or polypropylene glycol, or ester or halogenated hydrocarbons, or acetonitrile, or aliphatic hydrocarbons, or hexane, or heptane, or octane, or petroleum ether, or aromatic hydrocarbons, or benzene, or toluene, or xylene, or alcohols, or primary alcohols, or methanol, or ethanol, or 1-propanol, or 1-butanol, or secondary alcohols, or isopropanol (2-propanol), or tertiary alcohols, or tert-butanol, or ethers, or simple ethers, or diethyl ether, or dimethyl ether, or cyclic ethers, or tetrahydrofuran (THF), or dioxane, or esters, or ethyl acetate, or methyl acetate, or butyl acetate, or ketones, or acetone, or methyl ethyl ketone (MEK), or cyclohexanone, or chlorinated hydrocarbons, or chloroform, or dichloromethane (DCM), or carbon tetrachloride, or tetrachloroethylene, or nitrogen-containing solvents, or amines, or triethylamine, or aniline, or amides, or N,N-dimethylformamide (DMF), or N,N-dimethylacetamide (DMA), or sulfur-containing solvents, or dimethyl sulfoxide (DMSO), or carbon disulfide.

Sodium may be provided as an example alkali. Other alkalis or alkali-like cations may be employed instead of, or in addition to, for example, sodium. For example, other alkalis or alkali-like cations may include, but may be not limited to, one or more or any combination of the following: lithium (Li), or sodium (Na), or potassium (K), or rubidium (Rb), or cesium (Cs), or ammonia, or ammonium, or amine, or ammonia-derivative, or nitrogenous cation.

Calcium may be provided as an example alkaline-earth. Other alkaline-earths or alkaline-earth-like cations may be employed instead of, or in addition to, for example, calcium. For example, other alkaline-earths or alkaline-earth-like cations may include, but may be not limited to, one or more or any combination of the following: beryllium (Be), magnesium (Mg), calcium (Ca), strontium (Sr), barium (Ba), and radium (Ra), or amine, or ammonia-derivative, or nitrogenous cation.

Magnesium may be provided as an example alkaline-earth. Other alkaline-earths or alkaline-earth-like cations may be employed instead of, or in addition to, for example, magnesium. For example, other alkaline-earths or alkaline-earth-like cations may include, but may be not limited to, one or more or any combination of the following: beryllium (Be), magnesium (Mg), calcium (Ca), strontium (Sr), barium (Ba), and radium (Ra), or amine, or ammonia-derivative, or nitrogenous cation.

Citric acid, or citrate, or any combination thereof may be provided as an example carboxylic acid, or acid, or acid stronger than carbonic acid and weaker than sulfurous acid, or any combination thereof. Other carboxylic acids, or acids, or acids stronger than carbonic acid and weaker than sulfurous acid, or any combination thereof may be employed instead of, or in addition to, for example, acetic acid. For example, other carboxylic acids, or acids, or acids stronger than carbonic acid and weaker than sulfurous acid, or any combination thereof may include, but may be not limited to, one or more or any combination of the following: formic acid, or acetic acid, or propanoic acid, or volatile acid, or non-volatile acid, or citric acid, or malic acid, or oxalic acid, or Lactic acid, or glycolic acid, or glyoxylic acid, or C1 acids, or C2 acids, or C3 acids, or C4 acids, or C5 acids, or C6 acids, or C7 acids, or C8 acids, or C9 acids, or C10 acids, or amino acid, or amino acid derivative, or nitrogenous acid, or sulfur acid, or nitrogen comprising acid, or a hydrocarbon acid, or a halogen acid, or a halogenated acid, or a derivative thereof, or acids known in the art.

Citric acid or citrate may be provided as an example 'x'-anion acid, or acid, or acid which may form a low solubility compound with calcium, or an acid or acid anion which may react with or pair with calcium over magnesium, or an acid or acid anion which may react with or pair with calcium over magnesium if the calcium is at least partially paired with sulfate, or an acid or acid anion which may react with or pair with calcium over magnesium if the calcium is at least partially initially paired with sulfate, or any combination thereof. Other acids or acid anions may be employed instead of, or in addition to, for example, citric acid. For example, other 'x'-anion acid, or acid, or acid which may form a low solubility compound with calcium, or an acid or acid anion which may react with or pair with calcium over magnesium, or an acid or acid anion which may react with or pair with calcium over magnesium if the calcium is at least partially paired with sulfate, or an acid or acid anion which may react with or pair with calcium over magnesium if the calcium is at least partially initially paired with sulfate, or any combination thereof may include, but may be not limited to, one or more or any combination of the following: amino acid, or sulfurous acid, or sulfur dioxide, or hydrogen sulfide, or sulfide, or oxalic acid, or oxalate, or sulfite, or bisulfite, or sesquisulfite, or phosphate, or phosphoric acid, or fluoric acid, or hydrofluoric acid, or fluoride, or carbonate, or bicarbonate, or sesquicarbonate, or formic acid, or acetic acid, or propanoic acid, or volatile acid, or non-volatile acid, or citric acid, or malic acid, or oxalic acid, or Lactic acid, or glycolic acid, or glyoxylic acid, or C1 acids, or C2 acids, or C3 acids, or C4 acids, or C5 acids, or C6 acids, or C7 acids, or C8 acids, or C9 acids, or C10 acids, or amino acid, or amino acid derivative, or nitrogenous acid, or sulfur acid, or nitrogen comprising acid, or a hydrocarbon acid, or a halogen acid, or a halogenated acid, or a derivative thereof, or acids known in the art.

In some embodiments, 'x' anion or 'x'-anion may comprise including, but not limited to, one or more or any combination of the following: sulfur dioxide, or sulfurous acid, or sulfite, or bisulfite, or citric acid, or nitrite, or sulfide, or aconitates, or citrates, or isocitrates, or alloisocitrate, or oxalic acid, or acetic acid, or carboxylic acids, or lactic acid, or aconitic acid, or formic acid, or uric acid, or malic acid, or tartaric acid, or methanoic acid, or hydroxymethanoic acid, or ethanoic acid, or 2-hydroxyethanoic acid, or oxoethanoic acid, or ethanedioic acid, or propanoic acid, or propenoic acid, or propynoic acid, or 2-hydroxypropanoic acid, or 3-hydroxypropanoic acid, or 2,3-dihydroxypropanoic acid, or 2-oxopropanoic acid, or 3-oxopropanoic acid, or 2,3-dioxopropanoic acid, or propanedioic acid, or 2-hydroxypropanedioic acid, or 2,2-dihydroxypropanedioic acid, or oxopropanedioic acid, or oxirane-2-carboxylic acid, or butanoic acid, or 2-methylpropanoic acid, or (E)-but-2-enoic acid, or (Z)-but-2-enoic acid, or 2-methylpropenoic acid, or but-3-enoic acid, or but-2-ynoic acid, or 2-hydroxybutanoic acid, or 3-hydroxybutanoic acid, or 4-hydroxybutanoic acid, or 2-oxobutanoic acid, or 3-oxobutanoic acid, or 4-oxobutanoic acid, or butanedioic acid, or 2-methylpropanedioic acid, or (E)-butenedioic acid, or (Z)-butenedioic acid, or butynedioic acid, or hydroxybutanedioic acid, or 2,3-dihydroxybutanedioic acid, or oxobutanedioic acid, or dioxobutanedioic acid, or pentanoic acid, or 3-methylbutanoic acid, or 2-methylbutanoic acid, or 2,2-dimethylpropanoic acid, or 3-hydroxypentanoic acid, or 4-hydroxypentanoic acid, or 3-hydroxy-3-methylbutanoic acid, or pentanedioic acid, or 2-oxopentanedioic acid, or 3-oxopentanedioic acid, or furan-2-carboxylic acid, or tetrahydrofuran-2-carboxylic acid, or hexanoic acid, or hexanedioic acid, or 2,3-dimethylbutanoic acid, or 3,3-dimethylbutanoic acid, or 2-hydroxypropane-1,2,3-tricarboxylic acid, or prop-1-ene-1,2,3-tricarboxylic acid, or 1-hydroxypropane-1,2,3-tricarboxylic acid, or (2E,4E)-hexa-2,4-dienoic acid, or heptanoic acid, or heptanedioic acid, or cyclohexanecarboxylic acid, or benzenecarboxylic acid, or 2-hydroxybenzoic acid, or 4-carboxybenzoic acid, or 2,2-dimethylpentanoic acid, or 2,3-dimethylpentanoic acid, or 2,4-dimethylpentanoic acid, or 3,3-dimethylpentanoic acid, or 2-ethylpentanoic acid, or 3-ethylpentanoic acid, or 2-methylhexanoic acid, or 3-methylhexanoic acid, or 2,2,3-trimethylbutanoic acid, or 2-ethyl-2-methylbutanoic acid, or 2-ethyl-3-, or methylbutanoic acid, or octanoic acid, or benzene-1,2-dicarboxylic acid, or 2-methylheptanoic acid, or 3-methylheptanoic acid, or 4-methylheptanoic acid, or 5-methylheptanoic acid, or 6-methylheptanoic acid, or 2,2-dimethylhexanoic acid, or 2,3-dimethylhexanoic acid, or 2,4-dimethylhexanoic acid, or 2,5-dimethylhexanoic acid, or 3,3-dimethylhexanoic acid, or 3,4-dimethylhexanoic acid, or 3,5-dimethylhexanoic acid, or 4,4-dimethylhexanoic acid, or 4,5-dimethylhexanoic acid, or 5,5-dimethylhexanoic acid, or 2-ethanehexanoic acid, or 3-ethanehexanoic acid, or 4-ethanehexanoic acid, or 5-ethanehexanoic acid, or 2-octenoic acid, or 3-octenoic acid, or 4-octenoic acid, or 5-octenoic acid, or 6-octenoic acid, or 7-octenoic acid, or nonanoic acid, or benzene-1,3,5-tricarboxylic acid, or (E)-3-phenylprop-2-enoic acid, or decanoic acid, or decanedioic acid, or undecanoic acid, or dodecanoic acid, or benzene-1,2,3,4,5,6-hexacarboxylic acid, or tridecanoic acid, or tetradecanoic acid, or pentadecanoic acid, or hexadecanoic acid, or heptadecanoic acid, or octadecanoic acid, or (9Z)-octadec-9-enoic acid, or (9Z,12Z)-octadeca-9,12-dienoic acid, or (9Z,12Z,15Z)-octadeca-9,12,15-trienoic acid, or (6Z,9Z,12Z)-octadeca-6,9,12-trienoic acid, or (6Z,9Z,12Z,15Z)-octadeca-6,9,12,15-tetraenoic acid, or nonadecanoic acid, or eicosanoic acid, or (5Z,8Z,11Z)-eicosa-5,8,11-trienoic acid, or (5Z,8Z,11Z,14Z)-eicosa-5,8,11,14-tetraenoic acid, or (5Z,8Z,11Z,14Z,17Z)-eicosa-5,8,11,14-pentaenoic acid, or heneicosanoic acid, or docosanoic acid, or (4Z,7Z,10Z, 13Z,16Z,19Z)-docosa-4,7,10,13,16,19-hexaenoic acid, or tricosanoic acid, or tetracosanoic acid, or pentacosanoic acid, or hexacosanoic acid, or amino acids, or glutamate, or glutamic acid.

In some embodiments, a material comprising calcium and/or magnesium may comprise one or more or a combination of the following: iron oxides, or iron, or manganese oxide, or manganese, may include, but are not limited to, one or more or a combination of the following: iron (II), or iron (II,III), or iron (III), or iron (II) oxide, or iron (II,II) oxide, or iron (III) oxide, or iron sulfite, or iron sulfate, or iron sulfide, or iron, or ferrites, or ferrates, or calcium-iron salts, or magnesium iron salts, or iron silicate salts, or iron silicon salts, or iron carbon salts, or manganese salts, or manganese, or manganese 0, or manganese+1, or manganese+2, or manganese, or manganese+3, or manganese+4, or manganese+5, or manganese+6, or manganese+7, or manganese sulfite, or manganese oxide, or manganese carbonate, or manganese-iron, or calcium-manganese, or calcium-manganese salts, or magnesium-manganese, or magnesium-manganese salts, or manganese silicon, or manganese carbon, or manganese Note: Calcium sulfite and/or magnesium sulfite may comprise hydrates. For example, magnesium sulfite may form a hexahydrate, or a trihydrate, or may be anhydrous. For example, calcium sulfite may form a tetrahydrate, or a hemihydrate, or may be anhydrous. It may be desirable to dehydrate at least a portion of the hydrate of calcium sulfite, or magnesium sulfite, or both before or during calcining of a sulfite into an oxide and sulfur dioxide. It may be desirable to dehydrate at least a portion of the hydrate of calcium sulfite, or magnesium sulfite, or both before calcining of a sulfite into an oxide and sulfur dioxide. For example, magnesium sulfite hexahydrate may be heated to above 40¬∞C., where magnesium sulfite hexahydrate may decompose or dehydrate into magnesium sulfite trihydrate. For example, calcium sulfite tetrahydrate may be heated to decompose or dehydrate into calcium sulfite hemihydrate. For example, calcium and/or magnesium hydrates may be decomposed or dehydrated into anhydrous forms. For example, calcium sulfite hydrate and/or magnesium sulfite hydrate may be heated to decompose or dehydrate into anhydrous forms. Dehydrating hydrates may require heat or other energy. It may be desirable to supply said heat or other energy for dehydrating hydrates from lower cost, or lower quality heat sources, such as, including, but not limited to, one or more or a combination of the following: waste heat, or heat from other process steps, or low quality steam, or medium quality steam, or high quality step, or combustion of one or more fuels, or solar thermal, or slacking lime, or hydrating a oxide to a hydroxide, or other heat source.

Note: Systems and methods may be employed to remove impurities, or prevent or minimize accumulation of impurities, or a combination thereof. For example, input materials may comprise impurities other than desired reagents. In some instances, said impurities or contaminants may accumulate, or may result in the formation of other impurities, or a combination thereof. In some instances, impurities may dissolve in one or more solutions in the process. Impurities may be removed, or treated, or separated, by, including, but not limited to, one or more or a combination of the following: chemical reaction, or electrodialysis, or ion-exchanger, or precipitation, or cooling, or heating, or distillation, or membrane-based process, or solventing-out, or salting out, or ion exchange.

Note: Calcium citrate may be provided as an example organic acid salt of calcium.

Separations or a separation may include, but may not be limited to, one or more or any combination of the following: concentrating, or crystalizing, or precipitating, or separating, or removing, or falling film evaporator, mechanical vapor compression (MVC), or mechanical vapor recompression, or multi-effect distillation (MED), or multi-stage flash distillation (MSF), or vapor compression (VC) distillation, or vacuum vapor compression (VVC), or membrane distillation, or evaporation, or distillation, or forward osmosis, or reverse osmosis, or nanofiltration, or hot nanofiltration, or hot reverse osmosis, or hot concentrating followed by cooling precipitation, or hot concentrating followed by cooling precipitation and solid-liquid separation, or heating precipitation, centrifuge, settling, or filter, or rotary filter, or calcining, or desorption, or absorption, or coalescing, or decanting, or aggregation, or coagulation, or frothing, or density based methods, or surface tension based methods, or foaming separation, emulsification, or de-emulsification, or flocculation, solventing out, or salting out, or cooling precipitation, or heating, or cryodesalination, or zero liquid discharge processes, or crystallization processes, or electrodialysis reversal (EDR), or electrodialysis process, or magnetic separation, or eddy currents, or electromagnetic induction, or filtration, or activated carbon, or ion exchange, or ion exchange membrane, or precipitation process, or cryodesalination, or cooling desalination, or cooling, or heating, or salting-out, or solventing-out, or adding a solvent to precipitate a solid and then removing the added solvent, or other separations described herein, or other separations described in the art, or a derivative thereof, or a combination thereof.

Carbonate or bicarbonate or carbonic acid may be provided as an example of a weak acid, or an example of an acid weaker than some carboxylic acids, or any combination thereof. Other weak acids, or acids weaker than some carboxylic acids, or any combination thereof may be employed instead of, or in addition to, carbonate or bicarbonate or carbonic acid. Other weak acids, or acids weaker than some carboxylic acids, or anions weaker than some carboxylic acid cations, or any combination thereof may include, but may be not limited to, one or more or any combination of the following: silicates, or silicon derivatives, or iron derivatives, or transition metal derivatives, or metal derivative anions, or ferrites, or ferrates, or aluminates, or silicates, or oxide anions, or sulfides, or hydrogen sulfide, or nitrites.

Note: In some embodiments, 'Cement' may be defined as, for example, a chemical substance which may set, or harden, or adhere, or any combination thereof to other materials to bind them together. In some embodiments, a material comprising 'Cement' may be bonded to or reacted with or mixed with sand and/or gravel and/or other aggregate together to form, for example, concrete. In some embodiments, 'Cement' may be mixed with fine aggregate to form, for example, a material comprising a mortar, or 'Cement' may be mixed with sand and gravel to form, for example, a material comprising concrete.

Note: In some embodiments, 'Clinker' may be defined as, for example, cement clinker, or a material comprising a sintered material which may be comprise a component of or intermediate in the production of cement or other useful materials. In some embodiments, 'Clinker' may comprise a sintered material comprising calcium, or magnesium, or an alkaline-earth, or any combination thereof. In some embodiments, 'Clinker' may comprise a material formed from the reaction of a component comprising calcium, or magnesium, or any combination thereof with a material comprising silicon, or silicate, or silica, or aluminum, or aluminate, or aluminosilicate, or iron, or ferrite, or ferrate, or transition metal oxide, or any combination thereof. In some embodiments, 'Clinker' may comprise a material formed from the reaction of a component comprising calcium, or magnesium, or any combination thereof with a material comprising silicon, or silicate, or silica, or aluminum, or aluminate, or aluminosilicate, or iron, or ferrite, or ferrate, or transition metal oxide, or any combination thereof, wherein at least a portion of the reaction is conducted under conditions to enable sintering. In some embodiments, clinker may comprise a material comprising an intermediate in the production of Portland Cement or other cementitious materials. In some embodiments, 'Clinker' may be produced from the reaction of clinker feeds or input materials with a material comprising calcium sulfite, or magnesium sulfate, or calcium oxide, or calcium hydroxide, or magnesium hydroxide, or magnesium oxide, or calcium+sulfur dioxide salt, or magnesium+sulfur dioxide salt, or carbonate salt, or any combination thereof, wherein, for example, said reaction may be at least partially performed or conducted at temperatures greater than 700° C., or 800° C., 900° C., or 1,000° C., or 1,100° C., or 1,200° C., or 1,300° C., or 1,400° C., or 1,500° C., or any combination thereof.

Note: In some embodiments, a component comprising calcium sulfite, calcium oxide, or calcium hydroxide, or a derivative thereof, or any combination thereof may be mixed with and/or reacted with other reagents to form, for example, a component comprising calcium silicate, or calcium aluminate, or calcium ferrite, or calcium mineral, or cement, or cement clinker, or clinker, or any combination thereof. For example, in some embodiments, a component comprising calcium sulfite, calcium oxide, or calcium hydroxide, or a derivative thereof, or any combination thereof may be mixed with and/or reacted with a material comprising including, but not limited to, one or more or any combination of the following: mud, or shale, or sand, or gravel, or aluminate, or aluminosilicate, or silicate, or silica, or aluminum, or iron, or manganese, or transition metal, or a transition metal oxide, or a magnesium, or sulfur, or phosphorous, or fluoride, or chloride, or halogen, or phosphate, or ore, or mineral.

Note: In some embodiments, a component comprising magnesium sulfite, magnesium oxide, or magnesium hydroxide, or a derivative thereof, or any combination thereof may be mixed with and/or reacted with other reagents to form, for example, a component comprising magnesium silicate, or magnesium aluminate, or magnesium ferrite, or magnesium mineral, or cement, or cement clinker, or clinker, or any combination thereof. For example, in some embodiments, a component comprising magnesium sulfite, magnesium oxide, or magnesium hydroxide, or a derivative thereof, or any combination thereof may be mixed with and/or reacted with a material comprising including, but not limited to, one or more or any combination of the following: mud, or shale, or sand, or gravel, or aluminate, or aluminosilicate, or silicate, or silica, or aluminum, or iron, or manganese, or transition metal, or a transition metal oxide, or a magnesium, or sulfur, or phosphorous, or fluoride, or chloride, or halogen, or phosphate, or ore, or mineral.

Note: In some embodiments, a component comprising calcium oxide, or calcium hydroxide, or a derivative thereof, or any combination thereof may be reacted with a component comprising carbon dioxide to produce a component comprising calcium carbonate, or a permanent sequestration, or semi-permanent $CO_2$ sequestration product comprising calcium carbonate, or a component comprising calcium bicarbonate, or any combination thereof.

Note: In some embodiments, a component comprising magnesium sulfite, magnesium oxide, or magnesium hydroxide, or a derivative thereof, or any combination thereof may be reacted and/or mixed with other reagents to form, for example, a component comprising magnesium silicate, or magnesium aluminate, or magnesium ferrite, or magnesium mineral, or cement, or cement clinker, or clinker, or any combination thereof.

Note: In some embodiments, a component comprising magnesium oxide, or magnesium hydroxide, or a derivative thereof, or any combination thereof may be reacted with a component comprising carbon dioxide to produce a component comprising magnesium carbonate, or a permanent sequestration, or semi-permanent $CO_2$ sequestration product comprising magnesium carbonate, or a component comprising magnesium bicarbonate, or any combination thereof.

Note: In some embodiments, a portion of any calcium oxide or calcium hydroxide produced may be reacted with a brine or seawater or solution comprising magnesium to form a solid comprising magnesium hydroxide. For example, in some embodiments, calcium oxide or calcium hydroxide produced may be reacted with a brine or seawater or solution comprising magnesium to form a solid comprising magnesium hydroxide. In some embodiments, at least a portion of the magnesium hydroxide may be employed as an input to the process, or as a reagent in the reaction forming magnesium sulfate, or reacted with at least a portion of carbon dioxide to form magnesium carbonate, or any combination thereof.

Note: In some embodiments, at least a portion of calcium oxide or calcium hydroxide may comprise valuable products from the process.

Note: In some embodiments, the term 'x' anion and the term 'anion' or 'Anion' may be employed interchangeably or may have similar definitions.

In some embodiments, an 'x' anion may comprise a Regenerable Acid Gas or Regenerable Acid. In some embodiments, a regenerable acid may comprise an acidic chemical which can form a salt and is capable of being regenerated from said salt into its original acidic chemical form. For example, a regenerable acid may comprise an acid which can be reacted to form a salt and can be regenerated from said salt by, for example, thermal decomposition of said salt, which may involve, for example, a gas forming decomposition. For example, a regenerable acid may comprise an acid which can be reacted to form a salt and can be regenerated from said salt by, for example, electrochemical means, which may include, but is not limited to, electrodialysis. A regenerable acid gas may be an acid which is generally at a gas phase when said acid is at an isolated state under certain conditions. Regenerable acid and regenerable acid gas may be used interchangeably. Example regenerable acid gases or acids may include, but are not limited to, one or more or a combination of the following: sulfur dioxide, nitrogen dioxide, nitrogen monoxide, hydrogen sulfide, silicic acids, or orthosilicic acid. Example regenerable cation-acid gas salts or salts comprising regenerable acid may comprise including, but are not limited to, one or more or a combination of the following: sulfites, bisulfites, metabisulfites, nitrites, carbonates, silicates, calcium sulfite, magnesium sulfite, calcium bisulfite, magnesium bisulfite, calcium nitrite, magnesium nitrite, calcium nitrate, magnesium nitrate, calcium carbonate, magnesium carbonate, calcium bicarbonate, magnesium bicarbonate, calcium silicates, magnesium silicates, sodium sulfite, sodium bisulfite, sodium metabisulfite, sodium nitrate, sodium nitrite, sodium carbonate, sodium bicarbonate, sodium sequicarbonate, sodium silicates, alkaline-earth metal cation salts, alkaline-earth metal cation salts with anions described herein, alkali metal cation salts, alkali metal cation salts with anions described herein.

In some embodiments, CaO may comprise calcium oxide. CaO may also be provided as an example oxide salt and may represent other oxide salts, which may include, but are not limited to, oxide salts of calcium, magnesium, sodium, potassium, lithium, ammonia, iron, zinc, aluminum, copper, or a combination thereof. CaO may also represent cement, which may include, but is not limited to, one or more or a combination of the following: hydraulic cement, non-hydraulic cement, or Portland cement. CaO may comprise a CO2-lean alkaline-earth.

In some embodiments, CaCO3 may comprise calcium carbonate. CaCO3 may also be provided as an example carbon dioxide salt and may represent other carbon dioxide salts, which may include, but are not limited to, one or more or any combination of the following: carbon dioxide salts of calcium, magnesium, sodium, potassium, lithium, ammonia, amine, iron, zinc, copper, or a combination thereof. CaCO3 may comprise limestone. CaCO3 may comprise a CO2-rich alkaline-earth.

In some embodiments: CaSO3 may comprise calcium sulfite. CaSO3 may also be provided as an example regenerable acid gas salt and may represent other regenerable acid gas salts, which may include, but are not limited to, one or more or any combination of the following: carbon dioxide salts of calcium, magnesium, sodium, potassium, lithium, ammonia, amine, iron, zinc, copper, or regenerable acid gas salts described herein. or a combination thereof.

Carbon Dioxide Salt: A salt comprising carbon dioxide. A carbon dioxide salt may include, but is not limited to, carbonates, bicarbonates, carbamates, sesquicarbonates, or a combination thereof.

Intermediate: An intermediate may comprise a reagent which may be internally regenerated or recovered, for example, within a process, or a reagent or component which may facilitate or enable a reaction, or any combination thereof. An intermediate may comprise a reagent which is at least a portion regenerated inside a process.

Combustion Gases or Post-Combustion Gases: Combustion gases or post-combustion gases may comprise gases or a gas mixture forming as a result of the combustion of one or more fuels.

Fuel-Rich Mixture: A mixture of fuel and an oxidant which possess a higher ratio of fuel to oxidant relative to a fuel-lean mixture. For example, mixture of fuel and an oxidant which possesses a ratio of fuel to oxidant which is close to, or equal to, or greater than the stoichiometric ratio of fuel to oxidant for complete combustion. Oxidant may comprise diatomic oxygen, air, or other oxidant.

Fuel-Lean Mixture: A mixture of fuel and an oxidant which possess a lower ratio of fuel to oxidant relative to a fuel-lean mixture. For example, mixture of fuel and an oxidant which possesses a ratio of fuel to oxidant which is close to, or equal to, or less than the stoichiometric ratio of fuel to oxidant for complete combustion. Oxidant may comprise diatomic oxygen, air, or other oxidant.

Low Oxygen Environment or Low Oxygen Atmosphere or Low Diatomic Oxygen Environment or Low Diatomic Oxygen: May comprise one or more or a combination of the following:
  A diatomic oxygen concentration less than 20 vol %, or less than 15 vol %, or less than 10 vol %, or less than 9 vol %, or less than 8 vol %, or less than 7 vol %, or less than 6 vol %, or less than 5 vol %, or less than 4 vol %, or less than 3 vol %, or less than 2 vol %, or less than 1 vol %, or less than 0.5 vol %, or less than 0.25 vol %, or less than 0.1 vol %, or less than 0.05 vol %, or less than 0.01 vol %, or less than 0.005 vol %, or less than 0.001 vol %, or less than 0.0001 vol %.
  A volume-percent concentration of gaseous diatomic oxygen less than average concentration of oxygen in air or a diatomic oxygen concentration of less than or equal to 21 vol %

Low Dissolved Oxygen Concentration or Low Dissolved Diatomic Oxygen Concentration may comprise:
  A dissolved oxygen concentration less than one or more or any combination of the following: 10,000 PPM, or less than 5,000 PPM, or less than 1,000 PPM, or less than 500 PPM, or less than 250 PPM, or less than 100 PPM, or less than 50 PPM, or less than 25 PPM, or less than 10 PPM, or less than 7.5 PPM, or less than 5 PPM, or less than 2.5 PPM, or less than 1 PPM.
  A dissolved oxygen comprising less than the saturated solubility of dissolved oxygen in a solution, or in a solution at the vapor pressure of diatomic oxygen in the headspace above a solution, or any combination thereof.

Carbonaceous Fuel: A fuel comprising carbon. A carbonaceous fuel may comprise a hydrocarbon, a carbon containing compound, elemental carbon, a mixture with carbon, or a combination thereof.

Sulfurous Fuel: A fuel comprising sulfur. A sulfurous fuel may include, but is not limited to, sulfur, elemental sulfur, hydrogen sulfide, hydrocarbons comprising sulfur, sulfur dioxide, sulfur trioxide, sulfides, salts comprising sulfur, mercaptans, organosulfur compounds, nitrogenous sulfur compound, ammonium sulfate, ammonium sulfite, ammonium sulfide, or a combination thereof.

Nitrogenous Fuel: A fuel comprising nitrogen. A nitrogenous fuel may include, but is not limited to, ammonia, amine, ammonia salts, ammonium salts, ammonium nitrate, ammonium nitrite, ammonium sulfite, ammonium sulfide, ammonium carbonate, ammonium carbamate, urea, ammonia derivatives, organic nitrogen compounds, hydrocarbons comprising nitrogen, or a combination thereof.

Hydrogen Fuel: A fuel comprising hydrogen. Hydrogen fuel may comprise diatomic hydrogen or derivatives of hydrogen.

Other Cement Feedstocks or Inputs or Components: Other cement components may comprise input materials for the production of cement. For example, other cement components may include, but are not limited to, one or more or a combination of the following: clay, or silicon dioxide, or aluminum oxide, or iron oxide, or iron carbonate, or magnesium carbonate, or magnesium oxide, or silicates, or silicon oxides, or aluminates, or mud, or clay, or shale, or sand, or fly ash, or ash, or slag, or tailings, or ores, or sulfur, or sulfate, or sulfur oxides, or phosphates, or fluorides, or aluminosilicates.

Solid Material Undergoing Calcination: May comprise solid materials undergoing thermal decomposition and/or calcination. May comprise solid materials in a calciner. May comprise solid materials entering or exiting a calciner.

Calcining Products: Calcining products may comprise outputs of a calcination process. Calcining Products may comprise solid phase products exiting a calcination process, which may include, but are not limited to, one or more or any combination of the following: alkaline-earth oxides, alkali oxides, calcium oxide, magnesium oxide, cement, or a combination thereof. Calcining products may comprise gaseous phase products exiting a calcination process, which may include, but are not limited to, one or more or any combination of the following: sulfur dioxide, regenerable acid gas, carbon dioxide, or a combination thereof.

Thermal Decomposition: In some embodiments, may comprise an endothermic or temperature driven gas forming reaction. May comprise other calcination reactions. Other calcination reactions may include, but are not limited to, one or more or any combination of the following: the formation of calcium silicates and/or calcium aluminates and/or sulfur based compounds.

High Purity of a Gas: In some embodiments, may comprise a volume-percent (vol %) concentration of carbon dioxide greater than or equal to, including, but not limited to, one or more or any combination of the following: one or more or any combination of the following: 10 vol %, or 20 vol %, or 30 vol %, or 40 vol %, or 50 vol %, or 60 vol %, or 70 vol %, or 80 vol %, or 90 vol %, or 95 vol %, or 99 vol %, or 100 vol %.

High Pressure: In some embodiments, may comprise a total pressure, or partial pressure, or any combination thereof greater than or equal to, including, but not limited to, one or more or any combination of the following: partial pressure greater than or equal to 0.1 atm, or 0.5 atm, or 1 atm, or 1.5 atm, 2 atm, or 3 atm, or 4 atm, or 5 atm, or 6 atm, or 7 atm, or 8 atm, or 9 atm, or 10 atm, or 15 atm, or 20 atm.

Low Concentration of Water Vapor may comprise:
A water vapor pressure less than or equal to 1 atm, or 0.75 atm, or 0.5 atm, or 0.25 atm, or 0.175 atm, or 0.1 atm, or 0.09 atm, or 0.08 atm, or 0.07 atm, or 0.06 atm, or 0.05 atm, or 0.04 atm, or 0.03 atm, or 0.02 atm, or 0.01 atm, or 0.005 atm.
A water vapor vol % concentration less than or equal to 50 vol %, or 25 vol %, or 15 vol %, or 10 vol %, or 9 vol %, or 8 vol %, or 7 vol %, or 6 vol %, or 5 vol %, or 4 vol %, or 3 vol %, or 2 vol %, or 1 vol %.

Note: The concentration of sulfur dioxide in a solution comprising sulfur dioxide, or a material comprising sulfur dioxide, or any combination thereof may be greater than or equal to one or more of the following weight percent concentrations: 0.0001%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 15.5%, or 16%, or 16.5%, or 17%, or 17.5%, or 18%, or 18.5%, or 19%, or 19.5%, or 20%, or 20.5%, or 21%, or 21.5%, or 22%, or 22.5%, or 23%, or 23.5%, or 24%, or 24.5%, or 25%, or 25.5%, or 26%, or 26.5%, or 27%, or 27.5%, or 28%, or 28.5%, or 29%, or 29.5%, or 30%, or 30.5%, or 31%, or 31.5%, or 32%, or 32.5%, or 33%, or 33.5%, or 34%, or 34.5%, or 35%, or 35.5%, or 36%, or 36.5%, or 37%, or 37.5%, or 38%, or 38.5%, or 39%, or 39.5%, or 40%, or 40.5%, or 41%, or 41.5%, or 42%, or 42.5%, or 43%, or 43.5%, or 44%, or 44.5%, or 45%, or 45.5%, or 46%, or 46.5%, or 47%, or 47.5%, or 48%, or 48.5%, or 49%, or 49.5%, or 50%, or 50.5%, or 51%, or 51.5%, or 52%, or 52.5%, or 53%, or 53.5%, or 54%, or 54.5%, or 55%, or 55.5%, or 56%, or 56.5%, or 57%, or 57.5%, or 58%, or 58.5%, or 59%, or 59.5%, or 60%, or 60.5%, or 61%, or 61.5%, or 62%, or 62.5%, or 63%, or 63.5%, or 64%, or 64.5%, or 65%, or 65.5%, or 66%, or 66.5%, or 67%, or 67.5%, or 68%, or 68.5%, or 69%, or 69.5%, or 70%, or 70.5%, or 71%, or 71.5%, or 72%, or 72.5%, or 73%, or 73.5%, or 74%, or 74.5%, or 75%, or 75.5%, or 76%, or 76.5%, or 77%, or 77.5%, or 78%, or 78.5%, or 79%, or 79.5%, or 80%, or 80.5%, or 81%, or 81.5%, or 82%, or 82.5%, or 83%, or 83.5%, or 84%, or 84.5%, or 85%, or 85.5%, or 86%, or 86.5%, or 87%, or 87.5%, or 88%, or 88.5%, or 89%, or 89.5%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.999%

Note: The concentration of sulfur dioxide gas in a gas comprising sulfur dioxide may be greater than or equal to one or more of the following volume percent concentrations: 0.0001%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.50%, or 11%, or 11.50%, or 12%, or 12.5%, or 13%, or 13.5%, or 14%, or 14.5%, or 15%, or 15.5%, or 16%, or 16.5%, or 17%, or 17.5%, or 18%, or 18.5%, or 19%, or 19.5%, or 20%, or 20.5%, or 21%, or 21.5%, or 22%, or 22.5%, or 23%, or 23.5%, or 24%, or 24.5%, or 25%, or 25.5%, or 26%, or 26.5%, or 27%, or 27.5%, or 28%, or 28.5%, or 29%, or 29.5%, or 30%, or 30.5%, or 31%, or 31.5%, or 32%, or 32.5%, or 33%, or 33.5%, or 34%, or 34.5%, or 35%, or 35.5%, or 36%, or 36.5%, or 37%, or 37.5%, or 38%, or 38.5%, or 39%, or 39.5%, or 40%, or 40.5%, or 41%, or 41.5%, or 42%, or 42.5%, or 43%, or 43.5%, or 44%, or 44.5%, or 45%, or 45.5%, or 46%, or 46.5%, or 47%, or 47.5%, or 48%, or 48.5%, or 49%, or 49.5%, or 50%, or 50.5%, or 51%, or 51.5%, or 52%, or 52.5%, or 53%, or 53.5%, or 54%, or 54.5%, or 55%, or 55.5%, or 56%, or 56.5%, or 57%, or 57.5%, or 58%, or 58.5%, or 59%, or 59.5%, or 60%, or 60.5%, or 61%, or 61.5%, or 62%, or 62.5%, or 63%, or 63.5%, or 64%, or 64.5%, or 65%, or 65.5%, or 66%, or 66.5%, or 67%, or 67.5%, or 68%, or 68.5%, or 69%, or 69.5%, or 70%, or 70.5%, or 71%, or 71.5%, or 72%, or 72.5%, or 73%, or 73.5%, or 74%, or 74.5%, or 75%, or 75.5%, or 76%, or 76.5%, or 77%, or 77.5%, or 78%, or 78.5%, or 79%, or 79.5%, or 80%, or 80.5%, or 81%, or 81.5%, or 82%, or 82.5%, or 83%, or 83.5%, or 84%, or 84.5%, or 85%, or 85.5%, or 86%, or 86.5%, or 87%, or 87.5%, or 88%, or 88.5%, or 89%, or 89.5%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.999%

Note: The concentration of magnesium oxide in the output comprising magnesium oxide may be greater than or equal to one or more of the following weight percent concentrations: 0.0001%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 15.5%, or 16%, or 16.5%, or 17%, or 17.5%, or 18%, or 18.5%, or 19%, or 19.5%, or 20%, or 20.5%, or 21%, or 21.5%, or 22%, or 22.5%, or 23%, or 23.5%, or 24%, or 24.5%, or 25%, or 25.5%, or 26%, or 26.5%, or 27%, or 27.5%, or 28%, or 28.5%, or 29%, or 29.5%, or 30%, or 30.5%, or 31%, or 31.5%, or 32%, or 32.5%, or 33%, or 33.5%, or 34%, or 34.5%, or 35%, or 35.5%, or 36%, or 36.5%, or 37%, or 37.5%, or 38%, or 38.5%, or 39%, or 39.5%, or 40%, or 40.5%, or 41%, or 41.5%, or 42%, or 42.5%, or 43%, or 43.5%, or 44%, or 44.5%, or 45%, or 45.5%, or 46%, or 46.5%, or 47%, or 47.5%, or 48%, or 48.5%, or 49%, or 49.5%, or 50%, or 50.5%, or 51%, or 51.5%, or 52%, or 52.5%, or 53%, or 53.5%, or 54%, or 54.5%, or 55%, or 55.5%, or 56%, or 56.5%, or 57%, or 57.5%, or 58%, or 58.5%, or 59%, or 59.5%, or 60%, or 60.5%, or 61%, or 61.5%, or 62%, or 62.5%, or 63%, or 63.5%, or 64%, or 64.5%, or 65%, or 65.5%, or 66%, or 66.5%, or 67%, or 67.5%, or 68%, or 68.5%, or 69%, or 69.5%, or 70%, or 70.5%, or 71%, or 71.5%, or 72%, or 72.5%, or 73%, or 73.5%, or 74%, or 74.5%, or 75%, or 75.5%, or 76%, or 76.5%, or 77%, or 77.5%, or 78%, or 78.5%, or 79%, or 79.5%, or 80%, or 80.5%, or 81%, or 81.5%, or 82%, or 82.5%, or 83%, or 83.5%, or 84%, or 84.5%, or 85%, or 85.5%, or 86%, or 86.5%, or 87%, or 87.5%, or 88%, or 88.5%, or 89%, or 89.5%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.999%

Note: The concentration of calcium oxide in the output comprising magnesium oxide may be greater than or equal to one or more of the following weight percent concentrations: 0.0001%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.50%, or 11%, or 11.50%, or 12%, or 12.5%, or 13%, or 13.5%, or 14%, or 14.5%, or 15%, or 15.5%, or 16%, or 16.5%, or 17%, or 17.5%, or 18%, or 18.5%, or 19%, or 19.5%, or 20%, or 20.5%, or 21%, or 21.5%, or 22%, or 22.5%, or 23%, or 23.5%, or 24%, or 24.5%, or 25%, or 25.5%, or 26%, or 26.5%, or 27%, or 27.5%, or 28%, or 28.5%, or 29%, or 29.5%, or 30%, or 30.5%, or 31%, or 31.5%, or 32%, or 32.5%, or 33%, or 33.5%, or 34%, or 34.5%, or 35%, or 35.5%, or 36%, or 36.5%, or 37%, or 37.5%, or 38%, or 38.5%, or 39%, or 39.5%, or 40%, or 40.5%, or 41%, or 41.5%, or 42%, or 42.5%, or 43%, or 43.5%, or 44%, or 44.5%, or 45%, or 45.5%, or 46%, or 46.5%, or 47%, or 47.5%, or 48%, or 48.5%, or 49%, or 49.5%, or 50%, or 50.5%, or 51%, or 51.5%, or 52%, or 52.5%, or 53%, or 53.5%, or 54%, or 54.5%, or 55%, or 55.5%, or 56%, or 56.5%, or 57%, or 57.5%, or 58%, or 58.5%, or 59%, or 59.5%, or 60%, or 60.5%, or 61%, or 61.5%, or 62%, or 62.5%, or 63%, or 63.5%, or 64%, or 64.5%, or 65%, or 65.5%, or 66%, or 66.5%, or 67%, or 67.5%, or 68%, or 68.5%, or 69%, or 69.5%, or 70%, or 70.5%, or 71%, or 71.5%, or 72%, or 72.5%, or 73%, or 73.5%, or 74%, or 74.5%, or 75%, or 75.5%, or 76%, or 76.5%, or 77%, or 77.5%, or 78%, or 78.5%, or 79%, or 79.5%, or 80%, or 80.5%, or 81%, or 81.5%, or 82%, or 82.5%, or 83%, or 83.5%, or 84%, or 84.5%, or 85%, or 85.5%, or 86%, or 86.5%, or 87%, or 87.5%, or 88%, or 88.5%, or 89%, or 89.5%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.999%

Additional Notes

Note: 'H2SO3(aq)' or '2SO2 (aq)+H2O' may be employed interchangeably.

Note: The weight percent concentration of $SO_2$ in one or more aqueous sulfurous acid solutions or one or more solutions comprising sulfur dioxide may be greater than or equal to one or more or a combination of the following: 0.001%, or 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or less than or equal to 100%.

Note: The volume percent concentration of $SO_2$ in one or more gases described herein may be greater than or equal to one or more or a combination of the following: 0.001%, or 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or less than or equal to 100%.

In some embodiments, pther acid gases may be employed instead of or in addition to sulfur dioxide, which may include, but are not limited to, one or more or any combination of the following: nitrogen oxides, or nitrogen dioxide, or nitrogen monoxide, or dinitrogen tetroxide, or nitric acid, or carbon dioxide, or carbonic acid, or hydrogen sulfuric, or sulfonic acid, or hydrosulfuric acid, or organo-sulfurous compounds, or hydrochloric acid, or hydrobromic acid, or hydroiodic acid, or hydrogen cyanide, or sulfuric acid, or perchloric acid, or nitrous acid, or hydrofluoric acid, or nitrogen derivative acids, or halogen derivative acids, or derivatives thereof, or a combination thereof.

The invention claimed is:

1. A process comprising:
reacting a component comprising calcium sulfate with a second component comprising magnesium sulfite under conditions to form a solid comprising calcium sulfite and a solution comprising magnesium sulfate, and
decomposing at least a portion of the solid comprising calcium sulfite to form a second solid comprising calcium oxide, or calcium hydroxide, or cement, or clinker, or any combination thereof.

2. The process of claim 1 further comprising decomposing at least a portion of the magnesium sulfate to form at least a portion of a third solid comprising magnesium oxide and at least a portion of a gas comprising sulfur dioxide, or sulfur trioxide, or oxygen, or any combination thereof.

3. The process of claim 2 further comprising reacting at least a portion of the gas comprising sulfur dioxide, or sulfur trioxide, or oxygen, or any combination thereof with water under conditions to form at least a portion of sulfuric acid and heat.

4. The process of claim 2 further comprising reacting at least a portion of the gas comprising sulfur dioxide, or sulfur trioxide, or oxygen, or any combination thereof with hydrogen sulfide under conditions to form at least a portion of sulfur.

5. The process of claim 2 further comprising reacting at least a portion of the magnesium oxide with water under conditions to form at least a portion of magnesium hydroxide.

6. The process of claim 5 further comprising reacting at least a portion of the formed magnesium hydroxide with sulfur dioxide under conditions to form a composition comprising magnesium and sulfur dioxide salt, or magnesium sulfite, or magnesium bisulfite, or sulfur dioxide, or sulfurous acid, or any combination thereof.

7. The process of claim 5 further comprising reacting at least a portion of the magnesium hydroxide with a gas comprising carbon dioxide under conditions to form a salt comprising magnesium and carbon dioxide, or magnesium carbonate, or magnesium bicarbonate, or any combination thereof; and then
reacting the formed salt with sulfur dioxide under conditions to form a composition comprising magnesium and sulfur dioxide salt, or magnesium sulfite, or magnesium bisulfite, or any combination thereof and carbon dioxide.

8. The process of claim 1 wherein said magnesium sulfite further comprises magnesium and sulfur dioxide salt, or magnesium sulfite, or magnesium bisulfite, or sulfur dioxide, or sulfurous acid, or any combination thereof.

9. The process of claim 1 further comprising reacting a mixture comprising magnesium oxide, or magnesium hydroxide, or calcium sulfate, or water, or any combination thereof with at least a portion of sulfur dioxide, or sulfurous acid, or any combination thereof under conditions to form a composition comprising magnesium sulfate and calcium sulfite.

10. The process of claim 1 further comprising reacting a mixture comprising magnesium oxide, or magnesium hydroxide, or magnesium carboxylate, or magnesium citrate, or citric acid, or carboxylic acid, or calcium sulfate, or water, or any combination thereof with at least a portion of sulfur dioxide, or sulfurous acid, or sulfite, or bisulfite, or any combination thereof under conditions to form at least a composition comprising magnesium sulfate and calcium sulfite.

11. The process of claim 1 which further comprises decomposing at least a portion of the formed calcium sulfite to sulfur dioxide.

12. The process of claim 1 which further comprises recovering magnesium sulfate.

13. The process of claim 3 further comprising recovering at least a portion of the heat; and
using at least a portion of the recovered heat to facilitate a separation of water from magnesium sulfate, or a drying of magnesium sulfate, or a drying of calcium sulfite, or any combination thereof.

14. The process of claim 1 further comprising reacting at least a portion of the calcium oxide with water under conditions to form calcium hydroxide, heat, descant properties of the reaction, or any combination thereof; and
utilizing at least a portion of the heat, the descant properties of the reaction, or both to facilitate a separation of water from magnesium sulfate, or a drying of magnesium sulfate, or a drying of calcium sulfite, or any combination thereof.

* * * * *